(12) United States Patent
Yoneda et al.

(10) Patent No.: US 10,323,150 B2
(45) Date of Patent: Jun. 18, 2019

(54) AZO COMPOUND, INK COMPOSITION, INK JET RECORDING METHOD, AND COLORED ARTICLE

(71) Applicant: Nippon Kayaku Kabushiki Kaisha, Tokyo (JP)

(72) Inventors: Takashi Yoneda, Tokyo (JP); Junya Masegi, Tokyo (JP); Kenji Ooshima, Tokyo (JP); Taku Iino, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/757,201

(22) PCT Filed: Sep. 26, 2016

(86) PCT No.: PCT/JP2016/078252
§ 371 (c)(1),
(2) Date: Mar. 2, 2018

(87) PCT Pub. No.: WO2017/051923
PCT Pub. Date: Mar. 30, 2017

(65) Prior Publication Data
US 2018/0319988 A1    Nov. 8, 2018

(30) Foreign Application Priority Data

Sep. 25, 2015 (JP) .................. 2015-188439
Sep. 25, 2015 (JP) .................. 2015-188440

(51) Int. Cl.
| C09B 31/30 | (2006.01) |
| C09D 11/328 | (2014.01) |
| B41J 2/01 | (2006.01) |
| B41M 5/00 | (2006.01) |

(52) U.S. Cl.
CPC ............... *C09B 31/30* (2013.01); *B41J 2/01* (2013.01); *B41M 5/00* (2013.01); *C09D 11/328* (2013.01)

(58) Field of Classification Search
CPC .................................. C09B 31/30
USPC .................................. 106/31.48
See application file for complete search history.

(56) References Cited

U.S. PATENT DOCUMENTS 7,217,803 B2* 5/2007 Feiler .................. C09B 29/3617
524/93
7,901,498 B2* 3/2011 Hirota .................. B41M 5/0023
106/31.5
8,080,100 B2* 12/2011 Yoshimoto ........... B41M 5/0023
106/31.48

(Continued)

FOREIGN PATENT DOCUMENTS

DE    2004488 A1 *  8/1971
JP    H01284562      11/1989
(Continued)

OTHER PUBLICATIONS

English translation of the Written Opinion of the International Search Authority dated Dec. 6, 2016 for PCT/JP2016/078252; 3 pages.*

(Continued)

*Primary Examiner* — Helene Klemanski
(74) *Attorney, Agent, or Firm* — Knobbe, Martens, Olson & Bear LLP

(57) ABSTRACT

An azo compound and an ink composition containing the azo compound are used as inks for ink jet recording and have excellent gas (ozone) resistance when recording is done on special ink jet paper. The azo compound is represented by formula (1) or a tautomer thereof, or a salt of these. In formula (1), $R^1$ represents a C1-C4 alkyl group, $R^2$ represents a cyano group, $R^3$ and $R^4$ each independently represent a C1-C4 alkoxy, $R^5$-$R^{10}$ each independently represent a group represented by formula (2), and $R^{11}$-$R^{13}$ each independently represent a nitro group. In formula (2), $R^{14}$ is an anilino group, and $R^{15}$ is a mono- or di-C1-C6 alkylamino group

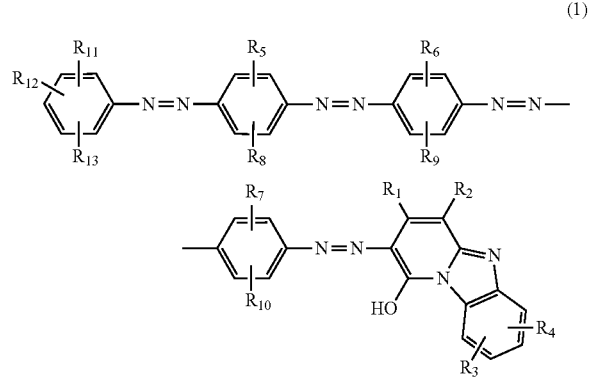

21 Claims, No Drawings

(56) References Cited

U.S. PATENT DOCUMENTS

| | | | | |
|---|---|---|---|---|
| 8,556,406 | B2* | 10/2013 | Yoshimoto | C09B 31/28 106/31.5 |
| 8,864,891 | B2* | 10/2014 | Kawaguchi | C09D 11/324 106/31.48 |
| 8,932,393 | B2* | 1/2015 | Yoshimoto | C07D 471/04 106/31.48 |
| 10,240,053 | B2* | 3/2019 | Nushiro | C09D 11/328 |
| 2007/0107628 | A1 | 5/2007 | Matsui et al. | |
| 2009/0011130 | A1* | 1/2009 | Mafune | C09D 11/328 427/256 |
| 2009/0062545 | A1 | 3/2009 | Matsui et al. | |
| 2010/0309246 | A1 | 12/2010 | Hirota et al. | |
| 2013/0257974 | A1 | 10/2013 | Kawaguchi et al. | |
| 2013/0321523 | A1 | 12/2013 | Yoshimoto et al. | |
| 2013/0335490 | A1* | 12/2013 | Nagao | C09D 11/328 347/86 |
| 2014/0013997 | A1* | 1/2014 | Nagata | C09D 11/328 106/31.48 |
| 2014/0063157 | A1* | 3/2014 | Ikegami | C09D 11/328 347/100 |

FOREIGN PATENT DOCUMENTS

| | | |
|---|---|---|
| JP | 2004075719 | 3/2004 |
| JP | 2008169374 | 7/2008 |
| JP | 2009/263513 A * | 11/2009 |
| JP | 2009298896 | 12/2009 |
| JP | 2014080551 | 5/2014 |
| WO | 2004050768 A2 | 6/2004 |
| WO | 2005054374 A1 | 6/2005 |
| WO | 2007077931 A1 | 7/2007 |
| WO | WO 2008/056626 A1 * | 5/2008 |
| WO | 2009069279 A1 | 6/2009 |
| WO | 2012081640 A1 | 6/2012 |
| WO | WO 2012/081637 A1 * | 6/2012 |
| WO | 20140132926 A1 | 9/2014 |

OTHER PUBLICATIONS

Processing technology, vol. 31, No. 9, pp. 599-602, 1996, partial translation.

Extended European Search Report issued in European Patent Application No. 16848711.4, dated May 8, 2019.

* cited by examiner

AZO COMPOUND, INK COMPOSITION, INK JET RECORDING METHOD, AND COLORED ARTICLE

CROSS-REFERENCE TO RELATED APPLICATIONS

This application is the U.S. National Phase under 35 U.S.C. § 371 of International Application PCT/JP2016/078252, filed Sep. 26, 2016, which was published in Japanese as WO 2017/051923 on Mar. 3, 2017, which claims priority to Japanese Patent Application Nos. 2015-188439 and 2015-188440, both filed Sep. 25, 2015, the entire contents of which are incorporated herein by reference.

TECHNICAL FIELD

The present invention relates to a novel azo compound or a tautomer thereof, or a salt of the azo compound or the tautomer, an ink composition containing the azo compound, the tautomer, or the salt, an inkjet recording method, an inkjet printer in which the azo compound, the tautomer, the salt, or the ink composition is used, and a colored material colored with the azo compound, the tautomer, the salt, or the ink composition.

BACKGROUND ART

A recording method using an inkjet printer, that is, an inkjet recording method, is a representative method among various color recording methods. An inkjet recording method is to perform recording by generating small ink droplets and attaching the ink droplets to a variety of record-receiving materials (paper, film, cloth, and the like). In this method, since a recording head is not brought into direct contact with a record-receiving material, less noise is generated and silent recording is achieved. Furthermore, since this method has the feature that it is easy to reduce apparatus size and to increase process speed, the inkjet recording method has been rapidly popularized in recent years, and further growth in the future is expected as well.

Conventionally, aqueous inks prepared by dissolving water-soluble coloring matters in an aqueous medium have been used as inks for fountain pens, felt pens, and the like and as inks for inkjet recording. These aqueous inks generally have water-soluble organic solvents added thereto so that clogging of the ink at pen tips or ink discharge nozzles can be prevented. Further, in regard to these inks, it is required that recorded images with sufficient densities be provided, that clogging at pen tips or nozzles not occur, that the inks have satisfactory dryability on record-receiving materials, that less bleeding occur, that the inks have excellent storage stability, and the like. Furthermore, the water-soluble coloring matters used therein are required to have high solubility, particularly in water, and to have high solubility in water-soluble organic solvents that are added to the inks. Moreover, the images thus formed are required to have image-fastness properties such as water resistance, light resistance, gas resistance, and moisture resistance.

Among these, gas resistance means resistance to a phenomenon of causing discoloration and fading of a recorded image via an action of ozone gas or the like present in the air and having an oxidizing action on a coloring matter on or in the record-receiving material. In addition to ozone gas, examples of oxidizing gases having this kind of action include NOx and SOx. However, among these oxidizing gases, ozone gas is regarded as the main causative substance that accelerates the phenomenon of discoloration and fading of inkjet-recorded images, and thus resistance to ozone gas in particular is considered important. At the surface of a paper for inkjet exclusive use capable of giving photographic-image quality, an ink-receiving layer is provided in order to speed up drying of the ink and to reduce bleeding at high image quality. Regarding the material of this ink-receiving layer, materials such as porous white inorganic substances are frequently used. On such a recording paper, discoloration and fading caused by ozone gas or the like is notably observed. Since this phenomenon of discoloration and fading caused by an oxidizing gas is characteristic of inkjet-recorded images, enhancement of gas resistance, particularly ozone-gas resistance, is one of the most important problems to be solved in the field of inkjet recording.

In some cases, a bronzing phenomenon also becomes a problem. A bronzing phenomenon refers to a phenomenon in which association of a coloring matter or poor ink absorption, for example, leads to conversion of the coloring matter into metal flakes and thereby causes glare on the surface of a record-receiving material. This phenomenon, when it occurs, leads to poor luster, poor print quality, and poor print density. Especially when a metal phthalocyanine-based dye is used as a coloring matter, the dye often "appears reddish" at areas printed at a high concentration, which results in an off-balanced, poor-quality image. Therefore, a coloring matter that does not cause a bronzing phenomenon is demanded. In recent years, glossy paper is used in many settings as a recording medium that looks like a photograph. A bronzing phenomenon, when it occurs, leads to non-uniform luster on the surface of recorded glossy paper and significantly impairs the appearance of the image. Therefore, also from this viewpoint, a coloring matter that does not cause a bronzing phenomenon is strongly demanded. In the present specification, such a coloring matter that does not cause a bronzing phenomenon is described as a coloring matter with an excellent bronzing resistance.

In order to extend the field of application of inkjet recording in the future, there is strong demand for further enhancements of light resistance, gas resistance, moisture resistance, water resistance, bronzing resistance, and the like in inkjet-recorded images. Furthermore, in addition to this, black images are required to have excellent color-rendering properties. The phenomenon in which hues seem to change depending on the type of light source is called color-rendering properties, and this phenomenon is likely to occur generally in black dyed materials or record materials. In the field of dye processing, it is common to use compounds having absorption at longer wavelengths in connection with methods for improving the color-rendering properties, and those methods are disclosed in, for example, Patent Document 6 and Non-Patent Document 1.

Inks of various hues have been prepared from various coloring matters, but among them black ink is an important ink that is used in both monochromatic images and full-color images. Regarding the coloring matters for such black ink, a large number of coloring matters have been suggested to date; however, it has not been possible to provide coloring matters that adequately fulfill market demand. Many of coloring matters proposed are azo coloring matters, and among them disazo coloring matters such as C.I. Food Black 2 have problems such as poor water resistance or moisture resistance, insufficient light resistance and gas resistance, and high color-rendering properties. Polyazo coloring matters having an extended conjugated system have problems in that the coloring matters generally have low water-solubility, a bronzing phenomenon in which recorded images partially have metallic gloss is likely to occur, and the coloring matters have insufficient light resistance and gas resistance, and the like. In addition, in the case of azo-containing metal coloring matters proposed similarly in large numbers, some have favorable light resistance, but there exist problems of safety for living organisms, unfavorable environmental influences due to metal ions included, extremely inferior ozone gas resistance, and the like.

Examples of black compounds (black coloring matters) for inkjet recording having improved gas resistance, which have been the most important problem to be solved in recent years, include the compounds described in Patent Document 1. These compounds have enhanced gas resistance, but still do not sufficiently fulfill market demand. Furthermore, azo compounds having a benzimidazolopyridone skeleton, which is one of the features of the black coloring matter of the present invention, are disclosed in Patent Documents 2, 3, 5, and 9 and the like. Patent Documents 3, 4, and 7 disclose the use of a trisazo compound that is a water-soluble black compound for inkjet recording. Furthermore, Patent Documents 5, 8, and 9 disclose the use of a tetrakisazo compound that is a water-soluble black compound for inkjet recording.

Patent Document 1: PCT International Publication No. WO2005/054374
Patent Document 2: PCT International Publication No. WO2004/050768
Patent Document 3: PCT International Publication No. WO2007/077931
Patent Document 4: PCT International Publication No. WO2009/069279
Patent Document 5: Japanese Unexamined Patent Application, Publication No. 2008-169374
Patent Document 6: Japanese Unexamined Patent Application, Publication No. H01-284562
Patent Document 7: Japanese Unexamined Patent Application, Publication No. 2004-75719
Patent Document 8: PCT International Publication No. WO2012/081640
Patent Document 9: PCT International Publication No. WO2014/132926
Non-Patent Document 1: Processing technology, Vol. 31, No. 9, pp. 599-602, 1996.

DISCLOSURE OF THE INVENTION

Problems to be Solved by the Invention

An object of the present invention is to provide a coloring matter that exhibits, when recorded on a paper for inkjet exclusive use, superb ozone gas resistance; and an ink composition, particularly a black ink composition for inkjet recording, containing the coloring matter.

Means for Solving the Problems

The inventors of the present invention conducted thorough investigations in order to solve problems such as those described above, and as a result the inventors found that an azo compound with a particular skeleton can solve the problems described above, thus completing the present invention.

Accordingly, a first aspect of the present invention provides an azo compound represented by the following formula (1), a tautomer thereof, or a salt of the azo compound or the tautomer:

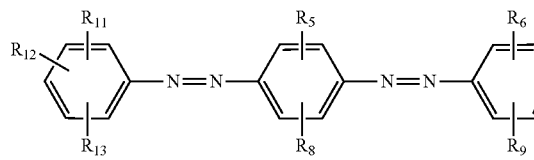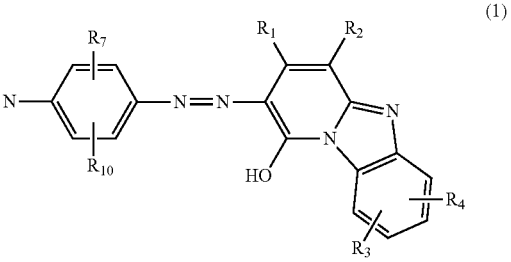

wherein,
$R^1$ represents a C1-C4 alkyl group; a C1-C4 alkyl group substituted with a carboxy group; a phenyl group; a phenyl group substituted with a sulfo group; or a carboxy group,
$R^2$ represents a cyano group; a carbamoyl group; or a carboxy group,
$R^3$ and $R^4$ each independently represent a hydrogen atom; a C1-C4 alkyl group; a C1-C4 alkoxy group; a halogen atom; or a sulfo group,
$R^5$ represents a C1-C4 alkylthio group; a C1-C4 alkylthio group substituted with at least one kind of group selected from the group consisting of a hydroxy group, a sulfo group, and a carboxy group; a C1-C4 alkoxy group; a C1-C4 alkoxy group substituted with at least one kind of group selected from the group consisting of a hydroxy group, a sulfo group, and a carboxy group; or a group represented by the following formula (2),
$R^6$ represents a C1-C4 alkylthio group; a C1-C4 alkylthio group substituted with at least one kind of group selected from the group consisting of a hydroxy group, a sulfo group, and a carboxy group; a C1-C4 alkoxy group; a C1-C4 alkoxy group substituted with at least one kind of group selected from the group consisting of a hydroxy group, a sulfo group, and a carboxy group; or a group represented by the following formula (2),
$R^7$ represents a C1-C4 alkylthio group; a C1-C4 alkylthio group substituted with at least one kind of group selected from the group consisting of a hydroxy group, a sulfo group, and a carboxy group; a C1-C4 alkoxy group; a C1-C4 alkoxy group substituted with at least one kind of group selected from the group consisting of a hydroxy group, a sulfo group, and a carboxy group; or a group represented by the following formula (2),
$R^8$ to $R^{10}$ each independently represent a hydrogen atom; a carboxy group; a sulfo group; a C1-C4 alkylcarbonylamino group; a halogen atom; a C1-C4 alkyl group; a C1-C4 alkoxy group; a C1-C4 alkoxy group substituted with at least one kind of group selected from the group consisting of a hydroxy group, a (C1-C4) alkoxy group, a sulfo group, and a carboxy group; or a group represented by the following formula (2), $R^{11}$ to $R^{13}$ each independently represent a hydrogen atom; a carboxy group; a sulfo group; a hydroxy group; an acetylamino group; a halogen atom; a cyano group; a nitro group; a sulfamoyl group; a C1-C4 alkyl group; a C1-C4 alkoxy group; a C1-C4 alkoxy group substituted with at least one kind of group selected from the group consisting of a hydroxy group, a C1-C4 alkoxy group, a sulfo group, and a carboxy group; a C1-C4 alkylsulfonyl group; or a C1-C4 alkylsulfonyl group substituted with at least one kind of group selected from the group consisting of a hydroxy group, a sulfo group, and a carboxy group, and at least one of $R^5$ to $R^{10}$ is a group represented by the following formula (2):

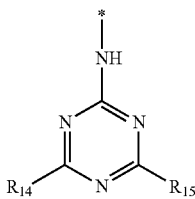

(2)

wherein, $R^{14}$ represents an anilino group having at least one sulfo group as a substituent; or a naphthylamino group having at least one sulfo group as a substituent, each of the anilino group and the naphthylamino group is optionally further substituted with at least one kind of substituent selected from the group consisting of a sulfo group, a carboxy group, a phosphate group, a sulfamoyl group, a carbamoyl group, a hydroxy group, a nitro group, a C1-C6 alkoxy group, an amino group, a mono- or di-C1-C6 alkylamino group, a mono- or diarylamino group, an acetylamino group, a ureido group, a C1-C6 alkyl group, a cyano group, a halogen atom, a C1-C6 alkylsulfonyl group, and a C1-C6 alkylthio group, $R^{15}$ represents an anilino group; a naphthylamino group; a mono- or di-C1-C6 alkylamino group; a mono- or diarylamino group; an amino group; a C1-C6 alkylthio group; a phenylthio group; a phenoxy group; or a (C1-C6) alkoxy group; or a hydroxy group, the group as $R^{15}$ is optionally further substituted with at least one kind of substituent selected from the group consisting of a sulfo group, a carboxy group, a phosphate group, a sulfamoyl group, a carbamoyl group, a hydroxy group, an alkoxy group, an amino group, a mono- or di-C1-C6 alkylamino group, a mono- or diarylamino group, an acetylamino group, a ureido group, a C1-C6 alkyl group, a phenyl group, a furyl group, a pyridyl group, a cyano group, a halogen atom, a C1-C6 alkylsulfonyl group, a C1-C6 alkylthio group, and a sulfo C1-C6 alkylthio group, and in the formula (2), * represents a position of bonding.

A second aspect of the present invention provides the azo compound, the tautomer thereof, or the salt of the azo compound or the tautomer according to the first aspect, wherein in the formula (1), $R^1$ represents a C1-C4 alkyl group; or a C1-C4 alkyl group substituted with a carboxy group, $R^2$ represents a cyano group; a carbamoyl group; or a carboxy group, $R^3$ and $R^4$ each independently represent a hydrogen atom; a C1-C4 alkyl group; a C1-C4 alkoxy group; a halogen atom; or a sulfo group, $R^5$ represents a C1-C4 alkylthio group; or a C1-C4 alkylthio group substituted with at least one kind of group selected from the group consisting of a hydroxy group, a sulfo group, and a carboxy group, $R^6$ represents a C1-C4 alkylthio group substituted with at least one kind of group selected from the group consisting of a hydroxy group, a sulfo group, and a carboxy group, $R^7$ represents a C1-C4 alkoxy group; or a C1-C4 alkoxy group substituted with at least one kind of group selected from the group consisting of a hydroxy group, a sulfo group, and a carboxy group, $R^8$ to $R^{10}$ each independently represent a hydrogen atom; a carboxy group; a sulfo group; a C1-C4 alkylcarbonylamino group; a halogen atom; a C1-C4 alkyl group; a C1-C4 alkoxy group; a C1-C4 alkoxy group substituted with at least one kind of group selected from the group consisting of a hydroxy group, a C1-C4 alkoxy group, a sulfo group, and a carboxy group; or a group represented by the formula (2), $R^{11}$ to $R^{13}$ each independently represent a hydrogen atom; a carboxy group; a sulfo group; a hydroxy group; an acetylamino group; a halogen atom; a cyano group; a nitro group; a sulfamoyl group; a (C1-C4) alkyl group; a C1-C4 alkoxy group; a C1-C4 alkoxy group substituted with at least one kind of group selected from the group consisting of a hydroxy group, a C1-C4 alkoxy group, a sulfo group, and a carboxy group; a C1-C4 alkylsulfonyl group; or a C1-C4 alkylsulfonyl group substituted with at least one kind of group selected from the group consisting of a hydroxy group, a sulfo group, and a carboxy group, and at least one of $R^8$ to $R^{10}$ is a group represented by the formula (2).

A third aspect of the present invention provides the azo compound, the tautomer thereof, or the salt of the azo compound or the tautomer according to the first or second aspect, wherein in the formula (1), $R^1$ represents a C1-C4 alkyl group; or a C1-C4 alkyl group substituted with a carboxy group, $R^2$ represents a cyano group, $R^3$ and $R^4$ each independently represent a hydrogen atom; a C1-C4 alkoxy group; or a sulfo group, $R^5$ represents a C1-C4 alkylthio group substituted with at least one kind of group selected from the group consisting of a hydroxy group, a sulfo group, and a carboxy group, $R^6$ represents a C1-C4 alkylthio group substituted with at least one kind of group selected from the group consisting of a hydroxy group, a sulfo group, and a carboxy group, $R^7$ represents a sulfo-C1-C4 alkoxy group, $R^8$ and $R^{10}$ each independently represent a C1-C4 alkyl group; or a C1-C4 alkylcarbonylamino group, $R^9$ represents a group represented by the formula (2), and $R^{11}$ to $R^{13}$ each independently represent a hydrogen atom; a sulfo group; or a nitro group.

A fourth aspect of the present invention provides the azo compound, the tautomer thereof, or the salt of the azo compound or the tautomer according to any one of the first to third aspects, wherein in the formula (1), $R^1$ represents a C1-C4 alkyl group; or a C1-C4 alkyl group substituted with a carboxy group, $R^2$ represents a cyano group, $R^3$ and $R^4$ each independently represent a hydrogen atom; a C1-C4 alkoxy group; or a sulfo group, $R^5$ represents a C1-C4 alkylthio group substituted with at least one kind of group selected from the group consisting of a hydroxy group, a sulfo group, and a carboxy group, $R^6$ represents a C1-C4 alkylthio group substituted with at least one kind of group selected from the group consisting of a hydroxy group, a sulfo group, and a carboxy group, $R^7$ represents a sulfo-C1-C4 alkoxy group, $R^8$ and $R^{10}$ each independently represent a methyl group; or a C1-C4 alkylcarbonylamino group, $R^9$ represents a group represented by the formula (2), $R^{11}$ to $R^{13}$ each independently represent a hydrogen atom; a sulfo group; or a nitro group, in which at least one of $R^{11}$ to $R^{13}$ is a nitro group, and in the formula (2), $R^{14}$ represents an anilino group having at least one sulfo group as a substituent, the anilino group is optionally further substituted with at least one kind of substituent selected from the group consisting of a sulfo group, a carboxy group, a hydroxy group, an alkoxy group, a C1-C6 alkyl group, a cyano group, a halogen atom, a C1-C6 alkylsulfonyl group, and a C1-C6 alkylthio group, $R^{15}$ represents a mono- or di-C1-C6 alkylamino group; a C1-C6 alkylthio group; an anilino group; or a hydroxy group, and the mono- or di-C1-C6 alkylamino group is optionally further substituted with at least one kind of substituent selected from the group consisting of a sulfo group, a carboxy group, a phosphate group, a hydroxy group, a C1-C6 alkoxy group, an acetylamino group, a ureido group, a C1-C6 alkyl group, a phenyl group, a cyano group, a halogen atom, a C1-C6 alkylsulfonyl group, and a C1-C6 alkylthio group.

A fifth aspect of the present invention provides the azo compound, the tautomer thereof, or the salt of the azo compound or the tautomer according to any one of the first to fourth aspects, wherein in the formula (1), $R^1$ represents a methyl group;

$R^2$ represents a cyano group;

$R^3$ represents a methoxy group;

$R^4$ represents a sulfo group;

$R^5$ represents a sulfo-C1-C4 alkylthio group;

$R^6$ represents a sulfo-C1-C4 alkylthio group;

$R^7$ represents a sulfo-C1-C4 alkoxy group;

$R^8$ represents a C1-C4 alkylcarbonylamino group;

$R^{10}$ represents a methyl group;

$R^9$ represents a group represented by the formula (2);

any one of $R^{11}$ to $R^{13}$ represents a nitro group; and the other two independently represent a sulfo group or a hydrogen atom, and in the formula (2), $R^{14}$ represents an anilino group having at least one sulfo group as a substituent, the anilino group is optionally further substituted with at least one kind of substituent selected from the group consisting of the sulfo group; a carboxy group; a hydroxy group; an alkoxy group; an alkyl group; a cyano group; a halogen atom; a C1-C6 alkylsulfonyl group; and a C1-C6 alkylthio group, $R^{15}$ represents a mono- or di-C1-C6 alkylamino group, and the C1-C6 alkylamino group is optionally further substituted with at least one kind of substituent selected from the group consisting of a sulfo group, a carboxy group, a hydroxy group, a (C1-C6) alkoxy group, a (C1-C6) alkyl group, a phenyl group, a halogen atom, a (C1-C6) alkylsulfonyl group, and a C1-C6 alkylthio group.

A sixth aspect of the present invention provides the azo compound, the tautomer thereof, or the salt of the azo compound or the tautomer according to any one of the first to fifth aspects, wherein in the formula (1), $R^1$ represents a methyl group;

$R^2$ represents a cyano group;

$R^3$ represents a methoxy group;

$R^4$ represents a sulfo group;

$R^5$ represents a sulfo-C1-C4 alkylthio group;

$R^6$ represents a sulfo-C1-C4 alkylthio group;

$R^7$ represents a sulfo-C1-C4 alkoxy group;

$R^8$ represents a C1-C4 alkylcarbonylamino group;

$R^{10}$ represents a methyl group;

$R^9$ represents a group represented by the formula (2);

any one of $R^{11}$ to $R^{13}$ represents a nitro group; and the other two independently represent a sulfo group or a hydrogen atom, and in the formula (2), $R^{14}$ represents an anilino group having at least one sulfo group as a substituent, the anilino group is optionally further substituted with a sulfo group, $R^{15}$ represents a mono- or di-C1-C2 alkylamino group, and the C1-C2 alkylamino group is optionally further substituted with a sulfo group.

A seventh aspect of the present invention provides an ink composition comprising an azo compound (A), the azo compound containing a structure represented by the following formula (3), a structure represented by the following formula (4), and a structure represented by the following formula (5) in one molecule.

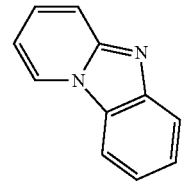
(3)

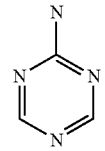
(4)

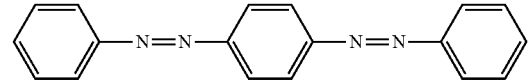
(5)

An eighth aspect of the present invention provides the ink composition according to the seventh aspect, wherein the number of azo bonds (—N═N—) in one molecule of the azo compound (A) is 4 or 5.

A ninth aspect of the present invention provides the ink composition according to the seventh or eighth aspect, wherein the azo compound (A) is an azo compound represented by the following formula (6):

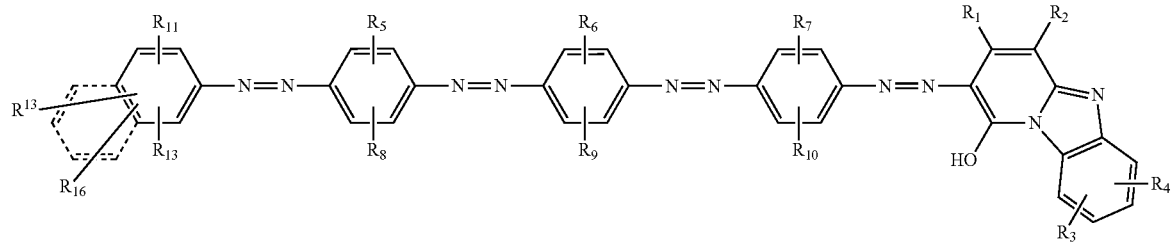

(6)

wherein, $R^1$ represents a C1-C4 alkyl group; a C1-C4 alkyl group substituted with a carboxy group; a phenyl group; a phenyl group substituted with a sulfo group; or a carboxy group, $R^2$ represents a cyano group; a carbamoyl group; or a carboxy group, $R^3$ and $R^4$ each independently represent a hydrogen atom; a C1-C4 alkyl group; a C1-C4 alkoxy group; a halogen atom; or a sulfo group, $R^5$ represents a C1-C4 alkylthio group; a C1-C4 alkylthio group substituted with at least one kind of group selected from the group consisting of a hydroxy group, a sulfo group, and a carboxy group; a C1-C4 alkoxy group; a C1-C4 alkoxy group substituted with at least one kind of group selected from the group consisting of a hydroxy group, a sulfo group, and a carboxy group; or a group represented by the following formula (2), $R^6$ represents a C1-C4 alkylthio group; a C1-C4 alkylthio group substituted with at least one kind of group selected from the group consisting of a hydroxy group, a sulfo group, and a carboxy group; a C1-C4 alkoxy group; a C1-C4 alkoxy group substituted with at least one kind of group selected from the group consisting of a hydroxy group, a sulfo group, and a carboxy group; or a group represented by the following formula (2), $R^7$ represents a C1-C4 alkylthio group; a C1-C4 alkylthio group substituted with at least one kind of group selected from the group consisting of a hydroxy group, a sulfo group, and a carboxy group; a C1-C4 alkoxy group; a C1-C4 alkoxy group substituted with at least one kind of group selected from the group consisting of a hydroxy group, a sulfo group, and a carboxy group; or a group represented by the following formula (2), $R^8$ to $R^{10}$ each independently represent a hydrogen atom; a carboxy group; a sulfo group; a (C1-C4) alkylcarbonylamino group; a halogen atom; a (C1-C4) alkyl group; a (C1-C4) alkoxy group; a C1-C4 alkoxy group substituted with at least one kind of group selected from the group consisting of a hydroxy group, a C1-C4 alkoxy group, a sulfo group, and a carboxy group; or a group represented by the following formula (2), and $R^{11}$ to $R^{13}$ and $R^{16}$ each independently represent a hydrogen atom; a carboxy group; a sulfo group; a hydroxy group; an acetylamino group; a halogen atom; a cyano group; a nitro group; a sulfamoyl group; a C1-C4 alkyl group; a C1-C4 alkoxy group; a C1-C4 alkoxy group substituted with at least one kind of group selected from the group consisting of a hydroxy group, a C1-C4 alkoxy group, a sulfo group, and a carboxy group; a C1-C4 alkylsulfonyl group; or a C1-C4 alkylsulfonyl group substituted with at least one kind of group selected from the group consisting of a hydroxy group, a sulfo group, and a carboxy group, at least one of $R^5$ to $R^{10}$ is a group represented by the following formula (2), and the benzene ring described with a dashed line is optional:

(2)

wherein, $R^{14}$ represents an anilino group having at least one sulfo group as a substituent; or a naphthylamino group having at least one sulfo group as a substituent, each of the anilino group and the naphthylamino group is optionally further substituted with at least one kind of substituent selected from the group consisting of a sulfo group, a carboxy group, a phosphate group, a sulfamoyl group, a carbamoyl group, a hydroxy group, a nitro group, a C1-C6 alkoxy group, an amino group, a mono- or di-C1-C6 alkylamino group, a mono- or diarylamino group, an acetylamino group, a ureido group, a C1-C6 alkyl group, a cyano group, a halogen atom, a C1-C6 alkylsulfonyl group, and a C1-C6 alkylthio group, $R^{15}$ represents an anilino group; a naphthylamino group; a mono- or di-C1-C6 alkylamino group; a mono- or diarylamino group; an amino group; a C1-C6 alkylthio group; a phenylthio group; a phenoxy group; a C1-C6 alkoxy group; or a hydroxy group, the group as $R^{15}$ is optionally further substituted with at least one kind of substituent selected from the group consisting of a sulfo group, a carboxy group, a phosphate group, a sulfamoyl group, a carbamoyl group, a hydroxy group, an alkoxy group, an amino group, a mono- or di-C1-C6 alkylamino group, a mono- or diarylamino group, an acetylamino group, a ureido group, a C1-C6 alkyl group, a phenyl group, a furyl group, a pyridyl group, a cyano group, a halogen atom, a C1-C6 alkylsulfonyl group, a C1-C6 alkylthio group, and a sulfo C1-C6 alkylthio group, and in the formula (2), * represents a position of bonding.

A tenth aspect of the present invention provides the ink composition according to any one of the seventh to ninth aspects, wherein the azo compound (A) is the azo compound, the tautomer thereof, or the salt of the azo compound or the tautomer according to any one of the first to sixth aspects.

An eleventh aspect of the present invention provides the ink composition according to any one of the seventh to tenth aspects, further comprising a water-soluble organic solvent.

A twelfth aspect of the present invention provides an inkjet recording method, comprising utilizing the ink composition according to any one of the seventh to eleventh aspects as an ink, discharging ink droplets of the ink according to recording signals, and thereby performing recording on a record-receiving material.

A thirteenth aspect of the present invention provides the inkjet recording method according to the twelfth aspect, wherein the record-receiving material is a communication sheet.

A fourteenth aspect of the present invention provides the inkjet recording method according to the thirteenth aspect, wherein the communication sheet is a sheet having an ink-receiving layer containing a porous white inorganic substance.

A fifteenth aspect of the present invention provides an inkjet printer equipped with a vessel containing the ink composition according to any one of the seventh to twelfth aspects.

A sixteenth aspect of the present invention provides a colored material, colored with any one of the following:
a) the azo compound, the tautomer thereof, or the salt of the azo compound or the tautomer according to any one of the first to sixth aspects;
b) the ink composition according to any one of the seventh to eleventh aspects; or
c) the inkjet recording method according to any one of the twelfth to fourteenth aspects.

A seventeenth aspect of the present invention provides the azo compound, the tautomer thereof, or the salt of the azo compound or the tautomer according to the first aspect, wherein in the formula (2),
$R^{14}$ represents an anilino group having a substituent containing a sulfo group; or a naphthylamino group having a substituent containing a sulfo group,
the substituent containing a sulfo group is at least one selected from the group consisting of a sulfo (C1-C6) alkoxy group, a sulfomono- or sulfodi-C1-C6 alkylamino group, a sulfomono- or sulfodiarylamino group, a sulfoacetylamino group, a sulfo (C1-C6) alkyl group, a sulfo (C1-C6) alkylsulfonyl group, and a sulfo (C1-C6) alkylthio group, and
each of the anilino group and the naphthylamino group is optionally further substituted with at least one kind of substituent selected from the group consisting of a carboxy group, a phosphate group, a sulfamoyl group, a carbamoyl group, a hydroxy group, a nitro group, a (C1-C6) alkoxy group, an amino group, a mono- or di-(C1-C6) alkylamino group, a mono- or diarylamino group, an acetylamino group, a ureido group, a (C1-C6) alkyl group, a cyano group, a halogen atom, a (C1-C6) alkylsulfonyl group, and a (C1-C6) alkylthio group.

An eighteenth aspect of the present invention provides the azo compound, the tautomer thereof, or the salt of the azo compound or the tautomer according to the seventeenth aspect, wherein in the formula (2),
$R^{14}$ represents an anilino group having a substituent containing a sulfo group; or a naphthylamino group having a substituent containing a sulfo group,
the substituent containing a sulfo group is at least one selected from the group consisting of a sulfo (C1-C6) alkoxy group, a sulfo (C1-C6) alkylthio group, and a sulfo (C1-C6) alkylsulfonyl group, and
each of the anilino group and the naphthylamino group is optionally further substituted with at least one kind of substituent selected from the group consisting of a carboxy group, a phosphate group, a sulfamoyl group, a carbamoyl group, a hydroxy group, a nitro group, a (C1-C6) alkoxy group, an amino group, a mono- or di-(C1-C6) alkylamino group, a mono- or diarylamino group, an acetylamino group, a ureido group, a (C1-C6) alkyl group, a cyano group, a halogen atom, a (C1-C6) alkylsulfonyl group, and a (C1-C6) alkylthio group.

A nineteenth aspect of the present invention provides the azo compound, the tautomer thereof, or the salt of the azo compound or the tautomer according to the eighteenth aspect, wherein in the formula (1),
$R^1$ represents a methyl group;
$R^2$ represents a cyano group;
$R^3$ represents a methoxy group;
$R^4$ represents a sulfo group;
$R^5$ represents a sulfo-C1-C4 alkylthio group;
$R^6$ represents a sulfo-C1-C4 alkylthio group;
$R^7$ represents a sulfo-C1-C4 alkoxy group;
$R^8$ represents a C1-C5 alkylcarbonylamino group;
$R^{10}$ represents a methyl group;
$R^9$ represents a group represented by the formula (2);
any one of $R^{11}$ to $R^{13}$ represents a nitro group; and the other two independently represent a sulfo group or a hydrogen atom, and
in the formula (2),
$R^{14}$ represents an anilino group having a substituent containing a sulfo group,
the substituent containing the sulfo group is at least one selected from the group consisting of a sulfo C1-C6 alkoxy group, a sulfo C1-C6 alkylsulfonyl group, and a sulfo C1-C6 alkylthio group,
the anilino group is optionally further substituted with at least one kind of substituent selected from the group consisting of a nitro group; an alkyl group; and an acetylamino group,
$R^{15}$ represents an anilino group; or a C1-C6 alkylthio group, and
the anilino group and the C1-C6 alkylthio group is optionally further substituted with at least one kind of substituent selected from the group consisting of a sulfo group, an acetylamino group, and a sulfo C1-C6 alkylthio group.

Effects of the Invention

The azo compound of the present invention, the tautomer thereof, or the salt of the azo compound or the tautomer, and an ink composition containing this have high storage stability, and can be suitably used as an ink for inkjet recording. Furthermore, when recording is performed on a paper for inkjet exclusive use, the ink composition exhibits excellent light resistance, excellent moisture resistance, extremely high print density, excellent bronzing resistance, excellent color-rendering properties and low color saturation, and has a high-quality black hue. The ink composition has particularly excellent (ozone) gas resistance. Therefore, an ink composition containing the azo compound of the present invention, the tautomer thereof, or the salt of the azo compound or the tautomer is highly useful as a black ink for inkjet recording.

PREFERRED MODE FOR CARRYING OUT THE INVENTION

Hereinafter, the present invention will be described in detail.
<Azo Compound>

For convenience, in the present specification the "azo compound of the present invention, the tautomer thereof, or the salt of the azo compound or the tautomer" will be collectively described briefly as the "azo compound of the present invention" or "azo compound (A)" in the following descriptions.

Examples of tautomers of an azo compound represented by the formula (1) include structures represented by the following formulas (7) and (8). In the formulas (7) and (8), $R^{11}$ to $R^{13}$ respectively have the same meanings as defined in the formula (1).

The (C1-C4) alkyl group for $R^3$ and $R^4$ represents the same groups as those mentioned for the (C1-C4) alkyl group for $R^1$, including preferred groups for the (C1-C4) alkyl group for $R^1$.

The (C1-C4) alkoxy group for $R^3$ and $R^4$ may be an unsubstituted, linear, or branched alkoxy group, and a linear alkoxy group is preferred. Specific examples thereof include linear groups such as a methoxy group, an ethoxy group, an

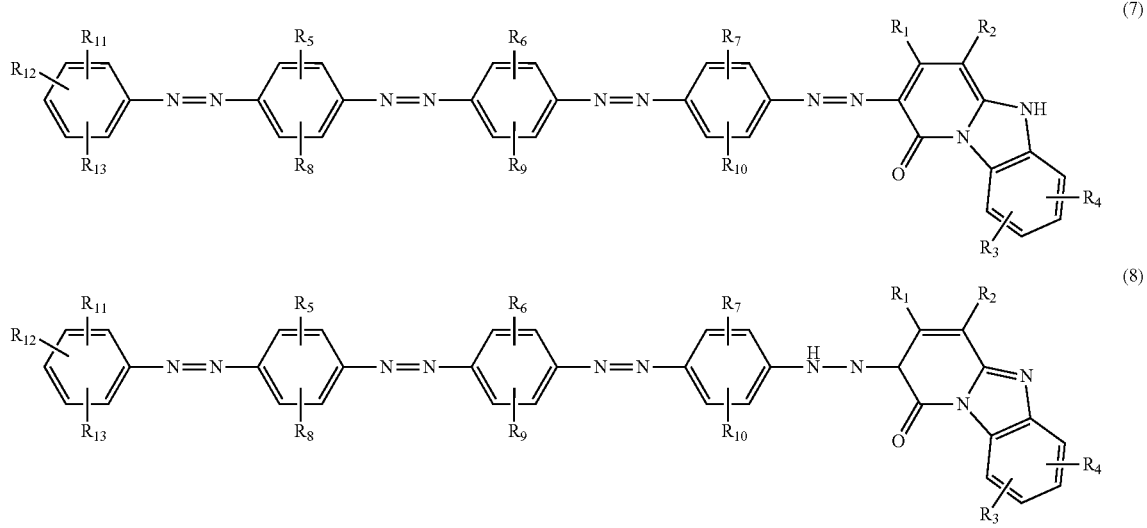

In the formula (1), $R^1$ represents a (C1-C4) alkyl group; a (C1-C4) alkyl group substituted with a carboxy group; a phenyl group; a phenyl group substituted with a sulfo group; or a carboxy group.

The (C1-C4) alkyl group for $R^1$ may be an unsubstituted, linear, or branched alkyl group, and a linear alkyl group is preferred. Specific examples thereof include linear groups such as a methyl group, an ethyl group, an n-propyl group, and an n-butyl group; and branched groups such as an isopropyl group, an isobutyl group, a sec-butyl group, and a tert-butyl group. Preferred specific examples include a methyl group and an n-propyl group, and a methyl group is more preferred.

The (C1-C4) alkyl group substituted with a carboxy group for $R^1$ may be an unsubstituted (C1-C4) alkyl group described above having any of the carbon atoms substituted by a carboxy group. There are no particular limitations on the substitution position of the carboxy group, but it is preferable that the carboxy group be substituted at an end of the alkyl group, and that the substitution number of the carboxy group be 1 or 2, and preferably 1. Specific examples thereof include a carboxymethyl group and a 2-carboxyethyl group. Preferred specific examples include a carboxymethyl group.

As $R^1$, either a (C1-C4) alkyl group or a (C1-C4) alkyl group substituted with a carboxy group is preferred and a (C1-C4) alkyl group is more preferred. Even more preferred is a methyl group or an n-propyl group. Particularly preferred is a methyl group.

In the formula (1), $R^2$ represents a cyano group; a carbamoyl group; or a carboxy group.

In the formula (1), $R^3$ and $R^4$ each independently represent a hydrogen atom; a (C1-C4) alkyl group; a (C1-C4) alkoxy group; a halogen atom; or a sulfo group.

n-propoxy group, and an n-butoxy group; and branched groups such as an isopropoxy group, an isobutoxy group, a sec-butoxy group, and a tert-butoxy group. Among these, a methoxy group is more preferred.

Preferred examples of $R^3$ and $R^4$ include a hydrogen atom, a (C1-C4) alkoxy group, and a sulfo group. More preferred is a combination in which any one of them is a methoxy group and the other is a sulfo group or a combination in which any one of them is a hydrogen atom and the other is a sulfo group. Further preferred is a combination in which any one of them is a methoxy group and the other is a sulfo group.

There are no particular limitations on the substitution positions of $R^3$ and $R^4$; however, it is preferable that when any one of them is a hydrogen atom and the other is a sulfo group, the sulfo group be substituted at any of two carbon atoms among the four carbon atoms that do not constitute the imidazole ring of the benzimidazolopyridone ring.

In regard to the compound represented by the formula (1) of the present invention, from the viewpoints of ease of synthesis and cheapness, the compound may be used as a mixture including at least two kinds of regioisomers in connection with the substitution positions of $R^3$ and $R^4$.

A preferred example of the combination of $R^1$ to $R^4$ in the formula (1) may be a combination in which $R^1$ is a C1-C4 alkyl group (preferably a methyl group or an n-propyl group, and more preferably a methyl group); $R^2$ is a cyano group; $R^3$ is a hydrogen atom or a methoxy group (preferably a methoxy group); and $R^4$ is a sulfo group.

$R^5$ represents a (C1-C4) alkylthio group; a (C1-C4) alkylthio group substituted with at least one kind of group selected from the group consisting of a hydroxy group, a sulfo group, and a carboxy group; a (C1-C4) alkoxy group; a (C1-C4) alkoxy group substituted with at least one kind of group selected from the group consisting of a hydroxy group, a sulfo group, and a carboxy group; or the group represented by the formula (2).

The (C1-C4) alkylthio group substituted with at least one kind of group selected from the group consisting of a hydroxy group, a sulfo group, and a carboxy group, which is for $R^5$, may be a (C1-C4) alkylthio group having these substituents on any of the carbon atoms. The number of the relevant substituents is usually 1 or 2, and preferably 1. There are no particular limitations on the position of the substituent, but it is preferable to substitute a carbon atom other than the carbon atom to which the sulfur atom in the alkylthio group is bonded. Specific examples thereof include a 2-hydroxyethylthio group, a 2-hydroxypropylthio group, a 3-hydroxypropylthio group, a 2-sulfoethylthio group, a 3-sulfopropylthio group, a 2-carboxyethylthio group, a 3-carboxypropylthio group, and a 4-carboxybutylthio group. Among those described above, $R^5$ is preferably a sulfo-(C1-C4) alkylthio group or a carboxy-(C1-C4) alkylthio group, and $R^5$ is more preferably a sulfo-(C1-C4) alkylthio group, and particularly preferably a 3-sulfopropylthio group.

Examples of the (C1-C4) alkoxy group substituted with at least one kind of group selected from the group consisting of a hydroxy group, a sulfo group, and a carboxy group, which is for $R^5$, include those that have such a substituent on any carbon atom of the (C1-C4) alkoxy group. The number of the relevant substituents is usually 1 or 2, preferably 1. There are no particular limitations on the position of the substituent, but it is preferable to substitute a carbon atom other than the carbon atom to which the sulfur atom in the alkylthio group is bonded. Specific examples thereof include a 2-hydroxyethoxy group, a 2-hydroxypropoxy group, a 3-hydroxypropoxy group, a 2-sulfoethoxy group, a 3-sulfopropoxy group, a 2-carboxyethoxy group, a 3-carboxypropoxy group, and a 4-carboxybutoxy group.

Regarding substituents of the group represented by the formula (2) for $R^5$, $R^{14}$ represents an anilino group having at least one sulfo group as a substituent or a naphthylamino group having at least one sulfo group as a substituent; and $R^{15}$ represents an anilino group, a naphthylamino group, a mono- or di-(C1-C6) alkylamino group, a mono- or diarylamino group, an amino group, a (C1-6) alkylthio group, a phenylthio group, a phenoxy group, a (C1-C6) alkoxy group, or a hydroxy group.

The anilino group and the naphthylamino group for $R^{14}$ have at least one sulfo group as a substituent. The sulfo group may be directly bonded to the anilino group or the naphthylamino group, or the sulfo group may be a sulfo group that is at least one kind of group selected from the group consisting of a sulfo C1-C6 alkoxy group, a sulfo C1-C6 alkylsulfonyl group, and a sulfo C1-C6 alkylthio group and that constitutes a group directly bonded to the anilino group or the naphthylamino group. In the latter case, in which the sulfo group is a sulfo group that constitutes a group such as a sulfoalkoxy group, the sulfo group is bonded to the anilino group or the naphthylamino group with at least one kind of group selected from the group consisting of an alkoxy group, an alkylsulfonyl group, and an alkylthio group sandwiched therebetween (in other words, the sulfo group is indirectly bonded to the anilino group or the naphthylamino group). In this way, the anilino group and the naphthylamino group for $R^{14}$ has a substituent containing a sulfo group.

It is preferable that the substituent containing a sulfo group of the anilino group and the naphthylamino group for $R^{14}$ be at least one selected from the group consisting of a sulfo group, a sulfomono- or sulfodi-(C1-C6) alkylamino group, a sulfomono- or sulfodiarylamino group, a sulfo C1-C6 alkoxy group, a sulfoacetylamino group, a sulfo (C1-C6) alkyl group, a sulfo C1-C6 alkylsulfonyl group, and a sulfo C1-C6 alkylthio group, more preferably at least one selected from the group consisting of a sulfomono- or sulfodi-(C1-C6) alkylamino group, a sulfomono- or sulfo-diarylamino group, a sulfo C1-C6 alkoxy group, a sulfoacetylamino group, a sulfo (C1-C6) alkyl group, a sulfo C1-C6 alkylsulfonyl group, and a sulfo C1-C6 alkylthio group, further preferably at least one selected from the group consisting of a sulfo C1-C6 alkoxy group, a sulfo C1-C6 alkylsulfonyl group, and a sulfo C1-C6 alkylthio group.

The anilino group for $R^{14}$ having at least one sulfo group as a substituent and the naphthylamino group for $R^{14}$ having at least one sulfo group as a substituent are optionally substituted with at least one kind of substituent selected from the group consisting of a sulfo group, a carboxy group, a phosphate group, a sulfamoyl group, a carbamoyl group, a hydroxy group, a nitro group, a (C1-C6) alkoxy group, a sulfo (C1-C6) alkoxy group, an amino group, a mono- or di-(C1-C6) alkylamino group, a mono- or diarylamino group, an acetylamino group, a ureido group, a (C1-C6) alkyl group, a cyano group, a halogen atom, a (C1-C6) alkylsulfonyl group, a sulfo (C1-C6) alkylsulfonyl group, a (C1-C6) alkylthio group, and a sulfo (C1-C6) alkylthio group.

Examples of the (C1-C6) alkoxy group as a substituent that the anilino group and the naphthylamino group for $R^{14}$ may have include linear, branched, or cyclic C1-C6, preferably C1-C4, more preferably C1-C3 alkoxy groups. Among these, linear or branched ones are preferable, and linear ones are more preferable. Specific examples thereof include linear groups such as a methoxy group, an ethoxy group, an n-propoxy group, an n-butoxy group, an n-pentoxy group, and an n-hexyloxy group, branched groups such as an isopropoxy group, an isobutoxy group, a t-butoxy group, an isopentoxy group, and an isohexyloxy group, and cyclic groups such as a cyclopropoxy group, a cyclopentoxy group, and a cyclohexyloxy group.

Examples of the sulfoalkoxy group for a substituent that the anilino group and the naphthylamino group for $R^{14}$ may have include linear, branched, or cyclic C1-C6, preferably C1-C4, more preferably C1-C3 sulfoalkoxy groups. Among these, linear or branched ones are preferable and linear ones are more preferable. Specific examples thereof include linear groups such as a sulfomethoxy group, a sulfoethoxy group, a sulfo-n-propoxy group, a sulfo-n-butoxy group, a sulfo-n-pentoxy group, and a sulfo-n-hexyloxy group, branched groups such as a sulfoisopropoxy group, a sulfoisobutoxy group, a sulfo-t-butoxy group, a sulfoisopentoxy group, and a sulfoisohexyloxy group, and cyclic groups such as a sulfocyclopropoxy group, a sulfocyclopentoxy group, and a sulfocyclohexyloxy group.

Examples of the mono-(C1-C6) alkylamino group for a substituent that the anilino group and the naphthylamino group for $R^{14}$ may have include linear or branched mono-C1-C6, preferably mono-C1-C4, more preferably C1-C3 alkylamino groups. Specific examples thereof include linear groups such as methylamino, ethylamino, n-propylamino, and n-butylamino; and branched groups such as isopropylamino, isobutylamino, and t-butylamino. Examples of the di-(C1-C6) alkylamino group for $R^{14}$ include a dialkylamino group that has two independent alkyl groups mentioned above for the monoalkylamino group. Specific examples thereof include dimethylamino, diethylamino, and methylethylamino.

Examples of the monoarylamino group for a substituent that the anilino group and the naphthylamino group for $R^{14}$ may have include a mono-(C6-C10) aromatic amino group, preferably a phenylamino group or a naphthylamino group, more preferably a phenylamino group. Examples of the diarylamino group for $R^{14}$ include a diarylamino group that has two independent aryl groups mentioned above for the monoarylamino group. A diarylamino group that has two same aryl groups is preferable, and a diarylamino group that has two phenyl groups is more preferable. Specific examples include a diphenylamino group.

Examples of the (C1-C6) alkyl group for a substituent that the anilino group and the naphthylamino group for $R^{14}$ may have include linear, branched, or cyclic (C1-C6), preferably (C1-C4), more preferably (C1-C3) alkyl groups. Linear or branched ones are preferable and linear ones are more preferable. Specific examples thereof include linear groups such as a methyl group, an ethyl group, an n-propyl group, an n-butyl group, an n-pentyl group, and an n-hexyl group; branched groups such as an isopropyl group, an isobutyl group, an isopentyl group, and an isohexyl group; and cyclic groups such as a cyclopropyl group, a cyclopentyl group, and a cyclohexyl group.

Examples of the halogen atom for a substituent that the anilino group and the naphthylamino group for $R^{14}$ may have include a fluorine atom, a chlorine atom, and a bromine atom, preferably a fluorine atom or a chlorine atom, more preferably a chlorine atom.

Examples of the alkylsulfonyl group for a substituent that the anilino group and the naphthylamino group for $R^{14}$ may have include linear or branched (C1-C6), preferably (C1-C4), more preferably (C1-C3) alkylsulfonyl groups, and linear ones are preferable. Specific examples thereof include linear groups such as methylsulfonyl, ethylsulfonyl, and propylsulfonyl; and branched groups such as isopropylsulfonyl.

Examples of the sulfoalkylsulfonyl group for a substituent that the anilino group and the naphthylamino group for $R^{14}$ may have include linear or branched C1-C6, preferably C1-C4, more preferably C1-C3 sulfoalkylsulfonyl groups, and linear ones are preferable. Specific examples thereof include linear groups such as sulfomethylsulfonyl, sulfoethylsulfonyl, and sulfopropylsulfonyl; and branched groups such as sulfoisopropylsulfonyl.

Examples of the alkylthio group for a substituent that the anilino group and the naphthylamino group for $R^{14}$ may have include linear or branched C1-C6, preferably C1-C4, more preferably C1-C3 alkylthio groups, and linear ones are preferable. Specific examples thereof include linear groups such as methylthio, ethylthio, propylthio, and butylthio; and branched groups such as isopropylthio.

Examples of the sulfoalkylthio group for a substituent that the anilino group and the naphthylamino group for $R^{14}$ may have include linear or branched C1-C6, preferably C1-C4, more preferably C1-C3 sulfoalkylthio groups, and linear ones are preferable. Specific examples thereof include linear groups such as sulfomethylthio, sulfoethylthio, sulfopropylthio, and sulfobutylthio; and branched groups such as sulfoisopropylthio.

As a substituent that the anilino group and the naphthylamino group for $R^{14}$ may have, a sulfo group, a sulfoalkoxy group, a sulfoalkylsulfonyl group, a sulfoalkylthio group, a sulfoalkylcarbonyl group, a carboxy group, a phosphate group, a hydroxy group, an alkoxy group, an acetylamino group, a ureido group, a nitro group, and a chlorine atom are preferable; a sulfo group, a sulfoalkoxy group, a sulfoalkylsulfonyl group, a sulfoalkylthio group, a sulfoalkylcarbonyl group, a carboxy group, a hydroxy group, an alkoxy group, a nitro group, and a chlorine atom are more preferable; a sulfo group, a sulfoalkoxy group, a sulfoalkylsulfonyl group, a sulfoalkylthio group, a sulfoalkylcarbonyl group, a carboxy group, a hydroxy group, a methoxy group, a nitro group, and a chlorine atom are further preferable; and a sulfo group is particularly preferable.

$R^{15}$ represents an anilino group; a naphthylamino group; a mono- or di-(C1-C6) alkylamino group; a mono- or diarylamino group; an amino group; a (C1-6) alkylthio group; a phenylthio group; a phenoxy group; a (C1-C6) alkoxy group; or a hydroxy group.

The mono- or di-(C1-C6) alkylamino group for $R^{15}$ refers to the same as the mono-(C1-C6) alkylamino group for a substituent that the anilino group and the naphthylamino group for $R^{14}$ may have. The (C1-6) alkylthio group for $R^{15}$ refers to the same as the (C1-6) alkylthio group for a substituent that the anilino group and the naphthylamino group for $R^{14}$ may have. The (C1-C6) alkoxy group for $R^{15}$ refers to the same as the (C1-C6) alkoxy group for a substituent that the anilino group and the naphthylamino group for $R^{14}$ may have.

The substituent for $R^{15}$ is optionally further substituted with at least one kind of substituent selected from the group consisting of a sulfo group; a carboxy group; a phosphate group; a sulfamoyl group; a carbamoyl group; a hydroxy group; a (C1-C6) alkoxy group; an amino group; a mono- or di-(C1-C6) alkylamino group; a mono- or diarylamino group; an acetylamino group; a ureido group; a (C1-C6) alkyl group; a phenyl group; a furyl group; a pyridyl group; a cyano group; a halogen atom; a (C1-C6) alkylsulfonyl group; a (C1-C6) alkylthio group; and a sulfo C1-C6 alkylthio group.

Examples of the (C1-C6) alkoxy group that the substituent for $R^{15}$ may have include linear, branched, or cyclic (C1-C6), preferably (C1-C4), more preferably (C1-C3) alkoxy groups. Linear or branched ones are preferable and linear ones are more preferable. Specific examples thereof include linear groups such as a methoxy group, an ethoxy group, an n-propoxy group, an n-butoxy group, an n-pentoxy group, and an n-hexyloxy group; branched groups such as an isopropoxy group, an isobutoxy group, a t-butoxy group, an isopentoxy group, and an isohexyloxy group; and cyclic groups such as a cyclopropoxy group, a cyclopentoxy group, and a cyclohexyloxy group.

Examples of the mono-(C1-C6) alkylamino group that the substituent for $R^{15}$ may have include linear or branched mono-C1-C6, preferably mono-C1-C4, more preferably C1-C3 alkylamino groups. Specific examples thereof include linear groups such as methylamino, ethylamino, n-propylamino, and n-butylamino; and branched groups such as isopropylamino, isobutylamino, and t-butylamino. Examples of the di-(C1-C6) alkylamino group that the substituent for $R^{15}$ may have include a dialkylamino group that has two independent alkyl groups mentioned above for the monoalkylamino group. Specific examples thereof include dimethylamino, diethylamino, and methylethylamino.

Examples of the monoarylamino group that the substituent for $R^{15}$ may have include a mono (C6-C10) aromatic amino group, preferably a phenylamino group or a naphthylamino group, more preferably a phenylamino group. Examples of the diarylamino group that the mono- or di-(C1-C6) alkylamino group or the mono- or diarylamino group for $R^{15}$ may have include a diarylamino group that has two independent aryl groups mentioned above for the monoarylamino group. A diarylamino group that has two same aryl groups is preferable, and a diarylamino group that has two phenyl groups is more preferable. Specific examples include diphenylamino.

Examples of the (C1-C6) alkyl group that the substituent for $R^{15}$ may have include linear, branched, or cyclic (C1-C6), preferably (C1-C4), more preferably (C1-C3) alkyl groups. Linear or branched ones are preferable and linear ones are more preferable. Specific examples thereof include linear groups such as a methyl group, an ethyl group, an n-propyl group, an n-butyl group, an n-pentyl group, and an n-hexyl group; branched groups such as an isopropyl group, an isobutyl group, an isopentyl group, and an isohexyl group; and cyclic groups such as a cyclopropyl group, a cyclopentyl group, and a cyclohexyl group.

Examples of the halogen atom that the substituent for $R^{15}$ may have include a fluorine atom, a chlorine atom, and a bromine atom. A fluorine atom or a chlorine atom is preferable, and a chlorine atom is more preferable.

Examples of the (C1-C6) alkylsulfonyl group that the substituent for $R^{15}$ may have include linear or branched (C1-C6), preferably (C1-C4), more preferably (C1-C3) alkylsulfonyl groups. Linear ones are preferable. Specific examples thereof include linear groups such as a methanesulfonyl group, an ethanesulfonyl group, and a propanesulfonyl group; and branched groups such as an isopropylsulfonyl group.

Examples of the (C1-C6) alkylthio group that the substituent for $R^{15}$ may have include linear or branched (C1-C6), preferably (C1-C4), more preferably (C1-C3) alkylthio groups. Linear ones are preferable. Specific examples thereof include linear groups such as a methylthio group, an ethylthio group, a propylthio group, and a butylthio group; and branched groups such as an isopropylthio group.

Examples of the sulfoalkylthio group that the substituent for $R^{15}$ may have include linear or branched (C1-C6), preferably (C1-C4), more preferably (C1-C3) sulfoalkylthio groups. Linear ones are preferable. Specific examples thereof include linear groups such as a sulfomethylthio group, a sulfoethylthio group, a sulfopropylthio group, and a sulfobutylthio group; and branched groups such as a sulfoisopropylthio group.

As a substituent that the substituent for $R^{15}$ may have, a sulfo group, a carboxy group, a phosphate group, a hydroxy group, an alkoxy group, an acetylamino group, a sulfoalkylthio group, a ureido group, a nitro group, and a chlorine atom are preferable; a sulfo group, a carboxy group, a hydroxy group, an alkoxy group, a nitro group, and a chlorine atom are more preferable; a sulfo group, a carboxy group, a hydroxy group, a methoxy group, a nitro group, and a chlorine atom are further preferable; and a sulfo group is particularly preferable.

$R^6$ represents a (C1-C4) alkylthio group; a (C1-C4) alkylthio group substituted with at least one kind of group selected from the group consisting of a hydroxy group, a sulfo group, and a carboxy group; a (C1-C4) alkoxy group; a (C1-C4) alkoxy group substituted with at least one kind of group selected from the group consisting of a hydroxy group, a sulfo group, and a carboxy group; or the group represented by the formula (2).

The (C1-C4) alkylthio group substituted with at least one kind of group selected from the group consisting of a hydroxy group, a sulfo group, and a carboxy group, which is for $R^6$, represents the same groups as those mentioned for the (C1-C4) alkylthio group substituted with at least one kind of group selected from the group consisting of a hydroxy group, a sulfo group, and a carboxy group, which is for $R^5$, including preferred groups. The (C1-C4) alkoxy group substituted with at least one kind of group selected from the group consisting of a hydroxy group, a sulfo group, and a carboxy group, which is for $R^6$, represents the same groups as those mentioned for the (C1-C4) alkoxy group substituted with at least one kind of group selected from the group consisting of a hydroxy group, a sulfo group, and a carboxy group, which is for $R^5$, including preferred groups.

$R^7$ represents a (C1-C4) alkylthio group; a (C1-C4) alkylthio group substituted with at least one kind of group selected from the group consisting of a hydroxy group, a sulfo group, and a carboxy group; a (C1-C4) alkoxy group; a (C1-C4) alkoxy group substituted with at least one kind of group selected from the group consisting of a hydroxy group, a sulfo group, and a carboxy group; or the group represented by the formula (2).

The (C1-C4) alkylthio group substituted with at least one kind of group selected from the group consisting of a hydroxy group, a sulfo group, and a carboxy group, which is for $R^7$, represents the same groups as those mentioned for the (C1-C4) alkylthio group substituted with at least one kind of group selected from the group consisting of a hydroxy group, a sulfo group, and a carboxy group, which is for $R^5$, including preferred groups. The (C1-C4) alkoxy group substituted with at least one kind of group selected from the group consisting of a hydroxy group, a sulfo group, and a carboxy group, which is for $R^7$, represents the same groups as those mentioned for the (C1-C4) alkoxy group substituted with at least one kind of group selected from the group consisting of a hydroxy group, a sulfo group, and a carboxy group, which is for $R^5$, including preferred groups. The group represented by the formula (2) for $R^7$ refers to the same as the group represented by the formula (2) for $R^5$, including preferred groups. A group preferred as $R^7$ is a (C1-C4) alkoxy group substituted with at least one kind of group selected from the group consisting of a hydroxy group, a sulfo group, and a carboxy group, further preferably a (C1-C4) alkoxy group substituted with a sulfo group, particularly preferably a 3-sulfopropoxy group.

$R^8$ to $R^{10}$ each independently represent a hydrogen atom; a carboxy group; a sulfo group; a (C1-C4) alkylcarbonylamino group; a halogen atom; a (C1-C4) alkyl group; a (C1-C4) alkoxy group; a (C1-C4) alkoxy group substituted with at least one kind of group selected from the group consisting of a hydroxy group, a (C1-C4) alkoxy group, a sulfo group, and a carboxy group; or the group represented by the formula (2).

The (C1-C4) alkylcarbonylamino group for $R^8$ to $R^{10}$ may be an unsubstituted alkylcarbonylamino group having a linear or branched alkyl moiety, and a linear alkyl moiety is preferred. Specific examples thereof include linear groups such as acetylamino (methylcarbonylamino), propionylamino (ethylcarbonylamino), n-propylcarbonylamino, and n-butylcarbonylamino; and branched groups such as isopropylcarbonylamino, isobutylcarbonylamino, sec-butylcarbonylamino, and pivaloylamino (tert-butylcarbonylamino). Among these, linear groups are preferred, and an acetylamino group is particularly preferred. The (C1-C4) alkoxy group substituted with at least one kind of group selected from the group consisting of a hydroxy group, a (C1-C4) alkoxy group, a sulfo group, and a carboxy group, which is for $R^8$ to $R^{10}$, may be a (C1-C4) alkoxy group having these substituents on any of the carbon atoms. The number of the relevant substituents is usually 1 or 2, and preferably 1. There are no particular limitations on the position of the substituents, but it is preferable to have a substituent on a carbon atom other than the carbon atom to which the oxygen atom in the alkoxy group is bonded. Specific examples thereof include hydroxy-(C1-C4) alkoxy groups such as 2-hydroxyethoxy, 2-hydroxypropoxy, and 3-hydroxypropoxy; sulfo-(C1-C4) alkoxy groups such as 2-sulfoethoxy, 3-sulfopropoxy, and 4-sulfobutoxy; and carboxy-(C1-C4) alkoxy groups such as 2-carboxyethoxy, 3-carboxypropoxy, and 4-carboxybutoxy. The group represented by the formula (2) for $R^8$ to $R^{10}$ refers to the same as the group represented by the formula (2) for $R^5$, including preferred groups.

At least one of $R^5$ to $R^{10}$ is the group represented by the formula (2); preferably at least one of $R^8$ to $R^{10}$ is the group represented by the formula (2); further preferably $R^9$ is the group represented by the formula (2).

$R^{11}$ to $R^{13}$ each independently represent a hydrogen atom; a carboxy group; a sulfo group; a hydroxy group; an acetylamino group; a halogen atom; a cyano group; a nitro group; a sulfamoyl group; a (C1-C4) alkyl group; a (C1-C4) alkoxy group; a (C1-C4) alkoxy group substituted with at least one kind of group selected from the group consisting of a hydroxy group, a (C1-C4) alkoxy group, a sulfo group, and a carboxy group; a (C1-C4) alkylsulfonyl group; or a (C1-C4) alkylsulfonyl group substituted with at least one kind of group selected from the group consisting of a hydroxy group, a sulfo group, and a carboxy group.

Examples of the (C1-C4) alkoxy group substituted with at least one kind of group selected from the group consisting of a hydroxy group, a (C1-C4) alkoxy group, a sulfo group and a carboxy group, which is for $R^{11}$ to $R^{13}$, include the same groups as those mentioned with regard to the (C1-C4) alkoxy group substituted with at least one kind of group selected from the group consisting of a hydroxy group, a (C1-C4) alkoxy group, a sulfo group and a carboxy group, which is for $R^8$ to $R^{10}$, including preferred examples of the group. The (C1-C4) alkylsulfonyl group for $R^{11}$ to $R^{13}$ may be a linear or branched alkylsulfonyl group, and a linear group is preferred. Specific examples thereof include linear groups such as methylsulfonyl, ethylsulfonyl, n-propylsulfonyl, and n-butylsulfonyl; and branched groups such as isopropylsulfonyl and isobutylsulfonyl. Among the groups described above, methylsulfonyl, ethylsulfonyl, and isopropylsulfonyl are preferred, and methylsulfonyl is particularly preferred. The (C1-C4) alkylsulfonyl group substituted with a substituent that is at least one kind of group selected from the group consisting of a hydroxy group, a sulfo group, and a carboxy group, which is for $R^{11}$ to $R^{13}$, may be a (C1-C4) alkylsulfonyl group having the aforementioned groups substituted on any of the carbon atoms, and the number of the relevant substituents is usually 1 or 2, and preferably 1. There are no particular limitations on the position of substituents. Specific examples thereof include hydroxy-substituted groups such as hydroxyethylsulfonyl and 2-hydroxypropylsulfonyl; sulfo-substituted groups such as 2-sulfoethylsulfonyl and 3-sulfopropylsulfonyl; and carboxy-substituted groups such as 2-carboxyethylsulfonyl and 3-carboxypropylsulfonyl.

Among those described above, preferred examples of $R^{11}$ include a hydrogen atom, a carboxy group, a sulfo group, a nitro group, a chlorine atom, a methyl group, a methoxy group, and a (C1-C4) alkylsulfonyl group. A hydrogen atom or a carboxy group, a sulfo group, a nitro group, a chlorine atom, or a (C1-C4) alkylsulfonyl, which are all electron-withdrawing substituents; a methyl group; or a methoxy group is more preferred, and a hydrogen atom and a sulfo group are particularly preferred.

Among those described above, preferred examples of $R^{12}$ include a hydrogen atom, a carboxy group, a sulfo group, a nitro group, a chlorine atom, a methyl group, a methoxy group, a sulfamoyl group, a (C1-C4) alkylsulfonyl group, a carboxy-(C1-C4) alkylsulfonyl group, and a sulfo-(C1-C4) alkylsulfonyl group. A hydrogen atom or a carboxy group, a sulfo group, a nitro group, a chlorine atom, a sulfamoyl group, a (C1-C4) alkylsulfonyl group, a carboxy-(C1-C4) alkylsulfonyl group, or a sulfo-(C1-C4) alkylsulfonyl group, which are all electron-withdrawing substituents; a methyl group; or a methoxy group is further preferred, and a sulfo group, a nitro group, a methyl group, a methoxy group, a sulfamoyl group, a sulfopropylsulfonyl group, and a carboxyethylsulfonyl group are further preferred, while a nitro group is particularly preferred.

Among those described above, preferred examples of $R^{13}$ include a hydrogen atom, a carboxy group, a sulfo group, a methoxy group, a nitro group, a chlorine atom, and a (C1-C4) alkylsulfonyl group. A hydrogen atom or a carboxy group, a sulfo group, a nitro group, a chlorine atom, or a (C1-C4) alkylsulfonyl group, which are all electron-withdrawing groups; or a methoxy group is further preferred, and a hydrogen atom is particularly preferred.

In the formula (1), more preferred $R^{11}$ to $R^{13}$ can have the substitution positions characterized. That is, in the benzene ring substituted with $R^{11}$ to $R^{13}$, when the substitution position of the azo group is set to the 1-position, it is preferable that $R^{11}$ be substituted at the 2-position, $R^{12}$ be substituted at the 3-position or the 4-position, and $R^{13}$ be substituted at the 5-position or the 6-position.

In regard to the formulas (1) and (2), specific examples of preferred combinations include combinations of the following items (i) to (v). Item (ii) or (iii) is more preferred, and item (iv) or (v) is further preferred.

(i)
A combination in which:
$R^1$ represents a methyl group,
$R^2$ represents a cyano group,
$R^3$ represents a hydrogen atom or a methoxy group,
$R^4$ represents a sulfo group,
$R^5$ represents a (C1-C4) alkylthio group substituted with a sulfo group or a carboxy group,
$R^6$ represents a (C1-C4) alkylthio group substituted with a sulfo group or a carboxy group,
$R^7$ represents a sulfo (C1-C4) alkoxy group,
$R^8$ represents a (C1-C4) alkylcarbonylamino group,
$R^9$ represents a group represented by the following formula (9),
$R^{10}$ represents a methyl group, and
$R^{11}$ to $R^{13}$ each independently represent a hydrogen atom; a sulfo group; or a nitro group.

(ii)
A combination in which:
$R^1$ represents a methyl group,
$R^2$ represents a cyano group,
$R^3$ represents a methoxy group,
$R^4$ represents a sulfo group,
$R^5$ represents a sulfo-(C1-C4) alkylthio group,
$R^6$ represents a sulfo-(C1-C4) alkylthio group,
$R^7$ represents a sulfo-(C1-C4) alkoxy group,
$R^8$ represents a (C1-C4) alkylcarbonylamino group,
$R^9$ represents a group represented by the following formula (9),
$R^{10}$ represents a methyl group,
$R^{11}$ represents a nitro group,
$R^{12}$ represents a sulfo group, and
$R^{13}$ represents a hydrogen atom.

(iii)
A combination in which:
$R^1$ represents a methyl group,
$R^2$ represents a cyano group,
$R^3$ represents a methoxy group,
$R^4$ represents a sulfo group, $R^5$ represents a sulfo-(C1-C4) alkylthio group,
$R^6$ represents a sulfo-(C1-C4) alkylthio group,
$R^7$ represents a sulfo-(C1-C4) alkoxy group,
$R^8$ represents a (C1-C4) alkylcarbonylamino group,
$R^9$ represents a group represented by the following formula (9),
$R^{10}$ represents a methyl group,
$R^{11}$ represents a sulfo group,
$R^{12}$ represents a nitro group, and
$R^{13}$ represents a hydrogen atom.
(iv)
A combination in which:
$R^1$ represents a methyl group,
$R^2$ represents a cyano group,
$R^3$ represents a methoxy group,
$R^4$ represents a sulfo group,
$R^5$ represents a sulfo (C1-C4) alkylthio group,
$R^6$ represents a sulfo (C1-C4) alkylthio group,
$R^7$ represents a sulfopropoxy group or a sulfobutoxy group,
$R^8$ represents an acetylamino group,
$R^9$ represents a group represented by the following formula (9),
$R^{10}$ represents a methyl group,
$R^{11}$ represents a nitro group,
$R^{12}$ represents a sulfo group, and
$R^{13}$ represents a hydrogen atom.
(v)
A combination in which:
$R^1$ represents a methyl group,
$R^2$ represents a cyano group,
$R^3$ represents a methoxy group,
$R^4$ represents a sulfo group,
$R^5$ represents a sulfo-(C1-C4) alkylthio group,
$R^6$ represents a sulfo-(C1-C4) alkylthio group,
$R^7$ represents a sulfopropoxy group or a sulfobutoxy group,
$R^8$ represents an acetylamino group,
$R^9$ represents a group represented by the following formula (9),
$R^{10}$ represents a methyl group,
$R^{11}$ represents a sulfo group,
$R^{12}$ represents a nitro group, and
$R^{13}$ represents a hydrogen atom.

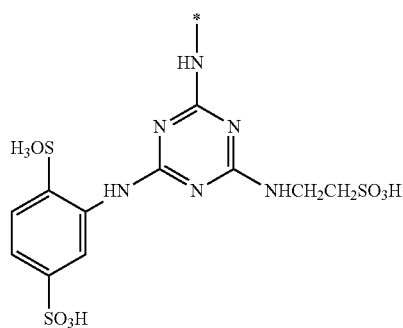

(9)

In regard to the various substituents in the formula (1), combinations thereof, substitution positions thereof, and the like, a compound in which preferred kinds thereof previously described are combined is more preferred, and a compound in which more preferred kinds are combined is even more preferred. The same also applies to a combination of even more preferred kinds with even more preferred kinds, or a combination of preferred kinds with more preferred kinds.

The tetrakisazo compound of the present invention represented by the formula (1) can be synthesized, for example, by the following method. Furthermore, the structural formulas of the compounds in the various processes will be presented in the form of free acid. Meanwhile, in the following formulas (10) to (17), $R^1$ to $R^{15}$ respectively have the same meanings as defined in the formula (1).

A compound represented by the following formula (10) is diazotized by a conventional method, the diazo compound thus obtained and a compound represented by the following formula (11) are subjected to a coupling reaction by a conventional method, and thereby a compound represented by the following formula (12) is obtained.

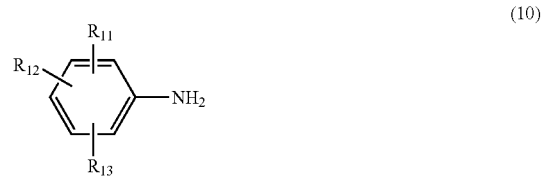

(10)

(11)

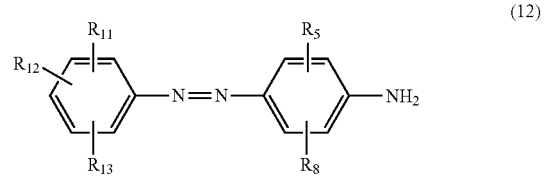

(12)

The compound represented by the formula (12) and thus obtained is diazotized by a conventional method, subsequently the diazo compound thus obtained and the compound represented by the following formula (13) are subjected to a coupling reaction by a conventional method, and thereby a compound represented by the following formula (14) is obtained.

(13)

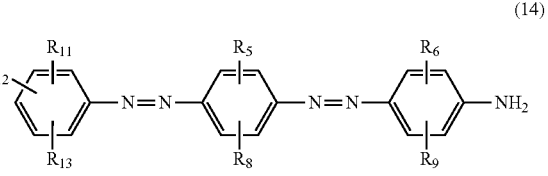

(14)

The compound represented by the formula (14) and thus obtained is diazotized by a conventional method, subsequently the diazo compound thus obtained and a compound represented by the following formula (15) are subjected to a coupling reaction by a conventional method, and thereby the compound represented by the following formula (16) is obtained.

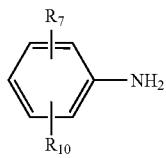

(15)

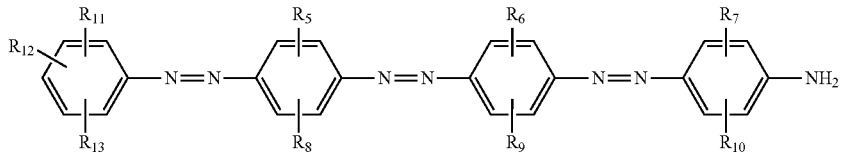

(16)

The compound represented by the formula (16) and thus obtained is diazotized by a conventional method, subsequently the diazo compound thus obtained and a compound represented by the following formula (17) are subjected to a coupling reaction by a conventional method, and thereby the azo compound of the present invention represented by the formula (1) can be obtained.

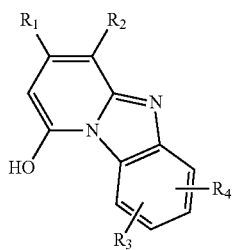

(7)

In addition, the compound represented by the formula (17) can be synthesized according to the method described in Patent Document 3.

There are no particular limitations on suitable specific examples of the azo compound of the present invention represented by the formula (1), but suitable specific examples thereof include compounds represented by the structural formulas listed in the following Tables 1 to 12. In each table, functional groups such as a sulfo group and a carboxy group will be described, for convenience, in the form of free acid. Ac in the following formulas represents an acetyl group.

TABLE 1

| No. | Structural formula |
|---|---|
| 1 | (structural formula image) |

TABLE 1-continued

| No. | Structural formula |
|-----|-------------------|
| 2 | (chemical structure) |
| 3 | (chemical structure) |
| 4 | (chemical structure) |

TABLE 2

| No. | Structural formula |
|---|---|
| 5 | (structure) |
| 6 | (structure) |
| 7 | (structure) |

TABLE 2-continued

| No. | Structural formula |
|-----|--------------------|
| 8   |                    |

TABLE 3

| No. | Structural formula |
|-----|--------------------|
| 9   |                    |
| 10  |                    |

TABLE 3-continued
| No. | Structural formula |
|---|---|
| 11 | |
| 12 | |
TABLE 4
| No. | Structural formula |
|---|---|
| 13 | |
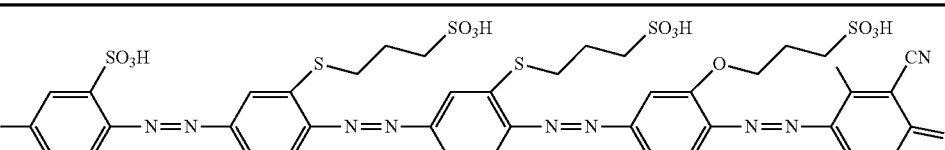

TABLE 4-continued

| No. | Structural formula |
|---|---|
| 14 | |
| 15 | |
| 16 | |

TABLE 5
| No. | Structural Formula |
|---|---|
| 17 | 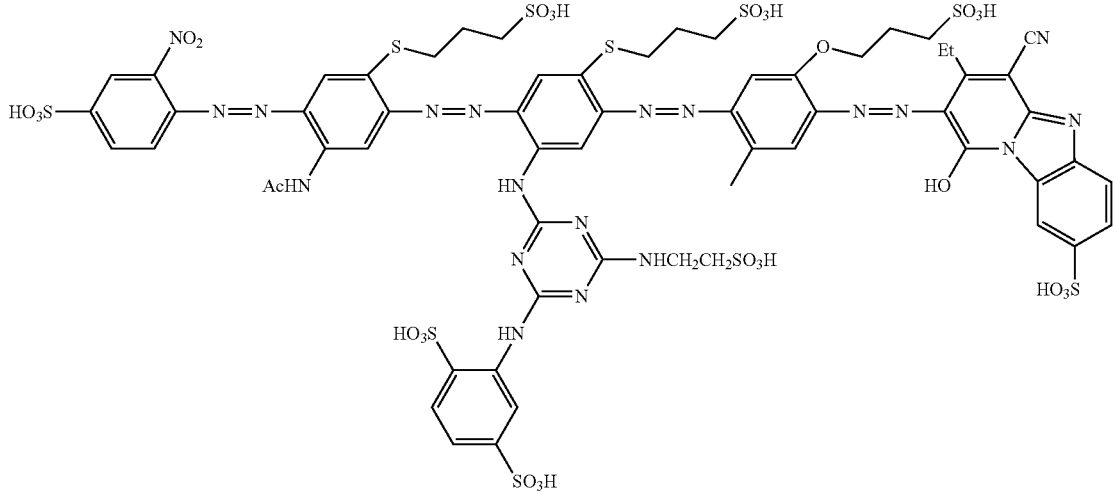 |
| 18 | 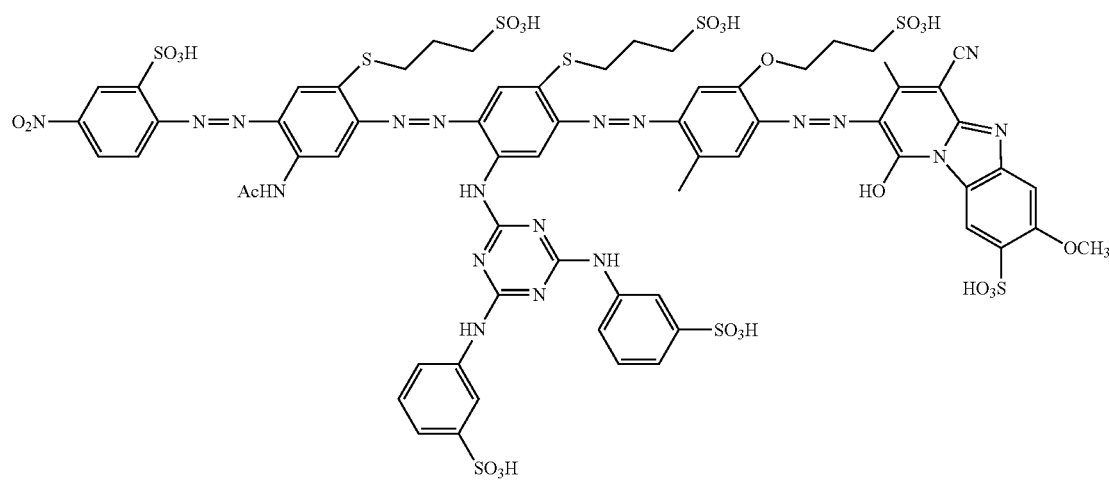 [SMILES: COc1cc2nc3c(C#N)c(C)c(N=Nc4cc(C)c(N=Nc5cc(Nc6nc(Nc7cccc(S(=O)(=O)O)c7)nc(Nc7cccc(S(=O)(=O)O)c7)n6)c(N=Nc6cc(NC(C)=O)c(N=Nc7ccc([N+](=O)[O-])cc7S(=O)(=O)O)cc6SCCCS(=O)(=O)O)cc5SCCCS(=O)(=O)O)cc4OCCCS(=O)(=O)O)c(O)n3c2cc1S(=O)(=O)O] |
| 19 | 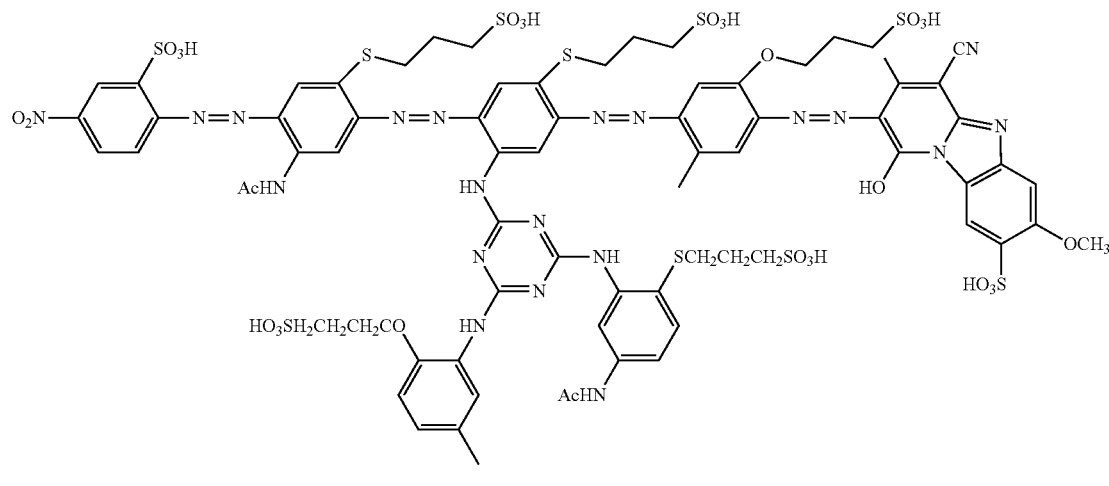 |

TABLE 5-continued

| No. | Structural Formula |
|---|---|
| 20 | (structure) |

TABLE 6

| No. | Structural formula |
|---|---|
| 21 | (structure) |
| 22 | (structure) |

TABLE 6-continued
| No. | Structural formula |
|---|---|
| 23 | 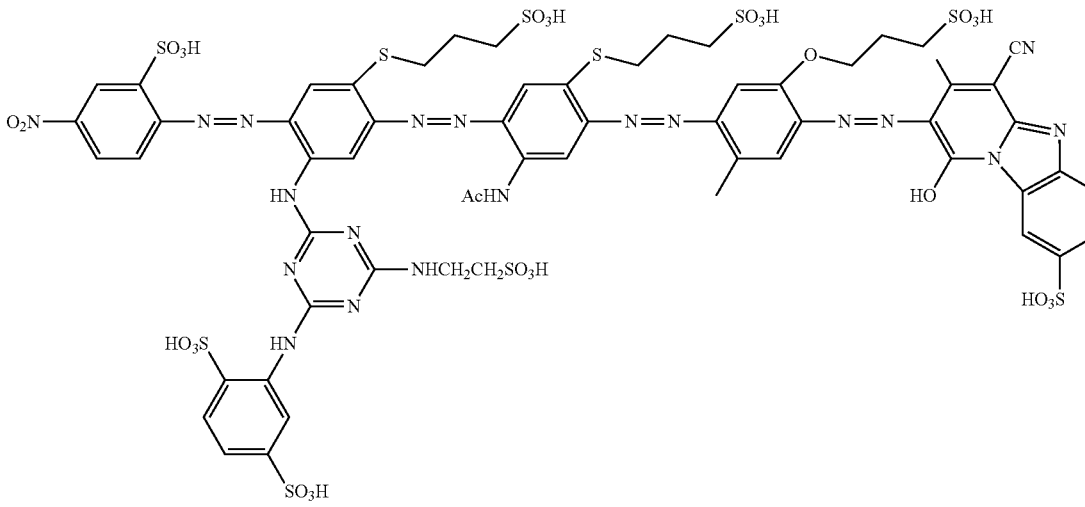 |
| 24 | 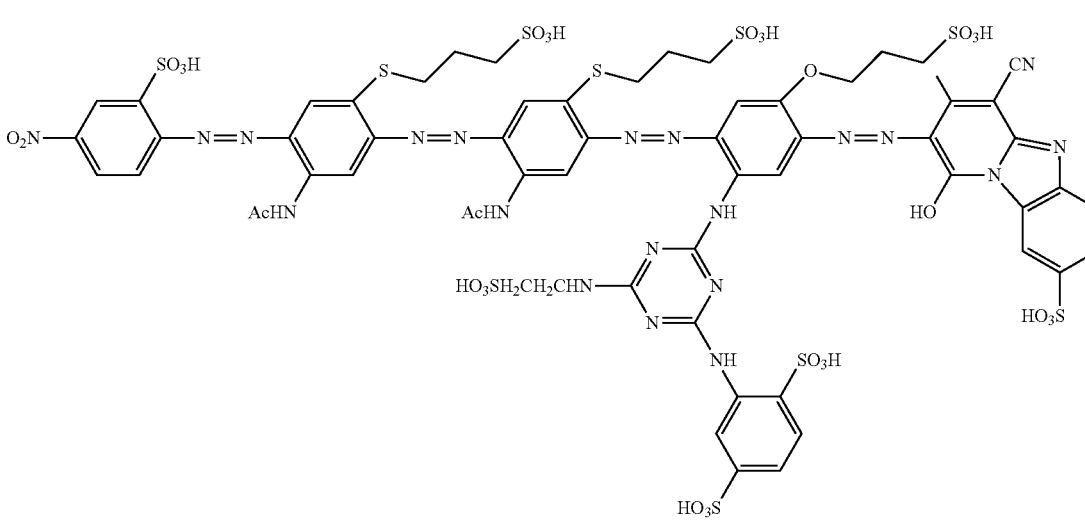 |

TABLE 7

| No. | Structural formula |
| --- | --- |
| 25 | (structure) |
| 26 | (structure) |
| 27 | (structure) |

TABLE 7-continued

| No. | Structural formula |
|---|---|
| 28 | (structure) |

TABLE 8

| No. | Structural formula |
|---|---|
| 29 | (structure) |
| 30 | (structure) |

TABLE 8-continued
| No. | Structural formula |
|---|---|
| 31 | 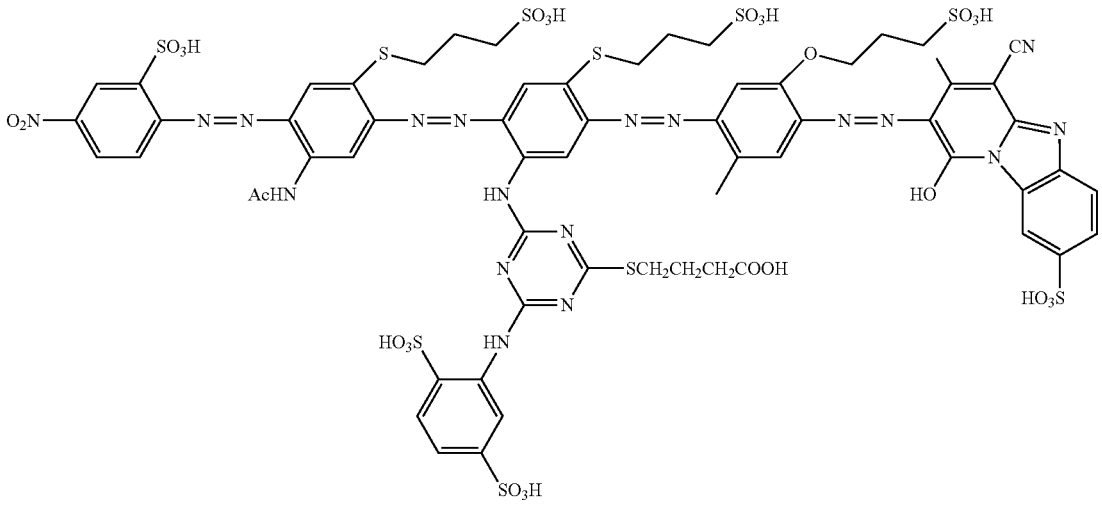 |
| 32 | 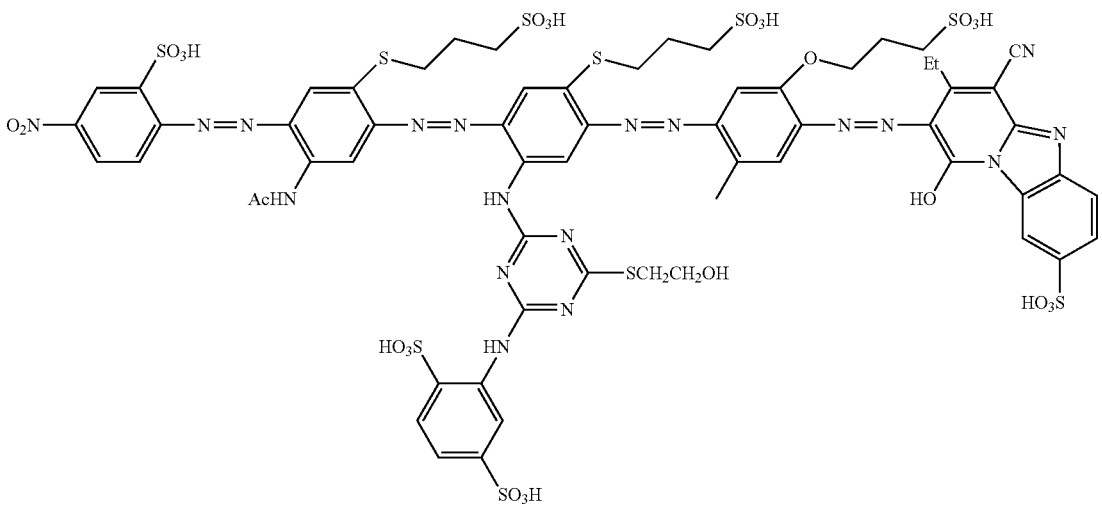 |

TABLE 9
| No. | Structural formula |
|---|---|
| 33 | 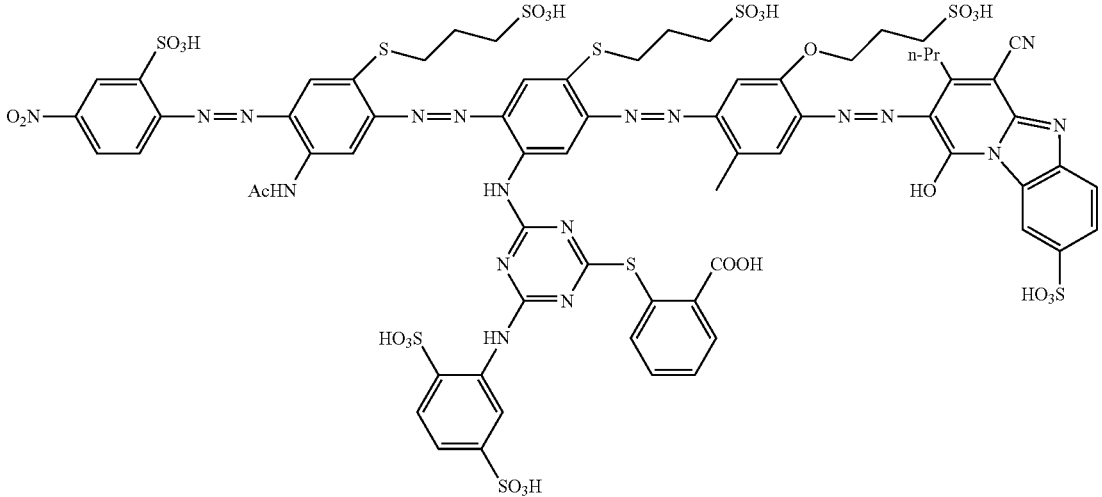 |
| 34 | 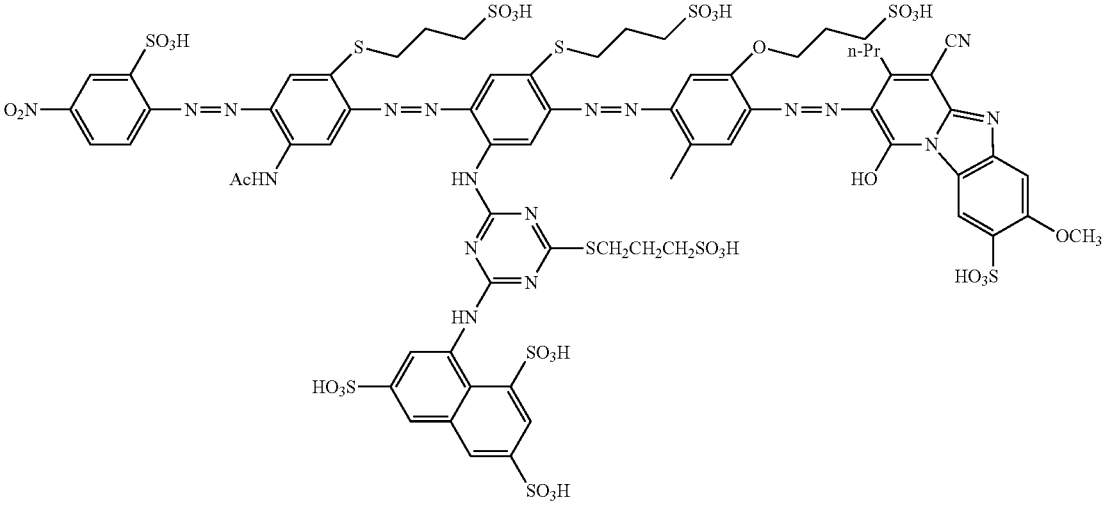 |
| 35 | 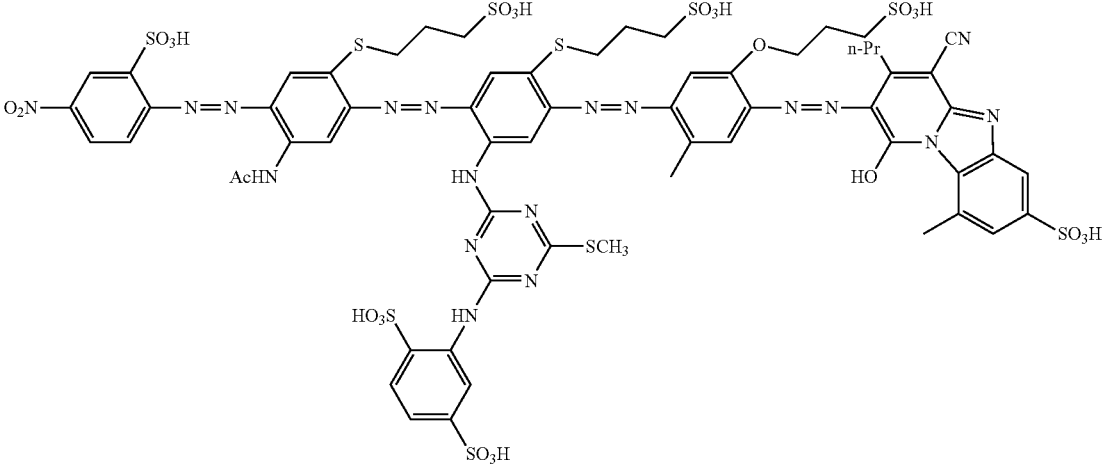 |

TABLE 9-continued
| No. | Structural formula |
|---|---|
| 36 | 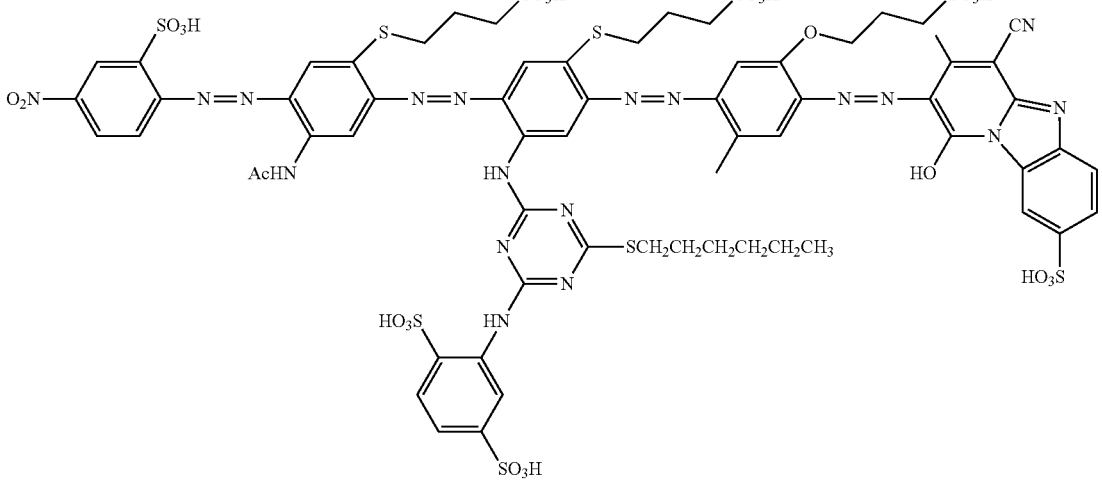 |
TABLE 10
| No. | Structural formula |
|---|---|
| 37 | |
| 38 | |

TABLE 10-continued
| No. | Structural formula |
|---|---|
| 39 | |
| 40 | |
TABLE 11
| No. | Structural formula |
|---|---|
| 41 | |
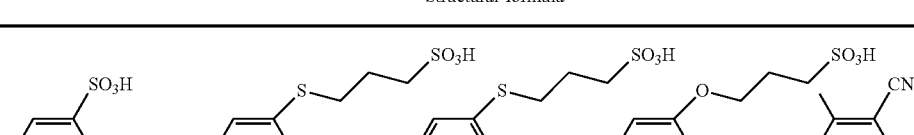

TABLE 11-continued

| No. | Structural formula |
|---|---|
| 42 | (structure) |
| 43 | (structure) |
| 44 | (structure) |

TABLE 12

| No. | Structural formula |
|---|---|
| 45 | |
| 46 | |

Diazotization of the compound represented by the formula (10) is carried out by a method that is known per se, and is carried out, for example, by using a nitrous acid salt, for example, a nitrous acid alkali-metal salt such as sodium nitrite, in an inorganic acid medium at a temperature of, for example, −5° C. to 30° C., and preferably 0° C. to 15° C.

Coupling of the diazotization product of the compound represented by the formula (10) and the compound represented by the formula (11) is also carried out under conditions that are known per se. It is advantageous to carry out the coupling in water or an aqueous organic medium at a temperature of, for example, −5° C. to 30° C., and preferably 0° C. to 25° C., and at a pH value ranging from acidic to neutral, for example, at pH 1 to 6. Since the diazotization-reaction liquid is acidic and the reaction system becomes further acidified as a result of the progress of the coupling reaction, adjustment of the pH value of the reaction liquid to preferred pH conditions is carried out by the addition of a base. As the base, for example, an alkali-metal hydroxide such as lithium hydroxide or sodium hydroxide; an alkali-metal carbonate such as lithium carbonate, sodium carbonate, or potassium carbonate; an acetic acid salt such as sodium acetate; ammonia; or an organic amine can be used.

The compound represented by the formula (10) and the compound represented by the formula (11) are used in near-stoichiometric amounts.

Diazotization of the compound represented by the formula (12) is carried out by a method that is known per se, and is carried out, for example, by using a nitrous acid salt, for example, a nitrous acid alkali-metal salt such as sodium nitrite, in an inorganic acid medium at a temperature of, for example, −5° C. to 40° C., and preferably 5° C. to 30° C.

Coupling between the diazotization product of the compound represented by the formula (12) and the compound represented by the formula (13) is also carried out under conditions that are known per se. It is advantageous to carry out the reaction in water or an aqueous organic medium at a temperature of, for example, −5° C. to 40° C., and preferably 10° C. to 30° C., and at a pH value ranging from acidic to neutral, for example, at pH 2 to 7. Since the diazotization reaction liquid is acidic, and the reaction system becomes further acidified by the progress of the coupling reaction, adjustment of the pH value of the reaction liquid to preferred conditions is carried out by the addition of a base. Regarding the base, the same bases as those described above can be used. The compound represented by the formula (12) and the compound represented by the formula (13) are used in near-stoichiometric amounts.

Diazotization of the compound represented by the formula (14) is carried out by a method that is known per se, and is carried out, for example, by using a nitrous acid salt, for example, a nitrous acid alkali-metal salt such as sodium nitrite in an inorganic acid medium at a temperature of, for example, −5° C. to 50° C., and preferably 5° C. to 40° C.

Coupling of the diazotization product of the compound represented by the formula (14) and the compound represented by the formula (15) is also carried out under conditions that are known per se. It is advantageous to carry out the reaction in water or an aqueous organic medium at a temperature of, for example, −5° C. to 50° C., and preferably 10° C. to 40° C., and at a pH value ranging from acidic to neutral, for example, at pH 2 to 7. Since the diazotization reaction liquid is acidic, and the reaction system becomes further acidified as the coupling reaction progresses, adjustment of the pH value of the reaction liquid to preferred pH conditions is carried out by the addition of a base. Regarding the base, the same bases as those described above can be used. The compound represented by the formula (14) and the compound represented by the formula (15) are used in near-stoichiometric amounts.

Diazotization of the compound represented by the formula (16) is carried out by a method that is known per se, and is carried out, for example, by using a nitrous acid salt, for example, a nitrous acid alkali-metal salt such as sodium nitrite in an inorganic acid medium at a temperature of, for example, −5° C. to 50° C., and preferably 10° C. to 40° C.

Coupling of the diazotization product of the compound represented by the formula (16) and the compound represented by the formula (17) is also carried out under conditions that are known per se. It is advantageous to carry out the reaction in water or an aqueous organic medium at a temperature of, for example, −5° C. to 50° C., and preferably 10° C. to 40° C., and at a pH value ranging from weakly acidic to alkaline. The reaction is carried out preferably at a pH value ranging from weakly acidic to weakly alkaline, for example, at pH 5 to 10, and adjustment of the pH value is carried out by the addition of a base. Regarding the base, the same bases as those described above can be used. The compound represented by the formula (16) and the compound represented by the formula (17) are used in near-stoichiometric amounts.

The salt of the azo compound represented by the formula (1) is a salt with an inorganic or organic cation. Among them, examples of the salt with an inorganic cation include an alkali-metal salt, an alkaline-earth metal salt, and an ammonium salt, and preferred inorganic salts include salts of lithium, sodium, and potassium, and ammonium salts. Furthermore, examples of the salt with an organic cation include salts with quaternary ammonium ions represented by the following formula (18), but the relevant salts are not intended to be limited to these. Furthermore, free acids of the azo compound of the present invention, tautomers thereof, and various salts of the free acids and the tautomers may also be used. For example, any combinations such as a mixture of a sodium salt and an ammonium salt, a mixture of a free acid and a sodium salt, and a mixture of a lithium salt, a sodium salt and an ammonium salt, may also be used. Different kinds of salt may give different property values such as solubility, and a mixture having properties that serve the purpose can be obtained by selecting an appropriate kind of salt as necessary, or in the case where plural salts and the like are included, by changing the ratio of the salts.

(18)

In the formula (18), $Z^1$, $Z^2$, $Z^3$, and $Z^4$ each independently represent a group selected from the group consisting of a hydrogen atom, an unsubstituted alkyl group, a hydroxyalkyl group, and a hydroxyalkoxyalkyl group, and at least one of them is a group other than a hydrogen atom. Specific examples of the alkyl group for $Z^1$ to $Z^4$ in the formula (18) include a methyl group, an ethyl group, an n-propyl group, an isopropyl group, an n-butyl group, an isobutyl group, a sec-butyl group, and a tert-butyl group. Specific examples of the hydroxyalkyl group include hydroxy-(C1-C4) alkyl groups such as a hydroxymethyl group, a hydroxyethyl group, a 3-hydroxypropyl group, a 2-hydroxypropyl group, a 4-hydroxybutyl group, a 3-hydroxybutyl group, and a 2-hydroxybutyl group. Specific examples of the hydroxyalkoxyalkyl group include hydroxy-(C1-C4) alkoxy-(C1-C4) alkyl groups such as a hydroxyethoxymethyl group, a 2-hydroxyethoxyethyl group, a 3-hydroxyethoxypropyl group, a 2-hydroxyethoxypropyl group, a 4-hydroxyethoxybutyl group, a 3-hydroxyethoxybutyl group, and a 2-hydroxyethoxybutyl group. Among these, a hydroxyethoxy-(C1-C4) alkyl is preferred. Particularly preferred examples include a hydrogen atom; a methyl group; a hydroxyl-(C1-C4) alkyl group such as a hydroxymethyl group, a hydroxyethyl group, a 3-hydroxypropyl group, a 2-hydroxypropyl group, a 4-hydroxybutyl group, a 3-hydroxybutyl group, or a 2-hydroxybutyl group; and a hydroxyethoxy-(C1-C4) alkyl group such as a hydroxyethoxymethyl group, a 2-hydroxyethoxyethyl group, a 3-hydroxyethoxypropyl group, a 2-hydroxyethoxypropyl group, a 4-hydroxyethoxybutyl group, a 3-hydroxyethoxybutyl group, or a 2-hydroxyethoxybutyl group.

Specific examples of the combination of $Z^1$, $Z^2$, $Z^3$, and $Z^4$ in a preferred compound represented by formula (18) will be disclosed in the following Table 13.

TABLE 13

| Compound No. | $Z^1$ | $Z^2$ | $Z^3$ | $Z^4$ |
|---|---|---|---|---|
| 1-1 | H | CH3 | CH3 | CH3 |
| 1-2 | CH3 | CH3 | CH3 | CH3 |
| 1-3 | H | —C2H4OH | —C2H4OH | —C2H4OH |
| 1-4 | CH3 | —C2H4OH | —C2H4OH | —C2H4OH |
| 1-5 | H | —CH2CH(OH)CH3 | —CH2CH(OH)CH3 | —CH2CH(OH)CH3 |
| 1-6 | CH3 | —CH2CH(OH)CH3 | —CH2CH(OH)CH3 | —CH2CH(OH)CH3 |
| 1-7 | H | —C2H4OH | H | —C2H4OH |
| 1-8 | CH3 | —C2H4OH | H | —C2H4OH |
| 1-9 | H | —CH2CH(OH)CH3 | H | —CH2CH(OH)CH3 |
| 1-10 | CH3 | —CH2CH(OH)CH3 | H | —CH2CH(OH)CH3 |

TABLE 13-continued

| Compound No. | $Z^1$ | $Z^2$ | $Z^3$ | $Z^4$ |
|---|---|---|---|---|
| 1-11 | CH3 | —C2H4OH | CH3 | —C2H4OH |
| 1-12 | CH3 | —CH2CH(OH)CH3 | CH3 | —CH2CH(OH)CH3 |

Examples of the method for synthesizing a desired salt of the azo compound represented by the formula (1) of the present invention include a method of adding a desired inorganic salt or an organic quaternary ammonium salt to the reaction liquid after completion of the final process in the synthesis reaction for the compound represented by the formula (1), and performing salting-out; and a method of isolating the azo compound in a free acid form from the reaction liquid by adding a mineral acid such as hydrochloric acid to the reaction liquid, subsequently washing the free acid thus obtained with water, acidic water, an aqueous organic medium, or the like as necessary, removing impurities such as attached inorganic salts, adding a desired inorganic base or an organic base corresponding to the aforementioned quaternary ammonium salt to the free acid again in an aqueous medium (preferably, in water), and thereby forming a salt. By means of such a method, a desired salt of the azo compound can be obtained in the state of a solution or a precipitated solid. Here, "acidic water" means water acidified by dissolving, for example, a mineral acid such as sulfuric acid or hydrochloric acid, or an organic acid such as acetic acid, in water. Furthermore, the aqueous organic medium means a mixture of water with an organic substance and/or an organic solvent, all of which are miscible with water. Examples of this organic substance and this organic solvent that are miscible with water include water-soluble organic solvents that will be described below.

Examples of the inorganic salt that is used when the azo compound represented by the formula (1) is converted to a desired salt include halide salts of alkali metals, such as lithium chloride, sodium chloride, and potassium chloride; carbonates of alkali metals such as lithium carbonate, sodium carbonate, and potassium carbonate; hydroxides of alkali metals, such as lithium hydroxide, sodium hydroxide, and potassium hydroxide; halide salts of ammonium ion, such as ammonium chloride and ammonium bromide; and hydroxides of ammonium ion, such as ammonium hydroxide (aqueous ammonia). Furthermore, examples of the salts of organic cations include, for example, halide salts of the quaternary ammonium ion represented by the formula (18), such as diethanolamine hydrochloride and triethanolamine hydrochloride.

<Ink Composition>

The ink composition of the present invention is described. The ink composition of the present invention contains an azo compound (A) that contains a structure represented by the formula (3), a structure represented by the formula (4), and a structure represented by the formula (5) in one molecule. This skeleton has high ozone gas resistance and therefore does not easily degrade; and this skeleton yields excellent color development and therefore gives high print density. For these reasons, the azo compound used in the ink composition of the present invention is not particularly limited provided that it has the skeletons represented by the formulas (3) to (5) within the molecule, regardless of whether the skeletons represented by the formulas (3) to (5) are directly bonded together or bonded with other group(s) sandwiched therebetween. The ozone resistance and the color development properties are attributed to the fundamental skeletons of the formulas (3) to (5), and therefore these structures may have an additional functional group thereon.

It is preferable that the azo compound used in the ink composition of the present invention have four or five azo bonds (—N═N—) within the molecule, particularly preferably four azo bonds. This is because expansion of conjugation is necessary for high print density of a black ink, which is an important ink for inkjet printing. In the case in which the black azo compound has an expanded conjugation and has the skeletons represented by the formulas (3) to (5), the black azo compound may have an improved ozone-gas resistance as well.

It is preferable that the azo compound (A) containing the structures represented by the formulas (3) to (5) in one molecule be an azo compound represented by the formula (6). The diazo compound (A) represented by the formula (6) may be obtained by the same method as that described regarding the formula (1). The azo compound may be present in a state of a tautomer or a salt, and the azo compound represented by the formula (6) collectively refers to the tautomer or the salt as well. Examples of the tautomer include structures represented by the following formulas (19) and (20). In the formulas (19) and (20), $R^1$ to $R^{13}$ and $R^{16}$ have the same meanings as defined in the formula (6).

(19)

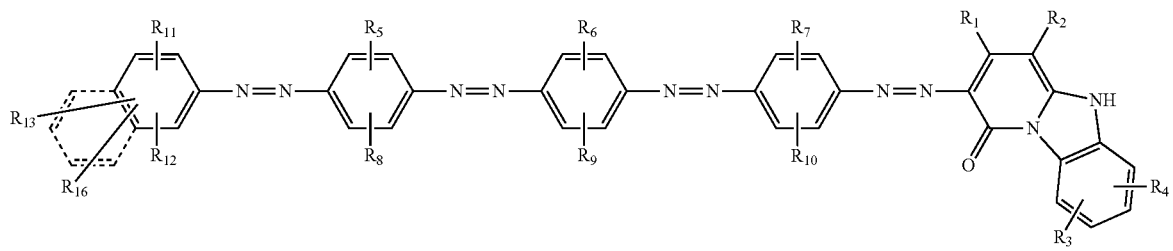

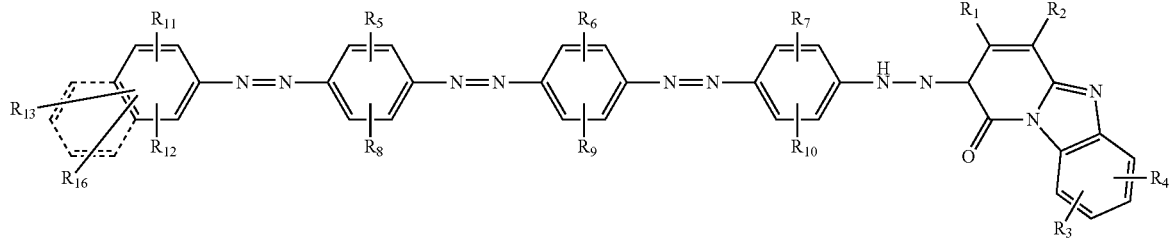
(20)

As the azo compound (A) containing the structures represented by the formulas (3) to (5) in one molecule, the azo compound represented by the formula (1) described above, a tautomer thereof, or a salt of the azo compound or the tautomer is preferable.

The ink composition of the present invention can dye a material formed from cellulose, when formulated into an aqueous composition containing the azo compound (A). Furthermore, the azo compound is also capable of dyeing a material having a carbonamide bond, and can be widely used in the dyeing of leather, fabric, paper, and the like. On the other hand, a representative method of using the compound of the present invention may involve an ink composition obtained by dissolving the compound in a liquid medium, and it is preferable to use the compound as an ink composition for inkjet recording.

A reaction liquid containing the compound represented by the formulas (3) to (5), for example, the reaction liquid obtained after completion of the final process in the synthesis reaction for the compound represented by the formula (1) or (6), can be directly used in the preparation of an ink composition. Alternatively, the compound is isolated from the reaction liquid according to a method such as a method of drying, for example, spray drying the reaction liquid; a method of performing salting-out by adding an inorganic salt such as sodium chloride, potassium chloride, calcium chloride, or sodium sulfate to the reaction liquid; a method of performing acid-out by adding a mineral acid such as hydrochloric acid, sulfuric acid, or nitric acid to the reaction liquid; or a method of performing acid-salting-out combining the salting-out process and the acid-out process, and an ink composition can be prepared by using this compound. The azo compound of the present invention is preferably used after being isolated.

The ink composition of the present invention is an aqueous ink composition containing the azo compound (A) containing the structures (3) to (5), for example, the azo compound represented by the formula (1) or (6) as a coloring matter, in an amount of usually 0.1% to 20% by mass, preferably 1% to 10% by mass, and more preferably 2% to 8% by mass. The ink composition of the present invention is prepared by using water as a medium, and if necessary, the ink composition may contain a water-soluble organic solvent or an ink preparation agent insofar as the effect of the present invention is not impaired. The water-soluble organic solvent may function as a coloring matter solubilizing agent, a drying-preventing agent (wetting agent), a viscosity-adjusting agent, a penetration enhancer, a surface tension-adjusting agent, a defoamant, or the like, and the water-soluble organic solvent is preferably included in the ink composition of the present invention. Examples of the ink preparation agent include known additives such as a preservative and fungicide, a pH-adjusting agent, a chelating agent, an antirusting agent, a water-soluble ultraviolet absorber, a water-soluble polymer compound, a coloring matter-solubilizing agent, an an antioxidant, and a surfactant. The ink composition of the present invention may contain the water-soluble organic solvent in an amount of 0% to 30% by mass, and preferably 5% to 30% by mass, and the ink preparation agent in an amount of 0% to 15% by mass, and preferably 0% to 7% by mass, all relative to the total mass of the ink composition. The remaining portion excluding the components described above is water. In addition, the pH of the ink composition is preferably pH 5 to 11, and more preferably pH 7 to 10, from the viewpoint of enhancing storage stability. Furthermore, the surface tension of the ink composition is preferably 25 mN/m to 70 mN/m, and more preferably 25 mN/m to 60 mN/m. Also, the viscosity of the ink composition is preferably 30 mPa·s or less, and more preferably 20 mPa·s or less.

The ink composition of the present invention may appropriately contain other coloring matters for color mixing in addition to the azo compound of the present invention, for the purpose of adjusting the subtle tinge of black color. Even in this case, the total mass of the coloring matters included in the ink composition of the present invention may be in the range described above relative to the total mass of the ink composition. Examples of the coloring matters for color mixing include other coloring matters having various hues such as yellow (for example, C.I. Direct Yellow 34, C.I. Direct Yellow 58, C.I. Direct Yellow 86, C.I. Direct Yellow 132, and C.I. Direct Yellow 161), orange (for example, C.I. Direct Orange 17, C.I. Direct Orange 26, C.I. Direct Orange 29, C.I. Direct Orange 39, and C.I. Direct Orange 49), brown, scarlet (for example, C.I. Direct Red 89), red (for example, C.I. Direct Red 62, C.I. Direct Red 75, C.I. Direct Red 79, C.I. Direct Red 80, C.I. Direct Red 84, C.I. Direct Red 225, and C.I. Direct Red 226), magenta (for example, C.I. Direct Red 227), violet, blue, navy, cyan (for example, C.I. Direct Blue 199 and C.I. Acid Blue 249), green (for example, Acid Green 1), and black (for example, C.I. Acid Black 2). The ink composition of the present invention can be used after having one or more kinds of these coloring matters for color mixing incorporated therein, insofar as the effect obtainable by the azo compound of the present invention is not impaired. Even in this case, the total amount of coloring matter that is included in the ink composition may be in the range described above. Furthermore, the mixing ratio of the azo compound of the present invention and the coloring matters for color mixing may depend on the hues of the coloring matters for color mixing, and the like, but the mixing ratio is approximately from 20:1 to 1:2, and preferably from 10:1 to 1:1.

When the ink composition of the present invention is used as an ink for inkjet recording, it is preferable to use an ink composition having a reduced content of inorganic impurities such as chlorides and sulfates of metal cations in the azo compound of the present invention. The criterion for the content of inorganic impurities is roughly about 1% by mass or less relative to the total mass of the coloring matters. The lower limit is desirably equal to or less than the detection limit of the analytical instrument, that is, 0%. In order to produce an azo compound of the present invention having a reduced amount of inorganic impurities, for example, a desalination treatment may be carried out by a known method such as a method of using a reverse-osmosis membrane; or a method of performing suspension purification by stirring a dried product or wet cake of the azo compound of the present invention in an alcohol such as methanol, and preferably a mixed solvent of a (C1-C4) alcohol and water, separating precipitate by filtration, and then drying the precipitate.

Specific examples of the water-soluble organic solvent that can be used in the preparation of the ink composition of the present invention include, for example, (C1-C4) alcohols such as methanol, ethanol, propanol, isopropanol, butanol, isobutanol, secondary butanol, and tertiary butanol; carboxylic acid amides such as N,N-dimethylformamide and N,N-dimethylacetamide; lactams such as 2-pyrrolidone, hydroxyethyl-2-pyrrolidone, N-methyl-2-pyrrolidone, and N-methylpyrrolidin-2-one; cyclic ureas such as 1,3-dimethylimidazolidin-2-one and 1,3-dimethylhexahydropyrimid-2-one; ketones or keto-alcohols such as acetone, methyl ethyl ketone, and 2-methyl-2-hydroxypentan-4-one; cyclic ethers such as tetrahydrofuran and dioxane; mono-, oligo-, or polyalkylene glycols or thioglycols having C2-C6 alkylene units, such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thiodiglycol, and dithiodiglycol; polyols (preferably, triols) such as trimethylolpropane, glycerin, and hexane-1,2,6-triol; C1-C4 alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, and triethylene glycol monoethyl ether; γ-butyrolactone; dimethyl sulfoxide; and the like. These organic solvents may be used singly, or two or more kinds may be used in combination. Meanwhile, the water-soluble organic solvents described above include substances that are solid at normal temperature, such as trimethylolpropane; however, since these exhibit water-solubility even when they are solid, and can be used, when dissolved in water, for the same purpose as that of the water-soluble organic solvent, for convenience the solid substances are described to be within the scope of the water-soluble organic solvent in the present invention.

Hereinafter, the preservative and fungicide, pH-adjusting agent, chelating agent, antirusting agent, water-soluble ultraviolet absorber, water-soluble polymer compound, coloring matter-solubilizing agent, antioxidant, and surfactant, which are all used as the ink preparation agent, will be described.

Examples of the fungicide include sodium dehydroacetate, sodium benzoate, sodium pyridinethion-1-oxide, p-hydroxybenzoic acid ethyl ester, 1,2-benzisothiazolin-3-one and salts thereof, and the like. These are preferably used in an amount of 0.02% to 1.00% by mass in the ink composition.

Examples of the preservative include organic sulfur-based, organic nitrogen sulfur-based, organic halogen-based, haloallylsulfone-based, iodopropargyl-based, N-haloalkylthio-based, nitrile-based, pyridine-based, 8-oxyquinoline-based, benzothiazole-based, isothiazoline-based, dithiol-based, pyridine oxide-based, nitropropane-based, organotin-based, phenolic, quaternary ammonium salt-based, triazine-based, thiazine-based, anilide-based, adamantane-based, dithiocarbamate-based, brominated indanone-based, benzylbromacetate-based, inorganic salt-based compounds, and the like.

Specific examples of the organic halogen-based compounds include, for example, pentachlorophenol sodium, and specific examples of the pyridine oxide-based compounds include, for example, sodium 2-pyridinethiol-1-oxide. Specific examples of the isothiazoline-based compounds include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 5-chloro-2-methyl-4-isothiazolin-3-one calcium chloride, and 2-methyl-4-isothiazolin-3-one calcium chloride. Other specific examples of the preservative and fungicide include anhydrous sodium acetate, sodium sorbate, and sodium benzoate.

Regarding the pH-adjusting agent, any substance that does not have an adverse effect on the ink to be prepared and that is capable of controlling the pH of the ink to approximately the range of 5 to 11 can be used. Specific examples thereof include, for example, alkanolamines such as diethanolamine, triethanolamine, and N-methyldiethanolamine; alkali-metal hydroxides such as lithium hydroxide, sodium hydroxide, and potassium hydroxide; ammonium hydroxide (aqueous ammonia); alkali-metal carbonates such as lithium carbonate, sodium carbonate, sodium hydrogen carbonate, and potassium carbonate; alkali-metal salts of organic acids, such as potassium acetate; inorganic bases such as sodium silicate and disodium phosphate, and the like.

Specific examples of the chelating agent include, for example, sodium ethylenediaminetetraacetate, sodium nitrilotriaceate, sodium hydroxyethylethylenediaminetriacetate, sodium diethylenetriaminepentaacetate, sodium uracil diacetate, and the like.

Examples of the antirusting agent include, for example, acidic sulfurous acid salts, sodium thiosulfate, ammonium thioglycolate, diisopropylammonium nitrite, pentaerythritol tetranitrate, dicyclohexylammonium nitrite, and the like.

Examples of the water-soluble ultraviolet absorber include, for example, sulfonated benzophenone-based compounds, benzotriazole-based compounds, salicylic acid-based compounds, cinnamic acid-based compounds, and triazine-based compounds.

Examples of the water-soluble polymer compound include polyvinyl alcohol, cellulose derivatives, polyamine, polyimine, and the like.

Examples of the color-solubilizing agent include, for example, ε-caprolactam, ethylene carbonate, urea, and the like.

As the antioxidant, for example, various organic and metal complex-based discoloration preventing agents may be used. Examples of the organic discoloration-preventing agents include hydroquinones, alkoxyphenols, dialkoxyphenols, phenols, anilines, amines, indanes, chromanes, alkoxyanilines, heterocycles, and the like.

Examples of the surfactant include known surfactants such as anionic, cationic, nonionic surfactants and the like.

Examples of anionic surfactants include alkylsulfonic acid salts, alkylcarboxylic acid salts, α-olefinsulfonic acid salts, polyoxyethylene alkyl ether acetic acid salts, N-acylamino acids and salts thereof, N-acylmethyltaurine salts, alkylsulfate polyoxyalkyl ether sulfuric acid salts, alkylsulfate polyoxyethylene alkyl ether phosphoric acid salts, rosin acid soaps, castor oil sulfate ester salts, lauryl alcohol sulfate ester salts, alkylphenolic phosphate esters, alkylated phosphate esters, alkylaryl sulfonic acid salts, diethyl sulfosuccinic acid salts, diethylhexyl sulfosuccinic acid salts, dioctyl sulfosuccinic acid salts, and the like.

Examples of cationic surfactants include 2-vinylpyridine derivatives, poly-4-vinylpyridine derivatives, and the like.

Examples of amphoteric surfactants include lauryldimethylamino acetate betaine, 2-alkyl-N-carboxymethyl-N-hydroxyethylimidazolinium betaine, coconut oil fatty acid amidepropyldimethylamino acetate betaine, polyoctyl polyaminoethylglycine, imidazoline derivatives, and the like.

Examples of nonionic surfactants include ethers such as polyoxyethylene nonyl phenyl ether, polyoxyethylene octyl phenyl ether, polyoxyethylene dodecyl phenyl ether, polyoxyethylene oleyl ether, polyoxyethylene lauryl ether, and polyoxyethylene alkyl ether; esters such as polyoxyethylene oleic acid esters, polyoxyethylene distearic acid esters, sorbitan laurate, sorbitan monostearate, sorbitan monooleate, sorbitan sesquioleate, polyoxyethylene monooleate, and polyoxyethylene stearate; acetylene glycols (alcohols) such as 2,4,7,9-tetramethyl-5-decyne-4,7-diol, 3,6-dimethyl-4-octyne-3,6-diol, 3,5-dimethyl-1-hexyn-3-ol; trade name: Surfynol 104, 105, 82, and 465, and Olfine STG, manufactured by Nissin Chemical Industry Co., Ltd.; and polyglycol ethers (for example, Tergitol 15-S-7 and the like manufactured by Sigma-Aldrich Co.); and the like. The ink preparation agents described above are used singly or as mixtures.

The ink composition of the present invention is obtained by mixing the various components described above in an arbitrary order and stirring the mixture. The ink composition thus obtained may be subjected to precise filtration with a membrane filter or the like in order to eliminate contaminants, as desired, and if the ink composition is to be used in inkjet recording, it is preferable to carry out the filtration. The pore size of the filter to carry out precise filtration is usually 1 μm to 0.1 μm, and preferably 0.8 μm to 0.1 μm.

The ink composition of the present invention can be used in various fields, but is suitable for aqueous writing inks, aqueous printing inks, information recording inks, and the like. It is particularly preferable to use the ink composition as an ink for inkjet recording, and the ink composition is suitably used in the inkjet recording method of the present invention that will be described below.

<Inkjet Recording Method>

The inkjet recording method of the present invention described above is a method of using the ink composition of the present invention as an ink, performing recording by discharging droplets of the ink according to the recording signals, and attaching the ink droplets to a record-receiving material. In the inkjet recording method of the present invention, there are no particular limitations on the ink head, ink nozzles, and the like that are used at the time of recording, and those can be appropriately selected according to the purpose. This recording method can be carried out by using a known method, for example, a charge-control system that discharges ink by utilizing an electrostatic attraction force; a drop-on-demand system (pressure pulse system) that utilizes the vibration pressure of a piezoelectric element; an acoustic inkjet system that converts electrical signals into acoustic beams, irradiates ink with the beams, and discharges the ink by utilizing radiation pressure; and a thermal inkjet (BUBBLEJET (registered trademark)) system that heats ink to form bubbles and utilizes the pressure resulting therefrom.

There are no particular limitations on the record-receiving material that is used in the inkjet recording method of the present invention, but examples thereof include communication sheets such as paper and films; fabrics or cloths (cellulose, nylon, wool, and the like), leather, and base materials for color filter, and among them, communication sheets are preferred. Regarding these communication sheets, a sheet that has been surface treated, specifically, a base material such as paper, a synthetic paper, or a film provided with an ink-receiving layer, is preferred. The ink-receiving layer is provided by a method such as, for example, impregnating or coating the base material described above with a cationic polymer; or applying a porous white inorganic substance capable of absorbing the coloring matters in the ink, such as porous silica, an alumina sol, or a special ceramic, together with a hydrophilic polymer such as polyvinyl alcohol or polyvinylpyrrolidone, to the surface of the base material. A communication sheet provided with such an ink-receiving layer is usually called a paper (film) for inkjet exclusive use, a glossy paper (film), or the like. Specific examples thereof include trade names: PROFESSIONAL PHOTO PAPER, SUPER PHOTO PAPER, and MATTE PHOTO PAPER, all manufactured by Canon, Inc.; trade names: PHOTO PAPER (GLOSSY), PM MATTE PAPER, and CRISPIA, all manufactured by Seiko Epson Corp.; and trade names: ADVANCE PHOTO PAPER, PREMIUM PLUS PHOTO PAPER, and PREMIUM GLOSSY FILM or PHOTO PAPER, all manufactured by Hewlett-Packard Japan, Ltd., and these can be purchased as commercially available products. In addition, plain paper also can be used without any problem.

Among the communication sheets described above, it is known that an image recorded on a sheet coated with a porous white inorganic substance on the surface particularly undergoes discoloration and fading to a large extent due to ozone gas. However, since the ink composition of the present invention has excellent ozone-gas resistance, the ink composition exhibits a significant effect even when used for inkjet recording on such a record-receiving material.

In order to perform recording on a record-receiving material by the inkjet recording method of the present invention, for example, a vessel containing the ink composition described above is attached at a predetermined position of an inkjet printer, and recording may be performed on the record-receiving material by the method described above. The inkjet recording method of the present invention can use the black ink composition of the present invention in combination with ink compositions of various colors such as, for example, known magenta, cyan and yellow such as described above, and optionally, green, blue (or violet), and red (or orange). The ink compositions of each color are filled in each of the vessels, respectively, and each of the vessels is loaded on prescribed position of an ink jet printer similarly to the vessel containing the black ink composition of the present invention, and used for ink jet recording.

<Colored Material>

The colored material of the present invention means a material colored with any one of the following three [three of these items a) to c)]:

a) the azo compound, the tautomer thereof, or the salt of the azo compound or the tautomer according to any one of the first to sixth aspects;

b) the aqueous ink composition according to any one of the seventh to eleventh aspects; or c) the inkjet recording method according to the fourteenth aspect. There are no particular limitations on the material to be colored, but preferred examples thereof include the record-receiving materials used in the above-described inkjet recording method.

The azo compound of the present invention is a black coloring matter. This compound can be easily synthesized and is inexpensive, and since this compound has the feature of low color saturation, the compound exhibits a more preferred hue as black. Furthermore, since the compound has excellent water-solubility, the compound has satisfactory filterability through a membrane filter in the process for preparing an ink composition. Furthermore, the ink composition of the present invention containing the azo compound is an aqueous black ink composition, and the ink composition does not exhibit solid precipitation, change of properties, color change, or the like even after long-term storage, and has satisfactory storage stability. The image recorded with the ink composition of the present invention exhibits extremely excellent ozone-gas resistance, high print density, excellent bronzing properties, low color-rendering properties, and low color saturation, and has a high-quality black hue. The image is also excellent in various fastness properties such as light resistance, moisture resistance, and water resistance. Furthermore, when used in combination with ink compositions respectively containing magenta, cyan and yellow coloring matters, full-color inkjet recording with various fastness properties that are excellent, and excellent storage properties can be achieved. As such, since an ink composition containing the azo compound of the present invention can be used as an ink for inkjet recording or handwriting, and also exhibits excellent discharge stability, the ink composition is suitable as an ink for inkjet recording in particular.

EXAMPLES

Hereinafter, the present invention will be specifically described by way of Examples, but the present invention is not intended to be limited by the following Examples. Herein, unless particularly stated otherwise, the units "parts" and "percent (%)" are on a mass basis. Unless particularly stated otherwise, various operations such as synthesis reactions and crystallization were all carried out under stirring. In the various formulas described below, acidic functional groups such as sulfo and carboxy are indicated in the form of free acids. The pH values and reaction temperatures in the synthesis reactions all represent measured values in the reaction systems. Furthermore, the maximum absorption wavelengths (λmax) of the compounds synthesized were measured in an aqueous solution at pH 7 to 8, and for the compounds thus measured, their measured values are described in the Examples. In addition, the azo compounds of the present invention synthesized in the following Examples all exhibited a solubility in water of 100 g/liter or higher.

(A) Synthesis of Dyes

Example 1

(Step 1)

18.4 parts of cyanuric chloride and 0.1 parts of trade name: LEOCOL TD-50 were added to 200 parts of ice water, followed by stirring at 10° C. or less for 30 minutes. Then, 31.7 parts of 2,5-disulfoaniline (a commercially available 88.4%-pure product was used) was added thereto, followed by reaction at 0° C. to 10° C. for 2 hours with the pH being adjusted to pH 2.8 to 3.0 with the use of a 10% aqueous solution of sodium hydroxide and then at 25° C. to 30° C. for 1 hour with the pH being adjusted to pH 2.8 to 3.0. To the resulting reaction liquid, 16.9 parts of 4-chloro-3-nitroaniline was added, followed by reaction at 40° C. to 45° C. for 2 hours with the pH being adjusted to pH 5.0 to 5.5 with the use of a 10% aqueous solution of sodium hydroxide. To the resulting reaction liquid, 18.8 parts of 2-aminoethanesulfonic acid was added, followed by reaction at 70° C. to 80° C. for 3 hours with the pH being adjusted to pH 7.0 to 7.5 with the use of a 10% aqueous solution of sodium hydroxide. At that time, the amount of the liquid was 600 parts. To this liquid, 120 parts of sodium chloride was added, followed by stirring for 30 minutes. Subsequently, the solid thus precipitated out was filtered, and thereby 193 parts of wet cake containing a compound represented by the following formula (21) was obtained.

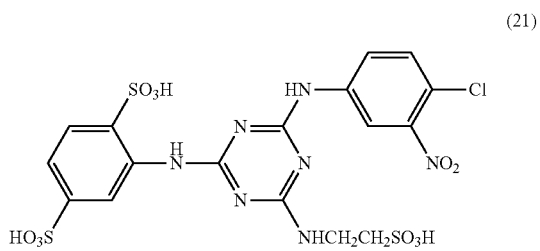

(21)

(Step 2)

193 parts of the wet cake containing the compound represented by the formula (21) obtained in the step 1 was dissolved in 90 parts of N-methyl-2-pyrrolidone, and to the resulting mixture, 19.1 parts of sodium 3-mercaptopropanesulfonate and 15.2 parts of potassium carbonate were added. After the addition, the resulting mixture was heated to 100° C. to 110° C., followed by reaction at that temperature for 2 hours. After the reaction liquid was cooled to 60° C., 150 parts of water was added thereto, followed by addition of 35% hydrochloric acid to achieve pH 1.0 to 1.5. At that time, the amount of the liquid was 550 parts. To this liquid, 110 parts of sodium chloride was added, followed by stirring for 30 minutes. Subsequently, the solid thus precipitated out was separated by filtration, and thereby 204 parts of wet cake containing a compound represented by the following formula (22) was obtained.

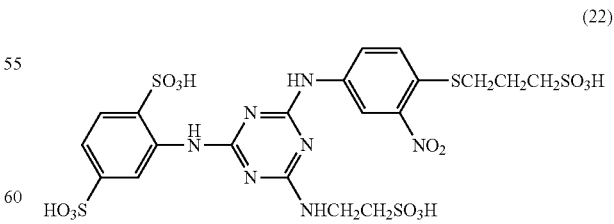

(22)

(Step 3)

204 parts of the wet cake of the compound represented by the formula (22) and obtained in Example 1 (Step 2) described above, 5 parts of activated charcoal, and 0.6 parts of anhydrous iron (III) chloride were added to 150 parts of water. The resultant was heated to 60° C., and subsequently 11.3 parts of 80% hydrazine hydrate was added dropwise thereto over about 30 minutes. The resultant was heated to 90° C., followed by reaction at that temperature for 2 hours. The resultant was cooled to 40° C., and then insoluble matter was removed by filtration, followed by cooling the filtrate to room temperature. By addition of 50% sulfuric acid, the pH was adjusted to pH 1.0 to 1.5. At that time, the amount of the liquid was 625 parts. To this liquid, 125 parts of sodium chloride was added, followed by stirring for 30 minutes. Subsequently, the solid thus precipitated out was separated by filtration, and 98 parts of wet cake containing a compound represented by the following formula (23) was obtained.

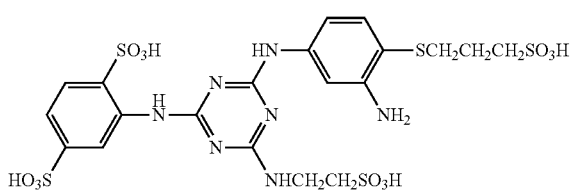

(23)

(Step 4)

12.2 parts of sodium 2-amino-5-nitrobenzenesulfonate represented by the following formula (24) was added to 50 parts of water. Then, a 25% aqueous solution of sodium hydroxide was added thereto to adjust the mixture to pH 4.0 to 5.0. Thus, an aqueous solution was obtained. Thereto, 18.3 parts of 35% hydrochloric acid was added and then 10.5 parts of a 40% aqueous solution of sodium nitrite was added, followed by reaction for about 30 minutes. Thereto, 1.5 parts of sulfamic acid was added, followed by stirring for 5 minutes. Thereby, a diazo reaction liquid was obtained.

On the other hand, 11.0 parts of a compound represented by the following formula (25) and obtained by a method described in PCT International Publication No. WO2012/081640 was added to 100 parts of water. Then, a 25% aqueous solution of sodium hydroxide was added thereto to adjust the mixture to pH 4.0 to 5.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 4.0 to 6.0 with the addition of a 15% aqueous solution of sodium carbonate, and then sodium chloride was added thereto. Subsequently, the solid thus precipitated out was separated by filtration, and thereby 103.8 parts of wet cake containing a compound represented by the following formula (26) was obtained.

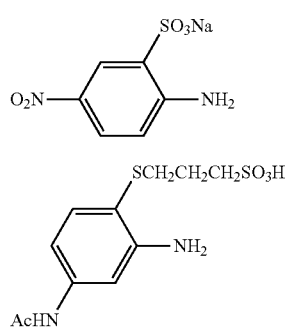

(24)

(25)

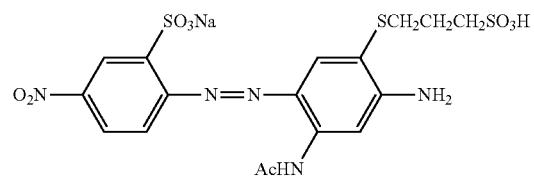

(26)

(Step 5)

The wet cake of the compound represented by the formula (26) and obtained in Example 1 (Step 4) described above as a whole was added to 80 parts of water. Then, a 25% aqueous solution of sodium hydroxide was added thereto to adjust the mixture to pH 6.0 to 7.0. Thus, an aqueous solution was obtained. Thereto, 16.5 parts of 35% hydrochloric acid was added and then 10.6 parts of a 40% aqueous solution of sodium nitrite was added, followed by reaction for about 30 minutes. Thereto, 7.5 parts of sulfamic acid was added, followed by stirring for 5 minutes. Thereby, a diazo reaction liquid was obtained.

On the other hand, 64.7 parts of the wet cake of the compound represented by formula (23) and obtained in Example 1 (Step 3) described above was added to 100 parts of water. Then, a 25% aqueous solution of sodium hydroxide was added thereto to adjust the mixture to pH 4.0 to 5.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 3.5 with the addition of a 15% aqueous solution of sodium carbonate, and then sodium chloride was added thereto. Subsequently, the solid thus precipitated out was separated by filtration, and thereby 104 parts of wet cake containing a compound represented by the following formula (27) was obtained.

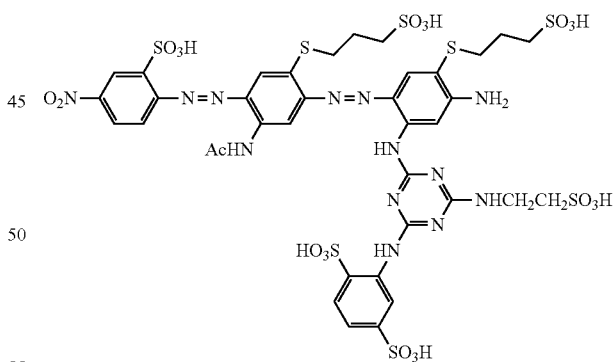

(27)

(Step 6)

52 parts of the wet cake of the compound represented by the formula (27) and obtained in Example 1 (Step 5) described above was added to 100 parts of water, and the compound was dissolved by stirring. 7.8 parts of 35% hydrochloric acid was added thereto, subsequently 2.8 parts of a 40% aqueous solution of sodium nitrite was added thereto, and the mixture was stirred for about 30 minutes. To this, 0.8 parts of sulfamic acid was added, followed by stirring for 5 minutes. Thereby, a diazo reaction liquid was obtained.

On the other hand, 3.7 parts of a compound represented by the following formula (28) and obtained by a method described in Japanese Unexamined Patent Application, Publication No. 2004-083492 was added to 80 parts of water, and a 25% aqueous solution of sodium hydroxide was added thereto to adjust the mixture to pH 6.0 to 7.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 4.5 with the addition of a 15% aqueous solution of sodium carbonate. A 25% aqueous solution of sodium hydroxide was added thereto to adjust the mixture to pH 7.0 to 7.5, and then sodium chloride was added thereto. Subsequently, the solid thus precipitated out was separated by filtration, and thereby 29.5 parts of wet cake containing a compound represented by the following formula (29) was obtained.

On the other hand, 4.4 parts of a compound represented by the following formula (30) and obtained by a method described in PCT International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 21.5 parts of wet cake was obtained. The wet cake thus obtained was dissolved in 40 parts of water, and the pH was adjusted to 7.0 to 7.5 with 35% hydrochloric acid.

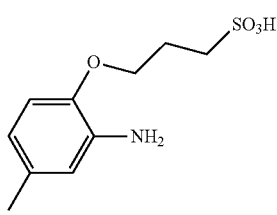

(28)

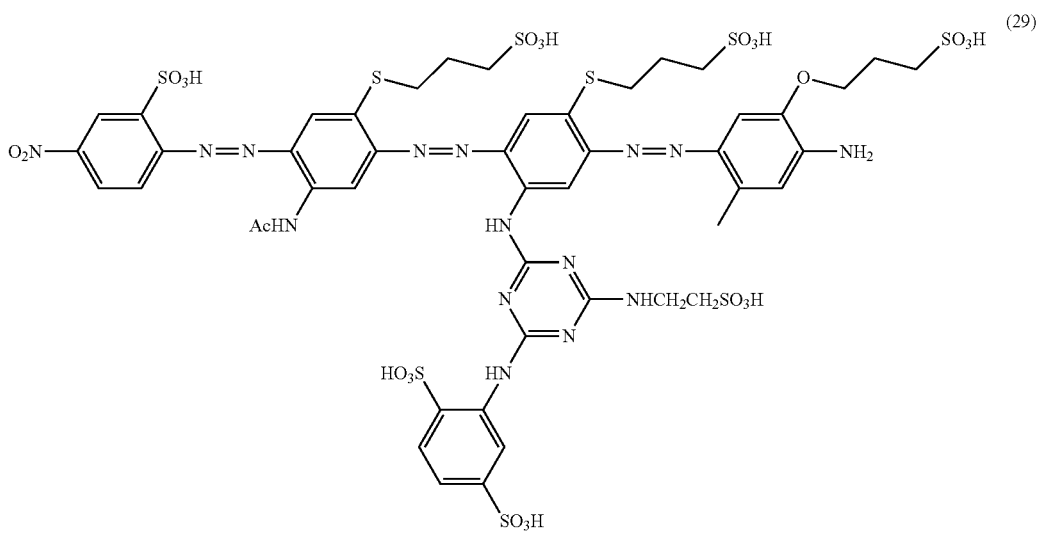

(29)

(Step 7)

29.5 parts of the wet cake of the compound represented by the formula (29) and obtained in Example 1 (Step 6) described above was added to 80 parts of water, and the compound was dissolved by stirring. 6.3 parts of 35% hydrochloric acid was added thereto, subsequently 2.3 parts of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

Subsequently, 400 parts of methanol was added thereto, and the solid thus precipitated out was separated by filtration. The wet cake thus obtained was dissolved again in 40 parts of water, and then 300 parts of methanol was added thereto. A precipitated solid was separated by filtration and dried, and thereby 12.1 parts of a sodium salt of a compound represented by the following formula (31) of the present invention was obtained as black powder. λmax: 597 nm.

(30)

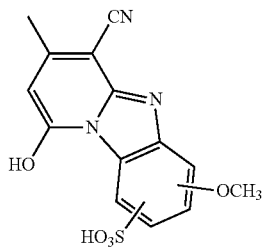

(31)

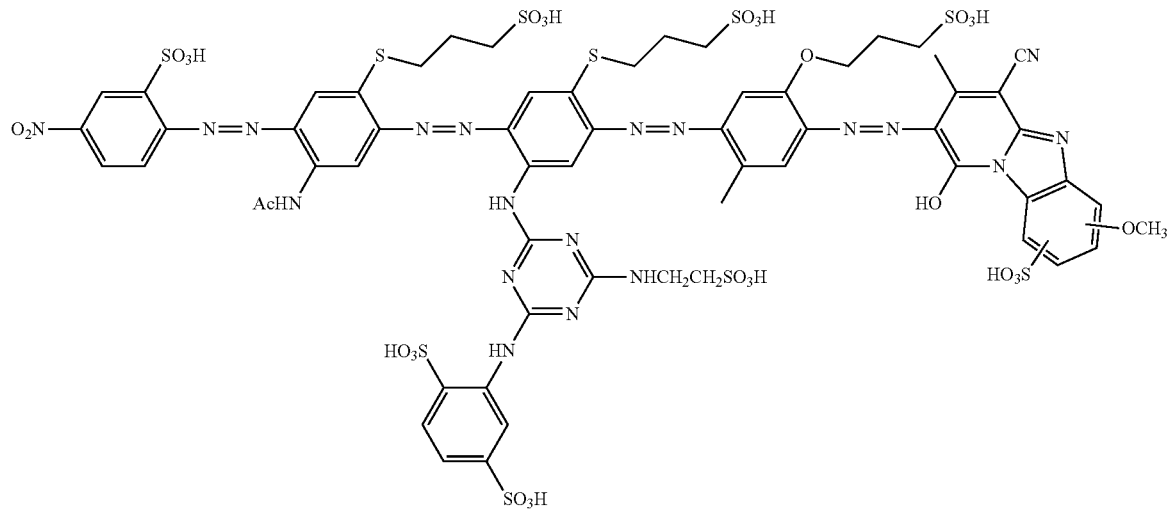

Example 2

(Step 7)

29.5 parts of the wet cake of the compound represented by the formula (29) and obtained in Example 1 (Step 6) described above was added to 80 parts of water, and the compound was dissolved by stirring. 6.3 parts of 35% hydrochloric acid was added thereto, subsequently 2.3 parts of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

On the other hand, 4.0 parts of a compound represented by the following formula (32) and obtained by a method described in PCT International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 21.5 parts of wet cake was obtained. The wet cake thus obtained was dissolved in 40 parts of water, and the pH was adjusted to 7.0 to 7.5 with 35% hydrochloric acid. Subsequently, 400 parts of methanol was added thereto, and the solid thus precipitated out was separated by filtration. The wet cake thus obtained was dissolved again in 40 parts of water, and then 300 parts of methanol was added thereto. A precipitated solid was separated by filtration and dried, and thereby 10.6 parts of a sodium salt of a compound represented by the following formula (33) of the present invention was obtained as black powder. λmax: 597 nm.

(32)

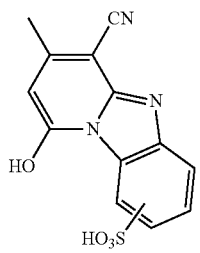

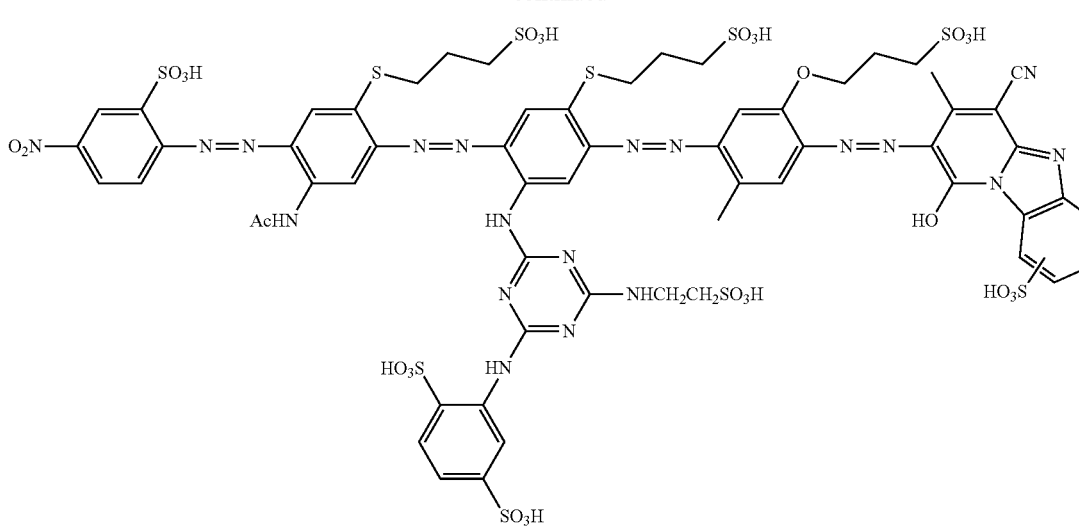

(33)

Example 3

(Step 1)

18.4 parts of cyanuric chloride and 0.1 parts of trade name: LEOCOL TD-50 were added to 200 parts of ice water, followed by stirring at 10° C. or less for 30 minutes. Then, 31.7 parts of 2,5-disulfoaniline (a commercially available 88.4%-pure product was used) was added thereto, followed by reaction at 0° C. to 10° C. for 2 hours with the pH being adjusted to pH 2.8 to 3.0 with the use of a 10% aqueous solution of sodium hydroxide and then at 25° C. to 30° C. for 1 hour with the pH being adjusted to pH 2.8 to 3.0. To the resulting reaction liquid, 16.9 parts of 4-chloro-3-nitroaniline was added, followed by reaction at 40° C. to 45° C. for 2 hours with the pH being adjusted to pH 5.0 to 5.5 with the use of a 10% aqueous solution of sodium hydroxide. To the resulting reaction liquid, 19.6 parts of sodium 3-mercaptopropanesulfonate was added, followed by reaction at 70° C. to 80° C. for 3 hours with the pH being adjusted to pH 7.0 to 7.5 with the use of a 10% aqueous solution of sodium hydroxide. At that time, the amount of the liquid was 600 parts. To this liquid, 120 parts of sodium chloride was added, followed by stirring for 30 minutes. Subsequently, the solid thus precipitated out was filtered, and thereby 181 parts of wet cake containing a compound represented by the following formula (34) was obtained.

(34)

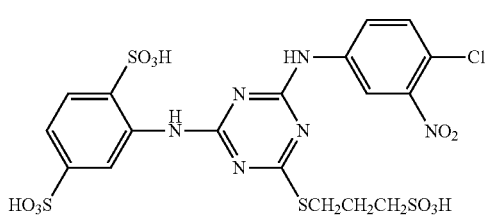

(Step 2)

181 parts of the wet cake containing the compound represented by the formula (34) obtained in the step 1 was dissolved in 90 parts of N-methyl-2-pyrrolidone, and to the resulting mixture, 19.1 parts of sodium 3-mercaptopropanesulfonate and 15.2 parts of potassium carbonate were added. After the addition, the resulting mixture was heated to 100° C. to 110° C., followed by reaction at that temperature for 2 hours. After the reaction liquid was cooled to 60° C., 150 parts of water was added thereto, followed by addition of 35% hydrochloric acid to achieve pH 1.0 to 1.5. At that time, the amount of the liquid was 525 parts. To this liquid, 105 parts of sodium chloride was added, followed by stirring for 30 minutes. Subsequently, the solid thus precipitated out was separated by filtration, and thereby 218 parts of wet cake containing a compound represented by the following formula (35) was obtained.

(35)

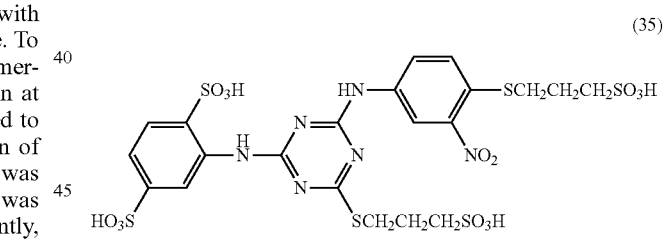

(Step 3)

218 parts of the wet cake of the compound represented by the formula (35) and obtained in Example 3 (Step 2) described above, 5 parts of activated charcoal, and 0.6 parts of anhydrous iron (III) chloride were added to 150 parts of water. The resultant was heated to 60° C., and subsequently 11.3 parts of 80% hydrazine hydrate was added dropwise thereto over about 30 minutes. The resultant was heated to 90° C., followed by reaction at that temperature for 2 hours. The resultant was cooled to 40° C., and then insoluble matter was removed by filtration, followed by cooling the filtrate to room temperature. By addition of 50% sulfuric acid, the pH was adjusted to pH 1.0 to 1.5. At that time, the amount of the liquid was 625 parts. To this liquid, 125 parts of sodium chloride was added, followed by stirring for 30 minutes. Subsequently, the solid thus precipitated out was separated by filtration, and 112 parts of wet cake containing a compound represented by the following formula (36) was obtained.

(36)

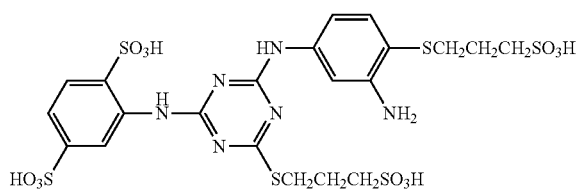

(Step 5)

The wet cake of the compound represented by the formula (26) and obtained in Example 1 (Step 4) described above as a whole was added to 80 parts of water. Then, a 25% aqueous solution of sodium hydroxide was added thereto to adjust the mixture to pH 6.0 to 7.0. Thus, an aqueous solution was obtained. Thereto, 16.5 parts of 35% hydrochloric acid was added and then 10.6 parts of a 40% aqueous solution of sodium nitrite was added, followed by reaction for about 30 minutes. Thereto, 7.5 parts of sulfamic acid was added, followed by stirring for 5 minutes. Thereby, a diazo reaction liquid was obtained.

On the other hand, 73.9 parts of the wet cake of the compound represented by formula (36) and obtained in Example 3 (Step 3) described above was added to 100 parts of water. Then, a 25% aqueous solution of sodium hydroxide was added thereto to adjust the mixture to pH 4.0 to 5.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 3.5 with the addition of a 15% aqueous solution of sodium carbonate,
and then sodium chloride was added thereto. Subsequently, the solid thus precipitated out was separated by filtration, and thereby 99 parts of wet cake containing a compound represented by the following formula (37) was obtained.

(Step 6)

49.5 parts of the wet cake of the compound represented by the formula (37) and obtained in Example 3 (Step 5) described above was added to 100 parts of water, and the compound was dissolved by stirring. 7.8 parts of 35% hydrochloric acid was added thereto, subsequently 2.8 parts of a 40% aqueous solution of sodium nitrite was added thereto, and the mixture was stirred for about 30 minutes. To this, 0.8 parts of sulfamic acid was added, followed by stirring for 5 minutes. Thereby, a diazo reaction liquid was obtained.

On the other hand, 3.7 parts of a compound represented by the formula (28) and obtained by a method described in Japanese Unexamined Patent Application, Publication No. 2004-083492 was added to 80 parts of water, and a 25% aqueous solution of sodium hydroxide was added thereto to adjust the mixture to pH 6.0 to 7.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 4.5 with the addition of a 15% aqueous solution of sodium carbonate. A 25% aqueous solution of sodium hydroxide was added thereto to adjust the mixture to pH 7.0 to 7.5, and then sodium chloride was added thereto. Subsequently, the solid thus precipitated out was separated by filtration, and thereby 31.2 parts of wet cake containing a compound represented by the following formula (38) was obtained.

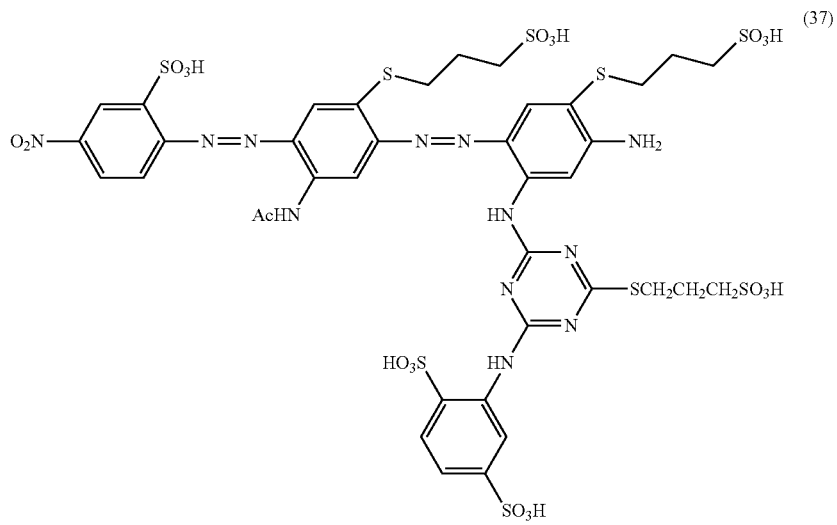

(37)

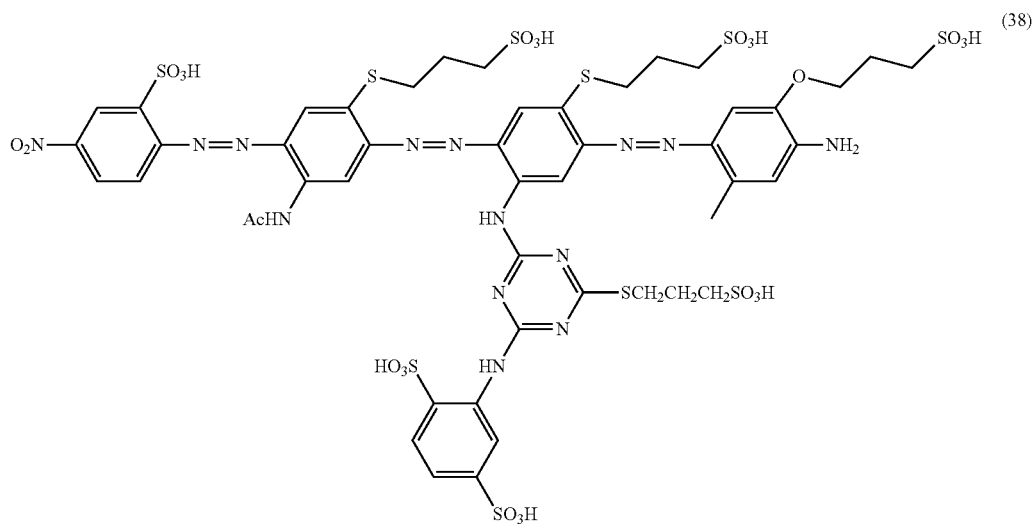

(Step 7)

31.2 parts of the wet cake of the compound represented by the formula (38) and obtained in Example 3 (Step 6) described above was added to 80 parts of water, and the compound was dissolved by stirring. 6.3 parts of 35% hydrochloric acid was added thereto, subsequently 2.3 parts of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

On the other hand, 4.0 parts of a compound represented by the formula (32) and obtained by a method described in PCT International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 20.3 parts of wet cake was obtained. The wet cake thus obtained was dissolved in 40 parts of water, and the pH was adjusted to 7.0 to 7.5 with 35% hydrochloric acid. Subsequently, 400 parts of methanol was added thereto, and the solid thus precipitated out was separated by filtration. The wet cake thus obtained was dissolved again in 40 parts of water, and then 300 parts of methanol was added thereto. A precipitated solid was separated by filtration and dried, and thereby 11.2 parts of a sodium salt of a compound represented by the following formula (39) of the present invention was obtained as black powder. λmax: 590 nm.

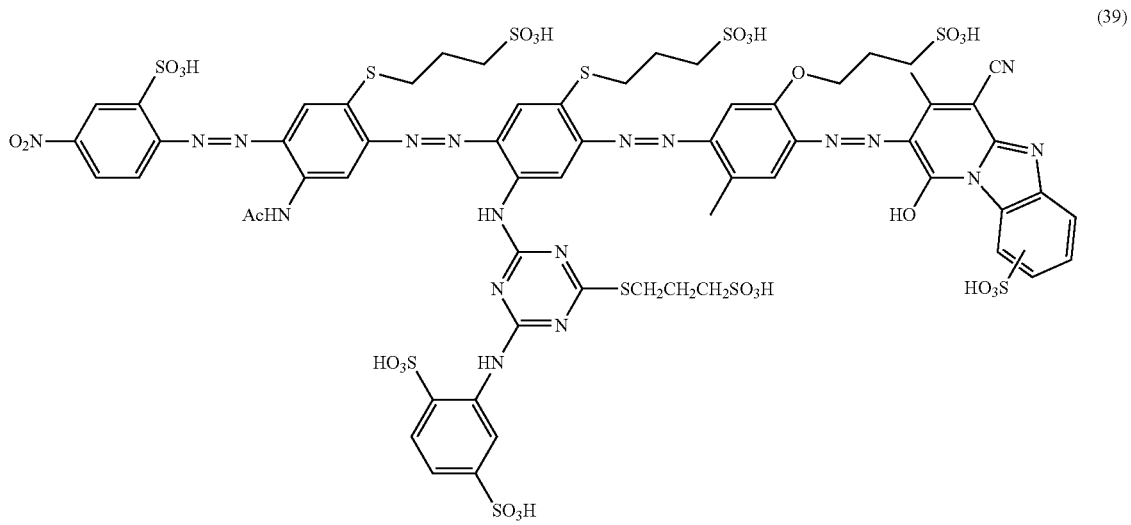

Example 4

(Step 7)

31.2 parts of the wet cake of the compound represented by the formula (38) and obtained in Example 3 (Step 6) described above was added to 80 parts of water, and the compound was dissolved by stirring. 6.3 parts of 35% hydrochloric acid was added thereto, subsequently 2.3 parts of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

On the other hand, 4.4 parts of a compound represented by the formula (32) and obtained by a method described in PCT International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 20.3 parts of wet cake was obtained. The wet cake thus obtained was dissolved in 40 parts of water, and the pH was adjusted to 7.0 to 7.5 with 35% hydrochloric acid. Subsequently, 400 parts of methanol was added thereto, and the solid thus precipitated out was separated by filtration. The wet cake thus obtained was dissolved again in 40 parts of water, and then 300 parts of methanol was added thereto. A precipitated solid was separated by filtration and dried, and thereby 9.5 parts of a sodium salt of a compound represented by the following formula (40) of the present invention was obtained as black powder. λmax: 597 nm.

Example 5

(Step 4)

12.2 parts of sodium 2-amino-5-nitrobenzenesulfonate represented by the formula (24) was added to 50 parts of water. Then, a 25% aqueous solution of sodium hydroxide was added thereto to adjust the mixture to pH 4.0 to 5.0. Thus, an aqueous solution was obtained. Thereto, 18.3 parts of 35% hydrochloric acid was added and then 10.5 parts of a 40% aqueous solution of sodium nitrite was added, followed by reaction for about 30 minutes. Thereto, 1.5 parts of sulfamic acid was added, followed by stirring for 5 minutes. Thereby, a diazo reaction liquid was obtained.

On the other hand, 64.7 parts of the wet cake of the compound represented by the formula (23) and obtained in Example 1 (Step 3) described above was added to 100 parts of water. Then, a 25% aqueous solution of sodium hydroxide was added thereto to adjust the mixture to pH 4.0 to 5.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 4.0 to 6.0 with the addition of a 15% aqueous solution of sodium carbonate, and then sodium chloride was added thereto. Subsequently, the solid thus precipitated out was separated by filtration, and thereby 141.2 parts of wet cake containing a compound represented by the following formula (41) was obtained.

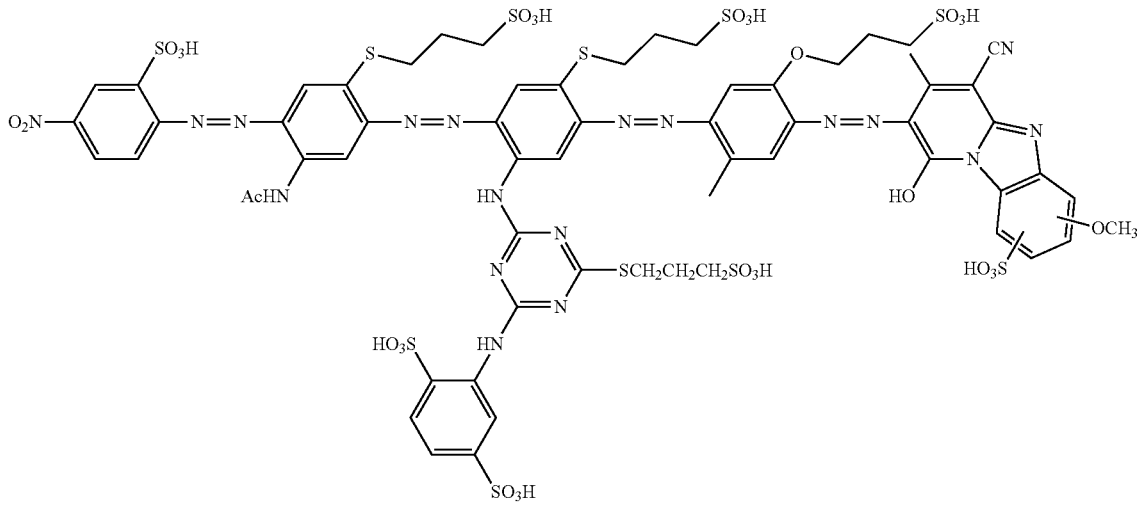

(40)

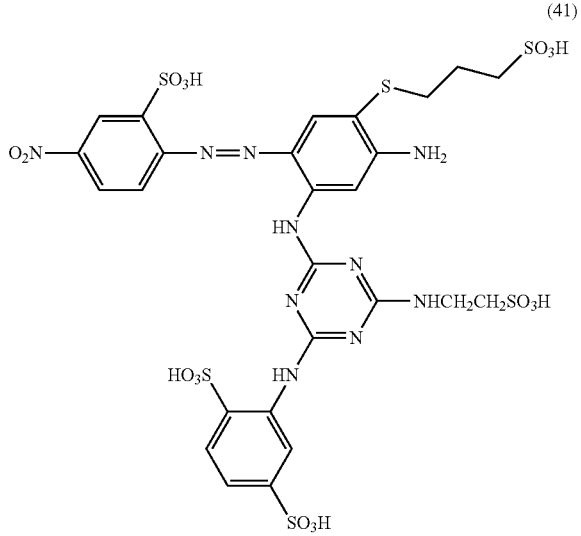

(41)

On the other hand, 11.0 parts of a compound represented by the formula (25) and obtained by a method described in PCT International Publication No. WO2012/081640 was added to 100 parts of water. Then, a 25% aqueous solution of sodium hydroxide was added thereto to adjust the mixture to pH 4.0 to 5.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 3.5 with the addition of a 15% aqueous solution of sodium carbonate, and then sodium chloride was added thereto. Subsequently, the solid thus precipitated out was separated by filtration, and thereby 110 parts of wet cake containing a compound represented by the following formula (42) was obtained.

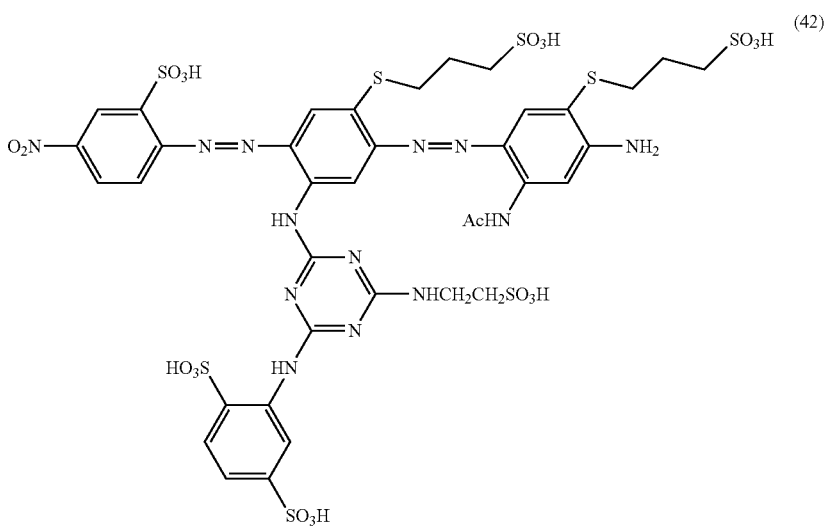

(42)

(Step 5)

The wet cake of the compound represented by the formula (41) and obtained in Example 5 (Step 4) described above as a whole was added to 80 parts of water. Then, a 25% aqueous solution of sodium hydroxide was added thereto to adjust the mixture to pH 6.0 to 7.0. Thus, an aqueous solution was obtained. Thereto, 16.5 parts of 35% hydrochloric acid was added and then 10.6 parts of a 40% aqueous solution of sodium nitrite was added, followed by reaction for about 30 minutes. Thereto, 7.5 parts of sulfamic acid was added, followed by stirring for 5 minutes. Thereby, a diazo reaction liquid was obtained.

(Step 6)

55 parts of the wet cake of the compound represented by the formula (42) and obtained in Example 5 (Step 5) described above was added to 100 parts of water, and the compound was dissolved by stirring. 7.8 parts of 35% hydrochloric acid was added thereto, subsequently 2.8 parts of a 40% aqueous solution of sodium nitrite was added thereto, and the mixture was stirred for about 30 minutes. To this, 0.8 parts of sulfamic acid was added, followed by stirring for 5 minutes. Thereby, a diazo reaction liquid was obtained.

On the other hand, 7.7 parts of a compound represented by the formula (28) and obtained by a method described in Japanese Unexamined Patent Application, Publication No. 2004-083492 was added to 80 parts of water, and a 25% aqueous solution of sodium hydroxide was added thereto to adjust the mixture to pH 6.0 to 7.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 4.5 with the addition of a 15% aqueous solution of sodium carbonate. A 25% aqueous solution of sodium hydroxide was added thereto to adjust the mixture to pH 7.0 to 7.5, and then sodium chloride was added thereto. Subsequently, the solid thus precipitated out was separated by filtration, and thereby 65 parts of wet cake containing a compound represented by the following formula (43) was obtained.

International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride

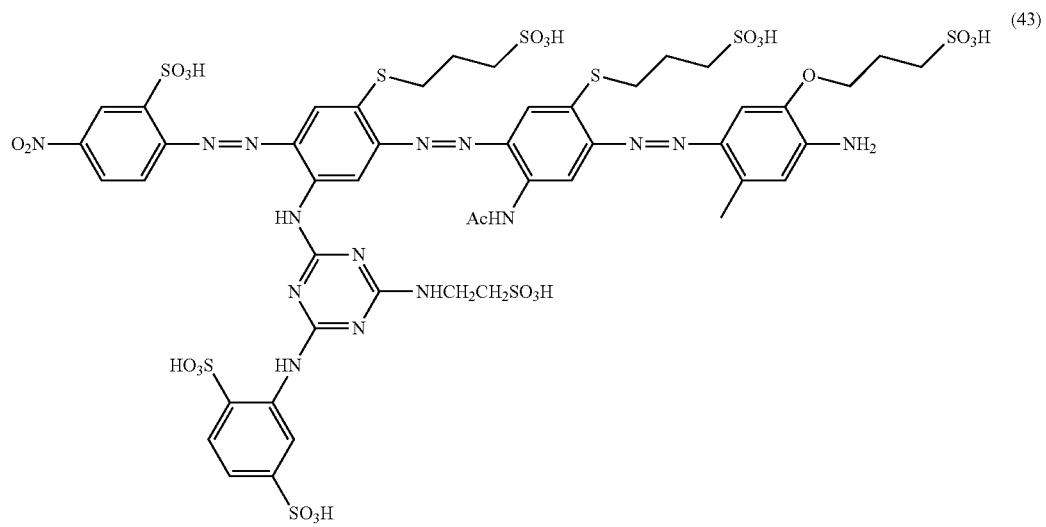

(Step 7)

32.5 parts of the wet cake of the compound represented by the formula (43) and obtained in Example 5 (Step 6) described above was added to 80 parts of water, and the compound was dissolved by stirring. 6.3 parts of 35% hydrochloric acid was added thereto, subsequently 2.3 parts of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

On the other hand, 4.4 parts of a compound represented by the formula (30) and obtained by a method described in PCT was added to the reaction liquid to salt out, the solid thus precipitated out was separated by filtration, and thus 21.5 parts of wet cake was obtained. The wet cake thus obtained was dissolved in 40 parts of water, and the pH was adjusted to 7.0 to 7.5 with 35% hydrochloric acid. Subsequently, 400 parts of methanol was added thereto, and the solid thus precipitated out was separated by filtration. The wet cake thus obtained was dissolved again in 40 parts of water, and then 300 parts of methanol was added thereto. A precipitated solid was separated by filtration and dried, and thereby 12.5 parts of a sodium salt of a compound represented by the following formula (44) of the present invention was obtained as black powder. λmax: 602 nm.

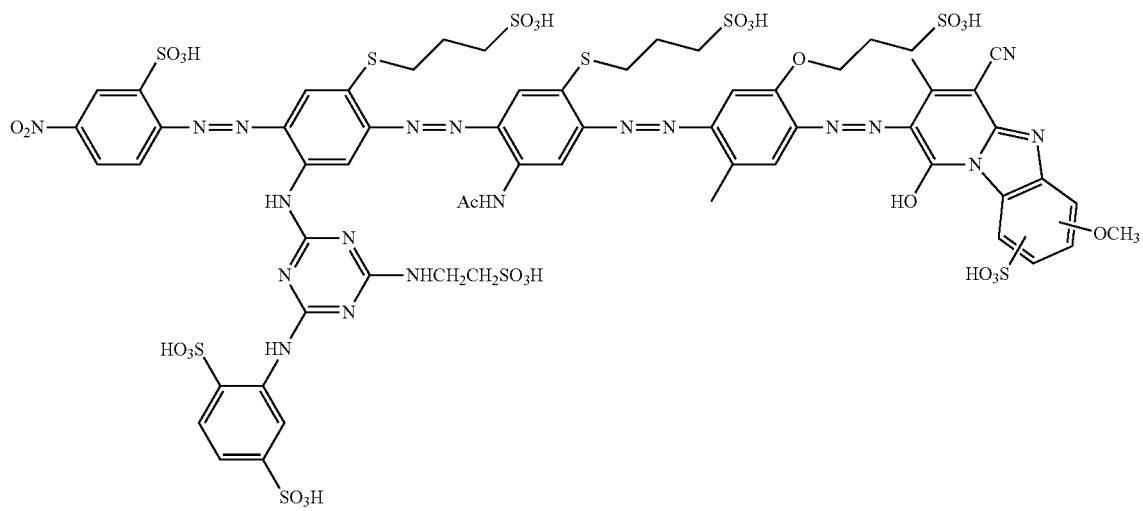

(44)

Example 6

(Step 7)

32.5 parts of the wet cake of the compound represented by the formula (43) and obtained in Example 5 (Step 6) described above was added to 80 parts of water, and the compound was dissolved by stirring. 6.3 parts of 35% hydrochloric acid was added thereto, subsequently 2.3 parts of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

On the other hand, 4.0 parts of a compound represented by the formula (30) and obtained by a method described in PCT International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 21.5 parts of wet cake was obtained. The wet cake thus obtained was dissolved in 40 parts of water, and the pH was adjusted to 7.0 to 7.5 with 35% hydrochloric acid. Subsequently, 400 parts of methanol was added thereto, and the solid thus precipitated out was separated by filtration. The wet cake thus obtained was dissolved again in 40 parts of water, and then 300 parts of methanol was added thereto. A precipitated solid was separated by filtration and dried, and thereby 12.5 parts of a sodium salt of a compound represented by the following formula (45) of the present invention was obtained as black powder. λmax: 591 nm.

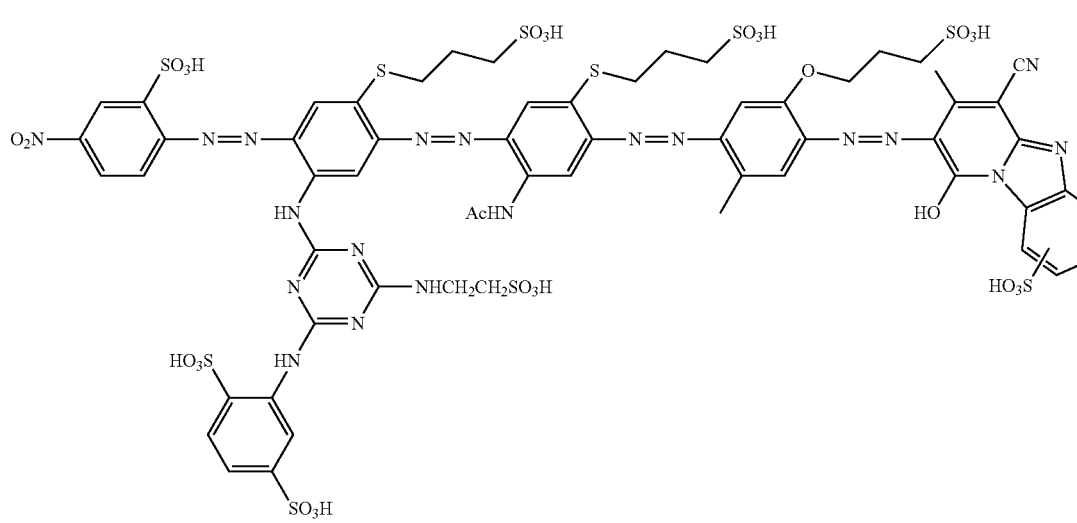

(45)

Example 7

(Step A)

18.6 parts of 4-amino-2-nitrophenol was added to and dissolved in 80 parts of acetone. Then, 11.5 parts of acetic anhydride was added thereto, followed by reaction at 50° C. to 55° C. for 2 hours. 200 parts of water was added to the resulting reaction liquid, followed by stirring for 30 minutes. Subsequently, the solid thus precipitated out was filtered, and thus 32.1 parts of wet cake containing a compound represented by the following formula (46) was obtained.

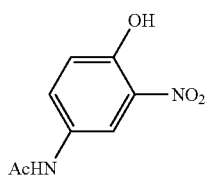

(46)

(Step B)

32.1 parts of the wet cake containing the formula (46) and obtained in Step A was dissolved in 50 parts of N-methyl-2-pyrrolidone, and thereto, 19.3 parts of propane sultone and 21.8 parts of potassium carbonate were added. After the addition, the resulting mixture was heated to 100° C. to 110° C., followed by reaction at that temperature for 2 hours. After the reaction liquid was cooled to 60° C., 44 parts of water and 44 parts of 35% hydrochloric acid were added thereto. After the addition, the temperature was raised to reach 100° C., at which temperature reaction was allowed to proceed for 3 hours. After the reaction, the resultant was cooled to 5° C. Subsequently, a precipitated solid was filtered and dried, and thereby 34.3 parts of a compound represented by the following formula (47) was obtained.

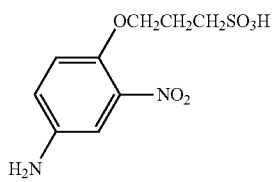

(47)

(Step 1)

18.4 parts of cyanuric chloride and 0.1 parts of trade name: LEOCOL TD-50 were added to 200 parts of ice water, followed by stirring at 10° C. or less for 30 minutes. Then, 32.1 parts of 2,5-disulfoaniline (a commercially available 88.4%-pure product was used) was added thereto, followed by reaction at 0 to 10° C. for 2 hours with the pH being adjusted to pH 2.8 to 3.0 with the use of a 10% aqueous solution of sodium hydroxide and then at 25° C. to 30° C. for 1 hour with the pH being adjusted to pH 2.8 to 3.0. To the resulting reaction liquid, 30.4 parts of a compound represented by the formula (47) and obtained in Example 7 (Step B) was added, followed by reaction at 40° C. to 45° C. for 2 hours with the pH being adjusted to pH 5.0 to 5.5 with the use of a 10% aqueous solution of sodium hydroxide. To the resulting reaction liquid, 20.6 parts of 2-aminoethanesulfonic acid was added, followed by reaction at 70° C. to 80° C. for 3 hours with the pH being adjusted to pH 7.0 to 7.5 with the use of a 10% aqueous solution of sodium hydroxide. At that time, the amount of the liquid was 600 parts. To this liquid, 120 parts of sodium chloride was added, followed by stirring for 30 minutes. Subsequently, the solid thus precipitated out was filtered, and thereby 78.1 parts of wet cake containing a compound represented by the following formula (48) was obtained.

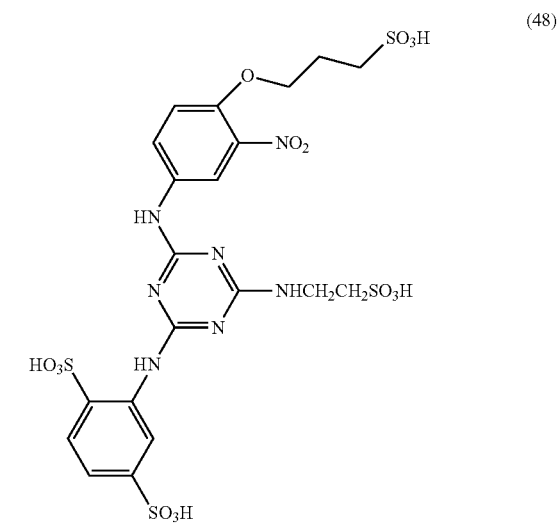

(48)

(Step 2)

78.1 parts of the wet cake of the compound represented by the formula (48) and obtained in Example 7 (Step 1) described above, 5 parts of activated charcoal, and 0.6 parts of anhydrous iron (III) chloride were added to 150 parts of water. The resultant was heated to 60° C., and subsequently 12.6 parts of 80% hydrazine hydrate was added dropwise thereto over about 30 minutes. The resultant was heated to 90° C., followed by reaction at that temperature for 2 hours. The resultant was cooled to 40° C., and then insoluble matter was removed by filtration, followed by cooling the filtrate to room temperature. By addition of 50% sulfuric acid, the pH was adjusted to pH 1.0 to 1.5. At that time, the amount of the liquid was 625 parts. To this liquid, 200 parts of methanol was added, followed by stirring for 30 minutes. Subsequently, a precipitated solid was filtered and dried, and thereby 43 parts of a compound represented by the following formula (49) was obtained.

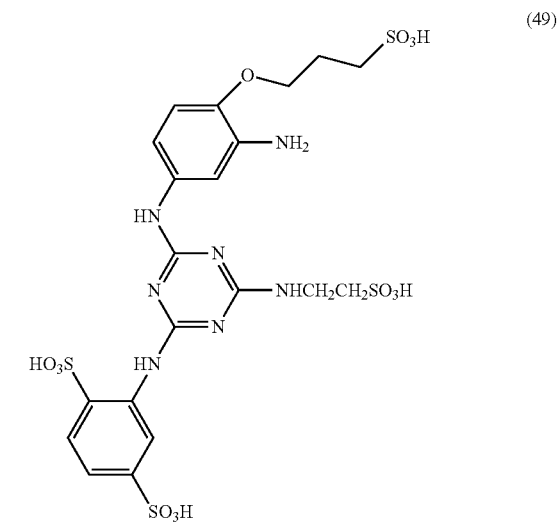

(49)

(Step 5)

The wet cake of the compound represented by the formula (26) and obtained in Example 1 (Step 4) described above as a whole was added to 80 parts of water. Then, a 25% aqueous solution of sodium hydroxide was added thereto to adjust the mixture to pH 6.0 to 7.0. Thus, an aqueous solution was obtained. Thereto, 16.5 parts of 35% hydrochloric acid was added and then 10.6 parts of a 40% aqueous solution of sodium nitrite was added, followed by reaction for about 30 minutes. Thereto, 7.5 parts of sulfamic acid was added, followed by stirring for 5 minutes. Thereby, a diazo reaction liquid was obtained.

On the other hand, 11.0 parts of a compound represented by the formula (25) and obtained by a method described in PCT International Publication No. WO2012/081640 was added to 100 parts of water. Then, a 25% aqueous solution of sodium hydroxide was added thereto to adjust the mixture to pH 4.0 to 5.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 3.5 with the addition of a 15% aqueous solution of sodium carbonate, and then sodium chloride was added thereto. Subsequently, the solid thus precipitated out was separated by filtration, and thereby 95 parts of wet cake containing a compound represented by the following formula (50) was obtained.

described above was added to 100 parts of water, and the compound was dissolved by stirring. 7.8 parts of 35% hydrochloric acid was added thereto, subsequently 2.8 parts of a 40% aqueous solution of sodium nitrite was added thereto, and the mixture was stirred for about 30 minutes. To this, 0.8 parts of sulfamic acid was added, followed by stirring for 5 minutes. Thereby, a diazo reaction liquid was obtained.

On the other hand, 20.2 parts of a compound represented by the formula (49) and obtained in Example 7 (Step 2) described above was added to 80 parts of water, and a 25% aqueous solution of sodium hydroxide was added thereto to adjust the mixture to pH 6.0 to 7.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 4.5 with the addition of a 15% aqueous solution of sodium carbonate. A 25% aqueous solution of sodium hydroxide was added thereto to adjust the mixture to pH 7.0 to 7.5, and then sodium chloride was added thereto. Subsequently, the solid thus precipitated

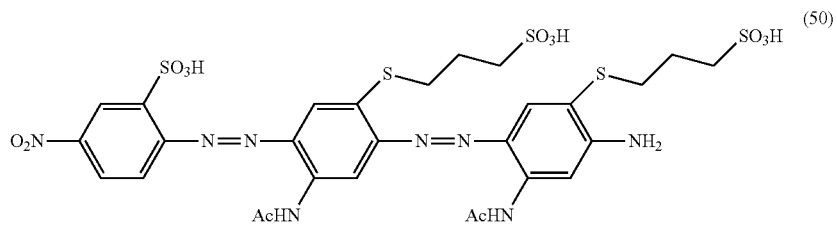 [SMILES: CC(=O)Nc1cc(N)c(SCCCS(=O)(=O)O)cc1N=Nc1cc(NC(C)=O)c(N=Nc2ccc([N+](=O)[O-])cc2S(=O)(=O)O)cc1SCCCS(=O)(=O)O]

(50)

(Step 6)

47.5 parts of the wet cake of the compound represented by the formula (50) and obtained in Example 7 (Step 5)

out was separated by filtration, and thereby 30.3 parts of wet cake containing a compound represented by the following formula (51) was obtained.

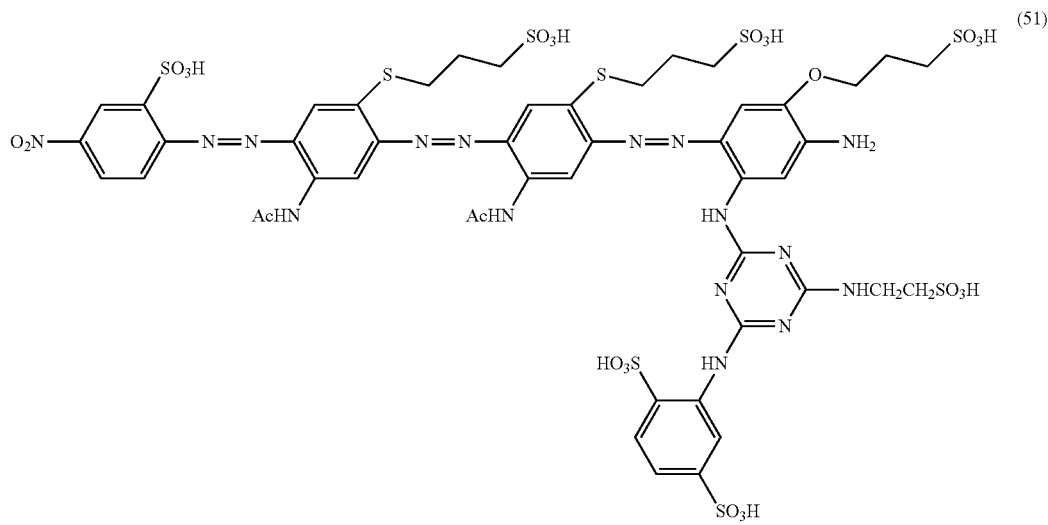

(51)

(Step 7)

15.1 parts of the wet cake of the compound represented by the formula (51) and obtained in Example 7 (Step 6) described above was added to 80 parts of water, and the compound was dissolved by stirring. 6.3 parts of 35% hydrochloric acid was added thereto, subsequently 2.3 parts of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

On the other hand, 4.4 parts of a compound represented by the formula (25) and obtained by a method described in PCT International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 29 parts of wet cake was obtained. The wet cake thus obtained was dissolved in 40 parts of water, and the pH was adjusted to 7.0 to 7.5 with 35% hydrochloric acid. Subsequently, 400 parts of methanol was added thereto, and the solid thus precipitated out was separated by filtration. The wet cake thus obtained was dissolved again in 40 parts of water, and then 300 parts of methanol was added thereto. A precipitated solid was separated by filtration and dried, and thereby 6.2 parts of a sodium salt of a compound represented by the following formula (52) of the present invention was obtained as black powder. λmax: 638 nm.

Example 8

(Step 7)

15.1 parts of the wet cake of the compound represented by the formula (51) and obtained in Example 7 (Step 6) described above was added to 80 parts of water, and the compound was dissolved by stirring. 6.3 parts of 35% hydrochloric acid was added thereto, subsequently 2.3 parts of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

On the other hand, 4.0 parts of a compound represented by the following formula (25) and obtained by a method described in PCT International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 21.5 parts of wet cake was obtained. The wet cake thus obtained was dissolved in 40 parts of water, and the pH was adjusted to 7.0 to 7.5 with 35% hydrochloric acid. Subsequently, 400 parts of methanol was added thereto, and the solid thus precipitated out was separated by filtration. The wet cake thus obtained was dissolved again in 40 parts of water, and then 300 parts of methanol was added thereto. A precipitated solid was separated by filtration and dried, and thereby 4.2 parts of a sodium salt of a compound represented by the following formula (53) of the present invention was obtained as black powder. λmax: 630 nm.

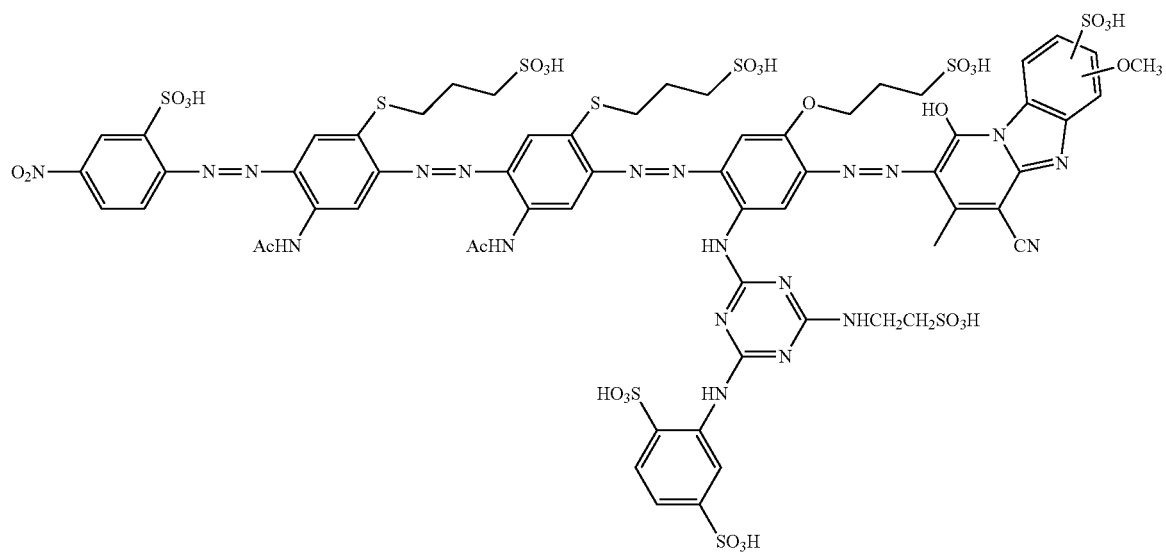

(52)

(53)

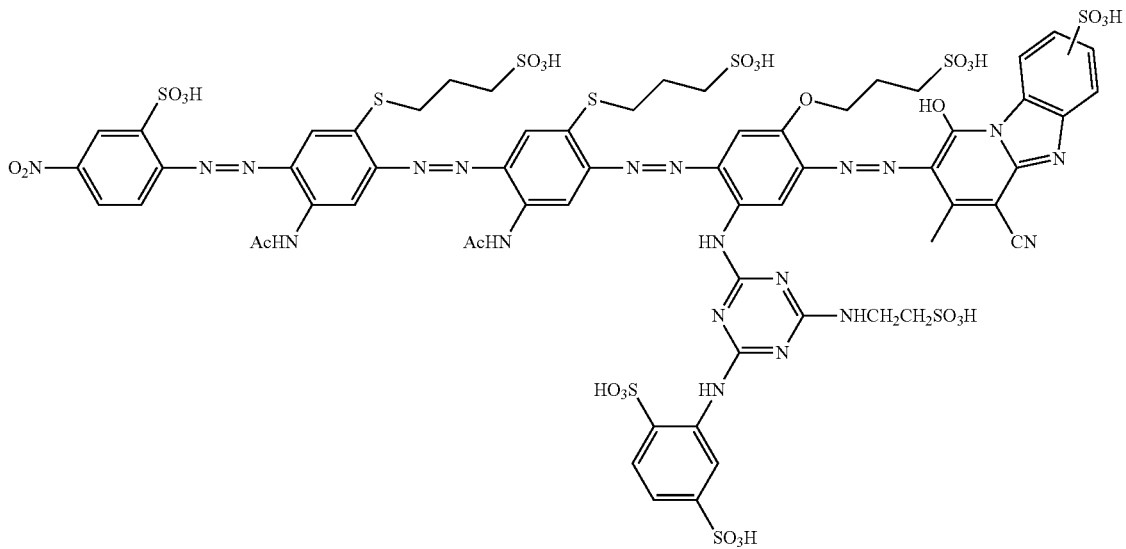

Example 9

(Step 1)

18.4 parts of cyanuric chloride and 0.1 parts of trade name: LEOCOL TD-50 were added to 200 parts of ice water, followed by stirring at 10° C. or less for 30 minutes. Then, 31.7 parts of 2,5-disulfoaniline (a commercially available 88.4%-pure product was used) was added thereto, followed by reaction at 0° C. to 10° C. for 2 hours with the pH being adjusted to pH 2.8 to 3.0 with the use of a 10% aqueous solution of sodium hydroxide and then at 25° C. to 30° C. for 1 hour with the pH being adjusted to pH 2.8 to 3.0. To the resulting reaction liquid, 16.9 parts of 4-chloro-3-nitroaniline was added, followed by reaction at 40° C. to 45° C. for 2 hours with the pH being adjusted to pH 5.0 to 5.5 with the use of a 10% aqueous solution of sodium hydroxide. To the resulting reaction liquid, 123 parts of nicotinic acid was added, followed by reaction at 90° C. to 95° C. for 5 hours with the pH being adjusted to pH 9.0 to 9.2 with the use of a 10% aqueous solution of sodium hydroxide. At that time, the amount of the liquid was 600 parts. To this liquid, 120 parts of sodium chloride was added, followed by stirring for 90 minutes. Subsequently, the pH was adjusted to pH 2.0 to 2.5 with 35% hydrochloric acid, and the solid thus precipitated out was filtered, and thereby 181 parts of wet cake containing a compound represented by the following formula (54) was obtained.

(54)

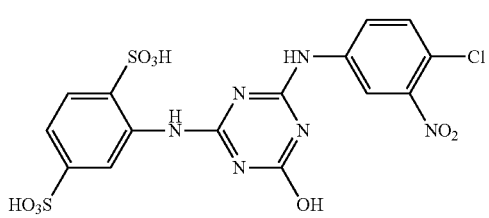

(Step 2)

181 parts of the wet cake containing the compound represented by the formula (54) obtained in the step 1 was dissolved in 90 parts of N-methyl-2-pyrrolidone, and to the resulting mixture, 19.1 parts of sodium 3-mercaptopropane-sulfonate and 15.2 parts of potassium carbonate were added. After the addition, the resulting mixture was heated to 100° C. to 110° C., followed by reaction at that temperature for 2 hours. After the reaction liquid was cooled to 60° C., 150 parts of water was added thereto, followed by addition of 35% hydrochloric acid to achieve pH 1.0 to 1.5. At that time, the amount of the liquid was 525 parts. To this liquid, 105 parts of sodium chloride was added, followed by stirring for 30 minutes. Subsequently, the solid thus precipitated out was separated by filtration, and thereby 205 parts of wet cake containing a compound represented by the following formula (55) was obtained.

(55)

(Step 3)

218 parts of the wet cake of the compound represented by the formula (55) and obtained in Step 2, 5 parts of activated charcoal, and 0.6 parts of anhydrous iron (III) chloride were added to 150 parts of water. The resultant was heated to 60° C., and subsequently 11.3 parts of 80% hydrazine hydrate was added dropwise thereto over about 30 minutes. The resultant was heated to 90° C., followed by reaction at that temperature for 2 hours. The resultant was cooled to 40° C., and then insoluble matter was removed by filtration, followed by cooling the filtrate to room temperature. By addition of 50% sulfuric acid, the pH was adjusted to pH 1.0 to 1.5. At that time, the amount of the liquid was 625 parts.

To this liquid, 125 parts of sodium chloride was added, followed by stirring for 30 minutes. Subsequently, the solid thus precipitated out was separated by filtration, and 98 parts of wet cake containing a compound represented by the following formula (56) was obtained.

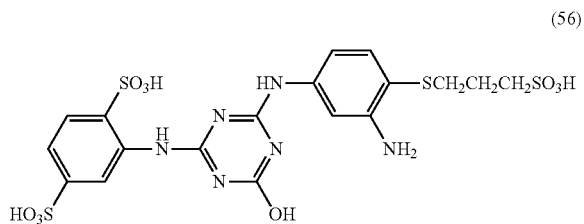

(56)

(Step 5)

The wet cake of the compound represented by the formula (26) and obtained in Example 1 (Step 4) described above as a whole was added to 80 parts of water. Then, a 25% aqueous solution of sodium hydroxide was added thereto to adjust the mixture to pH 6.0 to 7.0. Thus, an aqueous solution was obtained. Thereto, 16.5 parts of 35% hydrochloric acid was added and then 10.6 parts of a 40% aqueous solution of sodium nitrite was added, followed by reaction for about 30 minutes. Thereto, 7.5 parts of sulfamic acid was added, followed by stirring for 5 minutes. Thereby, a diazo reaction liquid was obtained. On the other hand, 64.7 parts of the wet cake of the compound represented by formula (56) and obtained in Example 9 (Step 3) described above was added to 100 parts of water. Then, a 25% aqueous solution of sodium hydroxide was added thereto to adjust the mixture to pH 4.0 to 5.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 3.5 with the addition of a 15% aqueous solution of sodium carbonate, and then sodium chloride was added thereto. Subsequently, the solid thus precipitated out was separated by filtration, and thereby 92 parts of wet cake containing a compound represented by the following formula (57) was obtained.

(Step 6)

46 parts of the wet cake of the compound represented by the formula (57) and obtained in Example 9 (Step 5) described above was added to 100 parts of water, and the compound was dissolved by stirring. 7.8 parts of 35% hydrochloric acid was added thereto, subsequently 2.8 parts of a 40% aqueous solution of sodium nitrite was added thereto, and the mixture was stirred for about 30 minutes. To this, 0.8 parts of sulfamic acid was added, followed by stirring for 5 minutes. Thereby, a diazo reaction liquid was obtained.

On the other hand, 3.7 parts of a compound represented by the formula (28) and obtained by a method described in Japanese Unexamined Patent Application, Publication No. 2004-083492 was added to 80 parts of water, and a 25% aqueous solution of sodium hydroxide was added thereto to adjust the mixture to pH 6.0 to 7.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 4.5 with the addition of a 15% aqueous solution of sodium carbonate. A 25% aqueous solution of sodium hydroxide was added thereto to adjust the mixture to pH 7.0 to 7.5, and then sodium chloride was added thereto. Subsequently, the solid thus precipitated out was separated by filtration, and thereby 35.2 parts of wet cake containing a compound represented by the following formula (58) was obtained.

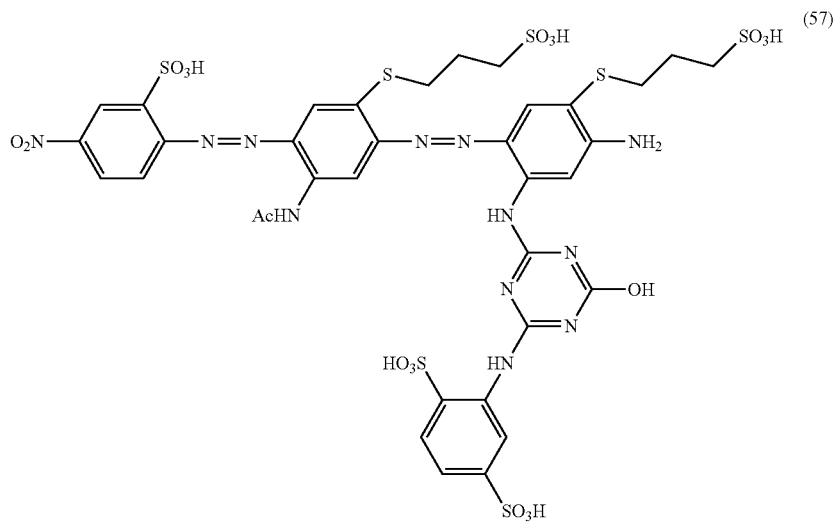 [SMILES: CC(=O)Nc1cc(N=Nc2cc(SCCCS(=O)(=O)O)c(N)cc2Nc2nc(O)nc(Nc3cc(S(=O)(=O)O)ccc3S(=O)(=O)O)n2)c(SCCCS(=O)(=O)O)cc1N=Nc1ccc([N+](=O)[O-])cc1S(=O)(=O)O]

(57)

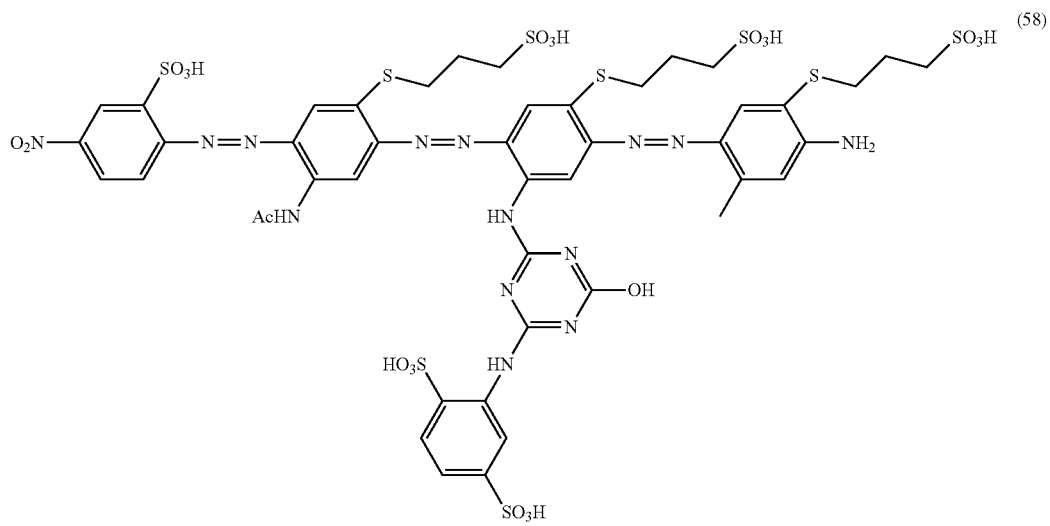 [SMILES: CC(=O)Nc1cc(N=Nc2cc(SCCCS(=O)(=O)O)c(N=Nc3cc(SCCCS(=O)(=O)O)c(N)cc3C)cc2Nc2nc(O)nc(Nc3cc(S(=O)(=O)O)ccc3S(=O)(=O)O)n2)c(SCCCS(=O)(=O)O)cc1N=Nc1ccc([N+](=O)[O-])cc1S(=O)(=O)O]

(58)

(Step 7)

35.2 parts of the wet cake of the compound represented by the formula (58) and obtained in Example 9 (Step 6) described above was added to 80 parts of water, and the compound was dissolved by stirring. 6.3 parts of 35% hydrochloric acid was added thereto, subsequently 2.3 parts of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

On the other hand, 4.4 parts of a compound represented by the formula (30) and obtained by a method described in PCT International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 20.9 parts of wet cake was obtained. The wet cake thus obtained was dissolved in 40 parts of water, and the pH was adjusted to 7.0 to 7.5 with 35% hydrochloric acid. Subsequently, 400 parts of methanol was added thereto, and the solid thus precipitated out was separated by filtration. The wet cake thus obtained was dissolved again in 40 parts of water, and then 300 parts of methanol was added thereto. A precipitated solid was separated by filtration and dried, and thereby 10.2 parts of a sodium salt of a compound represented by the following formula (59) of the present invention was obtained as black powder. λmax: 590 nm.

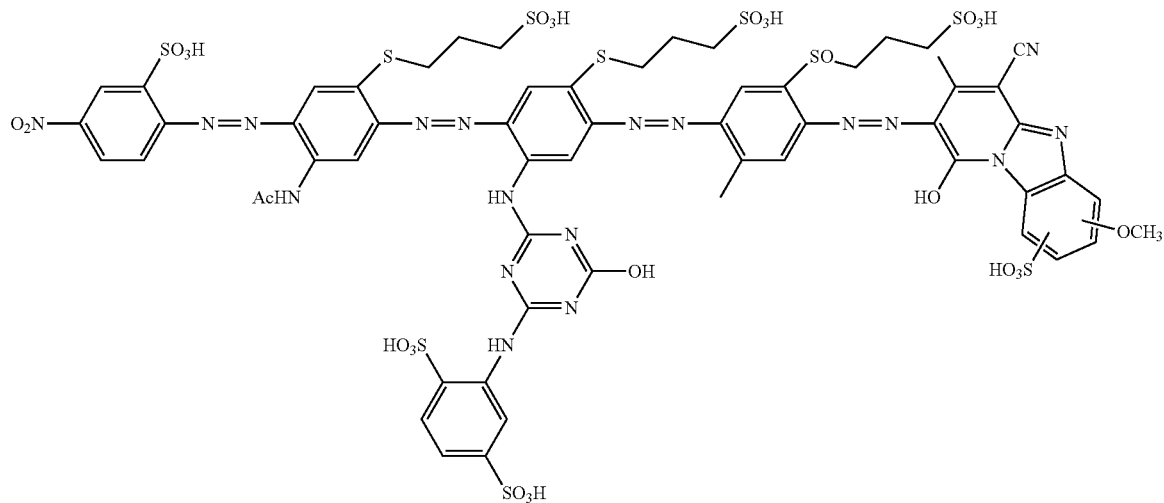

(59)

Example 10

(Step 1)

18.4 parts of cyanuric chloride and 0.1 parts of trade name: LEOCOL TD-50 were added to 200 parts of ice water, followed by stirring at 10° C. or less for 30 minutes. Then, 31.7 parts of 2,5-disulfoaniline (a commercially available 88.4%-pure product was used) was added thereto, followed by reaction at 0° C. to 10° C. for 2 hours with the pH being adjusted to pH 2.8 to 3.0 with the use of a 10% aqueous solution of sodium hydroxide and then at 25° C. to 30° C. for 1 hour with the pH being adjusted to pH 2.8 to 3.0. To the resulting reaction liquid, 16.9 parts of 4-chloro-3-nitroaniline was added, followed by reaction at 40° C. to 45° C. for 2 hours with the pH being adjusted to pH 5.0 to 5.5 with the use of a 10% aqueous solution of sodium hydroxide. To the resulting reaction liquid, 16.1 parts of benzylamine was added, followed by reaction at 90° C. to 95° C. for 5 hours with the pH being adjusted to pH 9.0 to 9.2 with the use of a 10% aqueous solution of sodium hydroxide. At that time, the amount of the liquid was 600 parts. To this liquid, 120 parts of sodium chloride was added, followed by stirring for 90 minutes. Subsequently, the pH was adjusted to pH 2.0 to 2.5 with 35% hydrochloric acid, and the solid thus precipitated out was filtered, and thereby 121 parts of wet cake containing a compound represented by the following formula (60) was obtained.

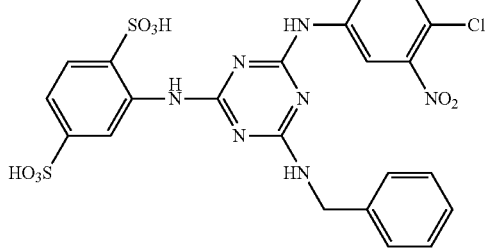

(60)

(Step 2)

121 parts of the wet cake containing the compound represented by the formula (60) obtained in the step 1 was dissolved in 90 parts of N-methyl-2-pyrrolidone, and to the resulting mixture, 19.1 parts of sodium 3-mercaptopropanesulfonate and 15.2 parts of potassium carbonate were added. After the addition, the resulting mixture was heated to 100° C. to 110° C., followed by reaction at that temperature for 2 hours. After the reaction liquid was cooled to 60° C., 150 parts of water was added thereto, followed by addition of 35% hydrochloric acid to achieve pH 1.0 to 1.5. At that time, the amount of the liquid was 525 parts. To this liquid, 105 parts of sodium chloride was added, followed by stirring for 30 minutes. Subsequently, the solid thus precipitated out was separated by filtration, and thereby 153 parts of wet cake containing a compound represented by the following formula (61) was obtained.

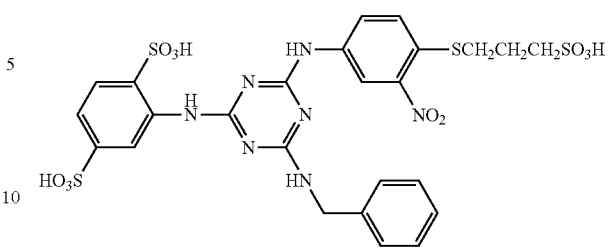

(61)

(Step 3)

153 parts of the wet cake of the compound represented by the formula (61) and obtained in Step 2, 5 parts of activated charcoal, and 0.6 parts of anhydrous iron (III) chloride were added to 150 parts of water. The resultant was heated to 60° C., and subsequently 11.3 parts of 80% hydrazine hydrate was added dropwise thereto over about 30 minutes. The resultant was heated to 90° C., followed by reaction at that temperature for 2 hours. The resultant was cooled to 40° C., and then insoluble matter was removed by filtration, followed by cooling the filtrate to room temperature. By addition of 50% sulfuric acid, the pH was adjusted to pH 1.0 to 1.5. At that time, the amount of the liquid was 625 parts. To this liquid, 125 parts of sodium chloride was added, followed by stirring for 30 minutes. Subsequently, the solid thus precipitated out was separated by filtration, and 121 parts of wet cake containing a compound represented by the following formula (62) was obtained.

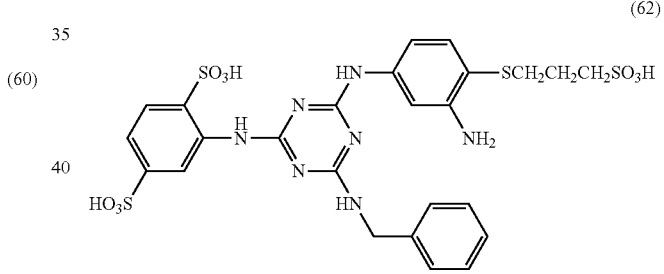

(62)

(Step 4)

The wet cake of the compound represented by the formula (26) and obtained in Example 1 (Step 4) described above as a whole was added to 80 parts of water. Then, a 25% aqueous solution of sodium hydroxide was added thereto to adjust the mixture to pH 6.0 to 7.0. Thus, an aqueous solution was obtained. Thereto, 16.5 parts of 35% hydrochloric acid was added and then 10.6 parts of a 40% aqueous solution of sodium nitrite was added, followed by reaction for about 30 minutes. Thereto, 7.5 parts of sulfamic acid was added, followed by stirring for 5 minutes. Thereby, a diazo reaction liquid was obtained.

On the other hand, 79.9 parts of the wet cake of the compound represented by formula (62) and obtained in Example 10 (Step 3) described above was added to 100 parts of water. Then, a 25% aqueous solution of sodium hydroxide was added thereto to adjust the mixture to pH 4.0 to 5.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 3.5 with the addition of a 15% aqueous solution of sodium carbonate, and then sodium chloride was added thereto. Subsequently, the solid thus precipitated out was separated by filtration, and thereby 84 parts of wet cake containing a compound represented by the following formula (63) was obtained.

Japanese Unexamined Patent Application, Publication No. 2004-083492 was added to 80 parts of water, and a 25% aqueous solution of sodium hydroxide was added thereto to adjust the mixture to pH 6.0 to 7.0. Thus, an aqueous solution was obtained. The resulting aqueous solution was added dropwise over about 5 minutes to the diazo reaction

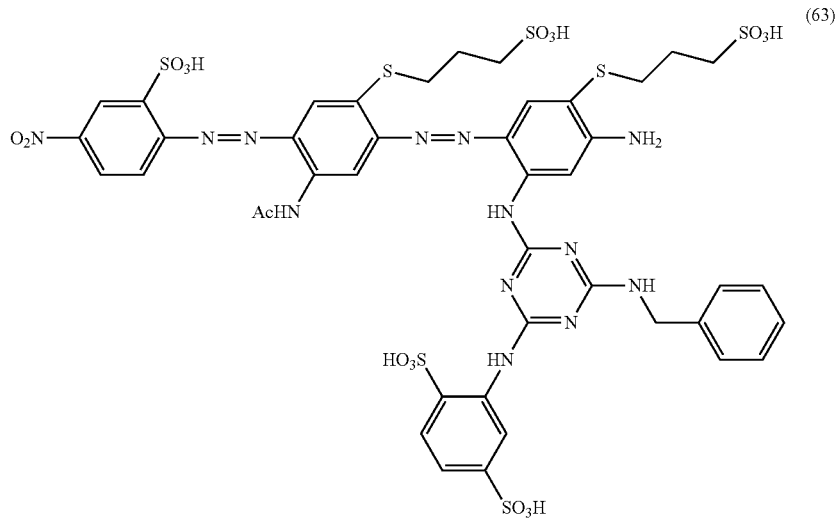 [SMILES: CC(=O)Nc1cc(N=Nc2cc(SCCCS(=O)(=O)O)c(N)cc2Nc2nc(NCc3ccccc3)nc(Nc3cc(S(=O)(=O)O)ccc3S(=O)(=O)O)n2)c(SCCCS(=O)(=O)O)cc1N=Nc1ccc([N+](=O)[O-])cc1S(=O)(=O)O]

(Step 5)

42 parts of the wet cake of the compound represented by the formula (63) and obtained in Example 10 (Step 5) described above was added to 100 parts of water, and the compound was dissolved by stirring. 7.8 parts of 35% hydrochloric acid was added thereto, subsequently 2.8 parts of a 40% aqueous solution of sodium nitrite was added thereto, and the mixture was stirred for about 30 minutes. To this, 0.8 parts of sulfamic acid was added, followed by stirring for 5 minutes. Thereby, a diazo reaction liquid was obtained.

On the other hand, 3.7 parts of a compound represented by the formula (28) and obtained by a method described in liquid obtained as described above. After the dropwise addition, reaction was allowed to proceed for 3 hours with the pH being maintained at pH 3.0 to 4.5 with the addition of a 15% aqueous solution of sodium carbonate. A 25% aqueous solution of sodium hydroxide was added thereto to adjust the mixture to pH 7.0 to 7.5, and then sodium chloride was added thereto. Subsequently, the solid thus precipitated out was separated by filtration, and thereby 39 parts of wet cake containing a compound represented by the following formula (64) was obtained.

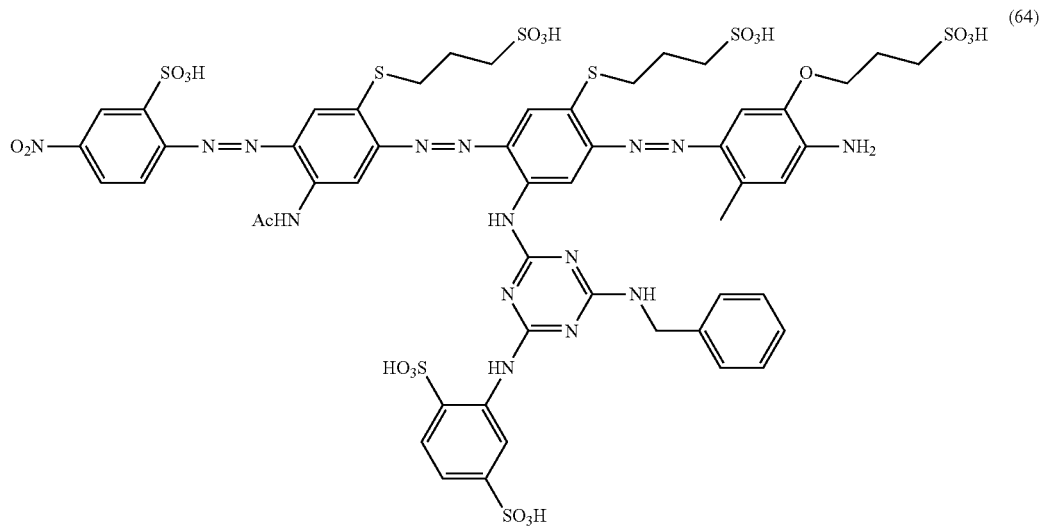 [SMILES: CC(=O)Nc1cc(N=Nc2cc(SCCCS(=O)(=O)O)c(N=Nc3cc(OCCCS(=O)(=O)O)c(N)cc3C)cc2Nc2nc(NCc3ccccc3)nc(Nc3cc(S(=O)(=O)O)ccc3S(=O)(=O)O)n2)c(SCCCS(=O)(=O)O)cc1N=Nc1ccc([N+](=O)[O-])cc1S(=O)(=O)O]

(Step 7)

39 parts of the wet cake of the compound represented by the formula (64) and obtained in Example 10 (Step 6) described above was added to 80 parts of water, and the compound was dissolved by stirring. 6.3 parts of 35% hydrochloric acid was added thereto, subsequently 2.3 parts of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

On the other hand, 4.4 parts of a compound represented by the formula (30) and obtained by a method described in PCT International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 20.9 parts of wet cake was obtained. The wet cake thus obtained was dissolved in 40 parts of water, and the pH was adjusted to 7.0 to 7.5 with 35% hydrochloric acid. Subsequently, 400 parts of methanol was added thereto, and the solid thus precipitated out was separated by filtration. The wet cake thus obtained was dissolved again in 40 parts of water, and then 300 parts of methanol was added thereto. A precipitated solid was separated by filtration and dried, and thereby 8.5 parts of a sodium salt of a compound represented by the following formula (65) of the present invention was obtained as black powder. λmax: 590 nm.

followed by stirring at 10° C. or less for 30 minutes. Then, 31.7 parts of 2,5-disulfoaniline (a commercially available 88.4%-pure product was used) was added thereto, followed by reaction at 0° C. to 10° C. for 2 hours with the pH being adjusted to pH 2.8 to 3.0 with the use of a 10% aqueous solution of sodium hydroxide and then at 25° C. to 30° C. for 1 hour with the pH being adjusted to pH 2.8 to 3.0. To the resulting reaction liquid, 16.9 parts of 4-chloro-3-nitroaniline was added, followed by reaction at 40° C. to 45° C. for 2 hours with the pH being adjusted to pH 5.0 to 5.5 with the use of a 10% aqueous solution of sodium hydroxide. To the resulting reaction liquid, 37.2 parts of N-methyl taurine (65% pure) was added, followed by reaction at 90° C. to 95° C. for 5 hours with the pH being adjusted to pH 9.0 to 9.2 with the use of a 10% aqueous solution of sodium hydroxide. At that time, the amount of the liquid was 600 parts. To this liquid, 120 parts of sodium chloride was added, followed by stirring for 90 minutes. Subsequently, the pH was adjusted to pH 2.0 to 2.5 with 35% hydrochloric acid, and the solid thus precipitated out was filtered, and thereby 132 parts of wet cake containing a compound represented by the following formula (66) was obtained.

(Step 2)

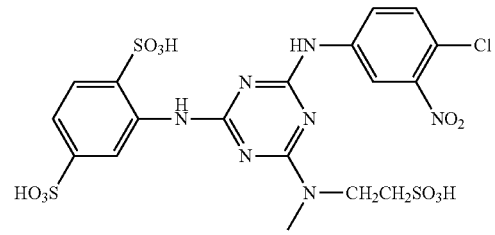

(66)

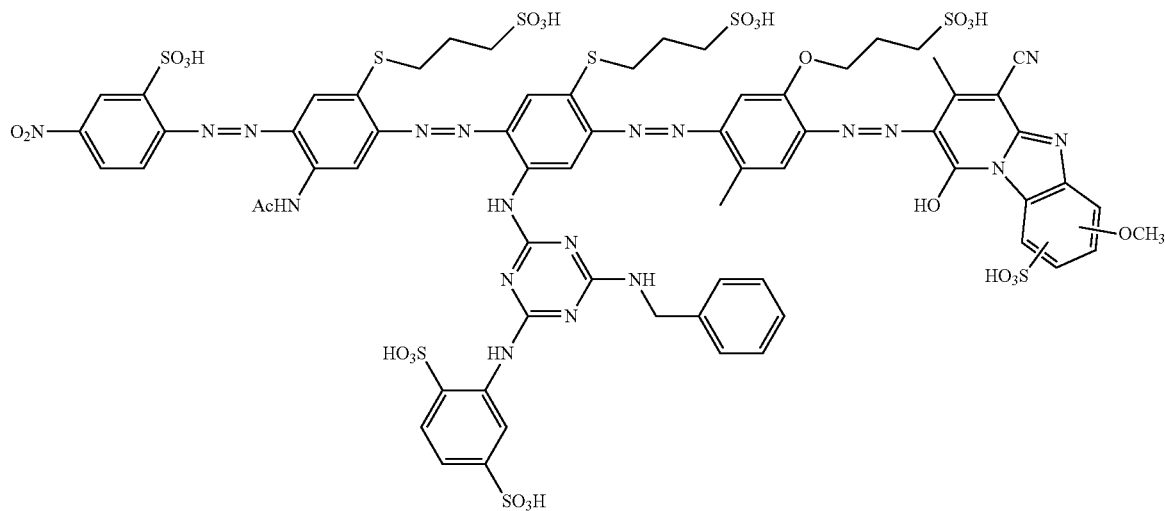

(65)

Example 11

(Step 1)

18.4 parts of cyanuric chloride and 0.1 parts of trade name: LEOCOL TD-50 were added to 200 parts of ice water, 121 parts of the wet cake containing the compound represented by the formula (66) obtained in the step 1 was dissolved in 90 parts of N-methyl-2-pyrrolidone, and to the resulting mixture, 19.1 parts of sodium 3-mercaptopropanesulfonate and 15.2 parts of potassium carbonate were added.

After the addition, the resulting mixture was heated to 100° C. to 110° C., followed by reaction at that temperature for 2 hours. After the reaction liquid was cooled to 60° C., 150 parts of water was added thereto, followed by addition of 35% hydrochloric acid to achieve pH 1.0 to 1.5. At that time, the amount of the liquid was 525 parts. To this liquid, 105 parts of sodium chloride was added, followed by stirring for 30 minutes. Subsequently, the solid thus precipitated out was separated by filtration, and thereby 123 parts of wet cake containing a compound represented by the following formula (67) was obtained.

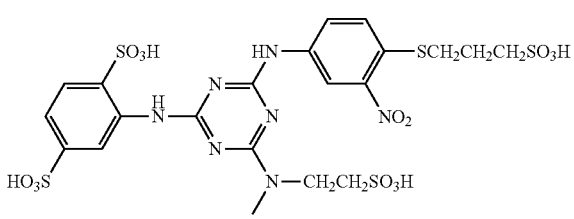

(67)

(Step 3)

123 parts of the wet cake of the compound represented by the formula (67) and obtained in Step 2, 5 parts of activated charcoal, and 0.6 parts of anhydrous iron (III) chloride were added to 150 parts of water. The resultant was heated to 60° C., and subsequently 11.3 parts of 80% hydrazine hydrate was added dropwise thereto over about 30 minutes. The resultant was heated to 90° C., followed by reaction at that temperature for 2 hours. The resultant was cooled to 40° C., and then insoluble matter was removed by filtration, followed by cooling the filtrate to room temperature. By addition of 50% sulfuric acid, the pH was adjusted to pH 1.0 to 1.5. At that time, the amount of the liquid was 625 parts. To this liquid, 125 parts of sodium chloride was added, followed by stirring for 30 minutes. Subsequently, the solid thus precipitated out was separated by filtration, and 111 parts of wet cake containing a compound represented by the following formula (68) was obtained.

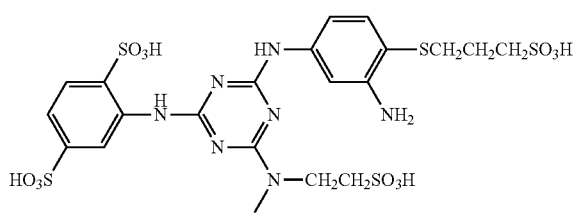

(68)

(Step 5)

The wet cake of the compound represented by the formula (25) and obtained in Example 1 (Step 4) described above as a whole was added to 80 parts of water. Then, a 25% aqueous solution of sodium hydroxide was added thereto to adjust the mixture to pH 6.0 to 7.0. Thus, an aqueous solution was obtained. Thereto, 16.5 parts of 35% hydrochloric acid was added and then 10.6 parts of a 40% aqueous solution of sodium nitrite was added, followed by reaction for about 30 minutes. Thereto, 7.5 parts of sulfamic acid was added, followed by stirring for 5 minutes. Thereby, a diazo reaction liquid was obtained.

On the other hand, 73.3 parts of the wet cake of the compound represented by formula (68) and obtained in Example 10 (Step 3) described above was added to 100 parts of water. Then, a 25% aqueous solution of sodium hydroxide was added thereto to adjust the mixture to pH 4.0 to 5.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 3.5 with the addition of a 15% aqueous solution of sodium carbonate, and then sodium chloride was added thereto. Subsequently, the solid thus precipitated out was separated by filtration, and thereby 74 parts of wet cake containing a compound represented by the following formula (69) was obtained.

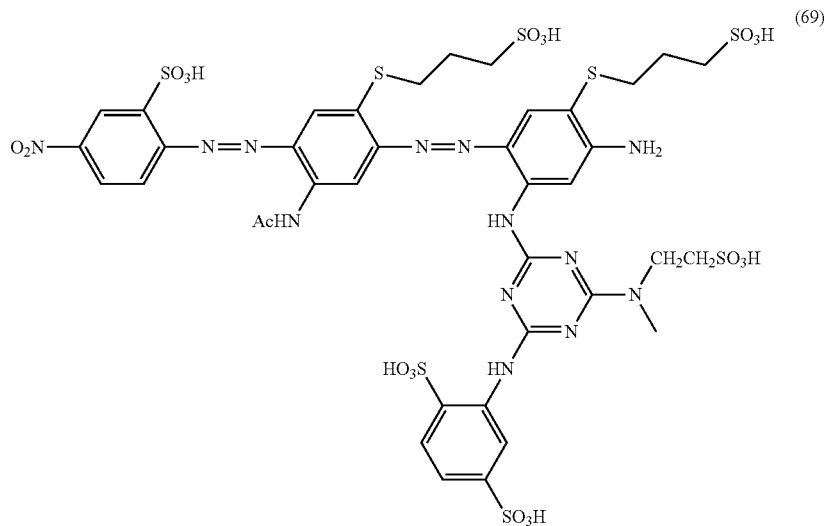

(69)

(Step 6)

37 parts of the wet cake of the compound represented by the formula (69) and obtained in Example 10 (Step 5)

described above was added to 100 parts of water, and the compound was dissolved by stirring. 7.8 parts of 35% hydrochloric acid was added thereto, subsequently 2.8 parts of a 40% aqueous solution of sodium nitrite was added thereto, and the mixture was stirred for about 30 minutes. To this, 0.8 parts of sulfamic acid was added, followed by stirring for 5 minutes. Thereby, a diazo reaction liquid was obtained.

On the other hand, 3.7 parts of a compound represented by the formula (28) and obtained by a method described in Japanese Unexamined Patent Application, Publication No. 2004-083492 was added to 80 parts of water, and a 25% aqueous solution of sodium hydroxide was added thereto to adjust the mixture to pH 6.0 to 7.0. Thus, an aqueous solution was obtained. The resulting aqueous solution was added dropwise over about 5 minutes to the diazo reaction liquid obtained as described above. After the dropwise addition, reaction was allowed to proceed for 3 hours with the pH being maintained at pH 3.0 to 4.5 with the addition of a 15% aqueous solution of sodium carbonate. A 25% aqueous solution of sodium hydroxide was added thereto to adjust the mixture to pH 7.0 to 7.5, and then sodium chloride was added thereto. Subsequently, the solid thus precipitated out was separated by filtration, and thereby 35 parts of wet cake containing a compound represented by the following formula (70) was obtained.

of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

On the other hand, 4.4 parts of a compound represented by the formula (30) and obtained by a method described in PCT International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 20.9 parts of wet cake was obtained. The wet cake thus obtained was dissolved in 40 parts of water, and the pH was adjusted to 7.0 to 7.5 with 35% hydrochloric acid. Subsequently, 400 parts of methanol was added thereto, and the solid thus precipitated out was separated by filtration. The wet cake

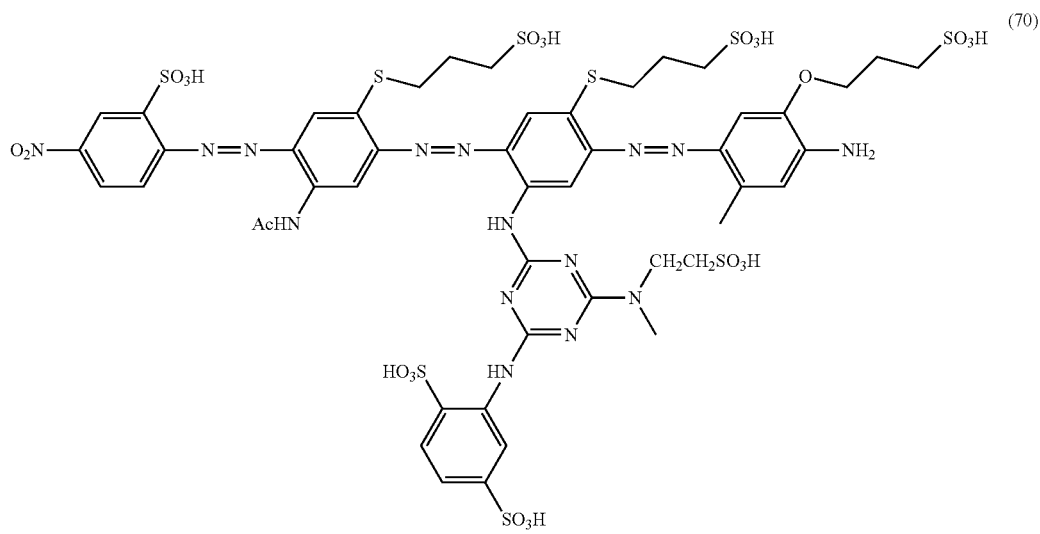

(Step 7)

35 parts of the wet cake of the compound represented by the formula (70) and obtained in Example 10 (Step 6) described above was added to 80 parts of water, and the compound was dissolved by stirring. 6.3 parts of 35% hydrochloric acid was added thereto, subsequently 2.3 parts thus obtained was dissolved again in 40 parts of water, and then 300 parts of methanol was added thereto. A precipitated solid was separated by filtration and dried, and thereby 9.5 parts of a sodium salt of a compound represented by the following formula (71) of the present invention was obtained as black powder. λmax: 590 nm.

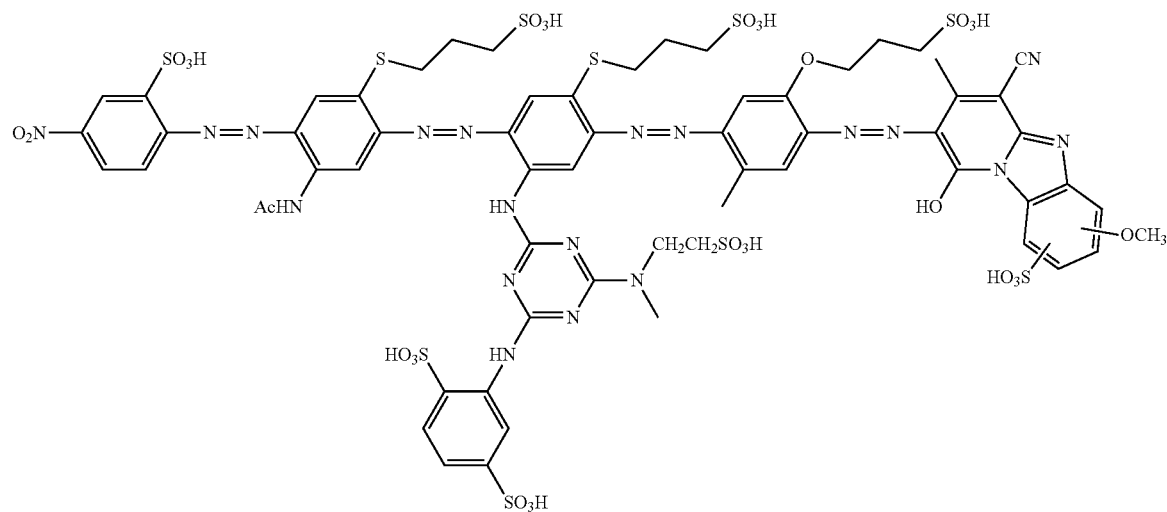

(71)

Example 12

(Step 7)

35 parts of the wet cake of the compound represented by the formula (70) and obtained in Example 11 (Step 6) described above was added to 80 parts of water, and the compound was dissolved by stirring. 6.3 parts of 35% hydrochloric acid was added thereto, subsequently 2.3 parts of a 40% aqueous solution of sodium nitrite was added thereto, and the mixture was stirred for about 30 minutes. To this, 0.5 parts of sulfamic acid was added, the mixture was stirred for 5 minutes, and thus a diazo reaction liquid was obtained.

On the other hand, 4.0 parts of a compound represented by the formula (32) and obtained by a method described in PCT International Publication No. WO2012/081640 was added to 80 parts of water, and a 5% aqueous solution of sodium hydroxide was added thereto to adjust the mixture to pH 6.0 to 7.0. Thus, an aqueous solution was obtained. To this aqueous solution, the diazo reaction liquid obtained as described above was added dropwise over about 30 minutes at 15° C. to 30° C. At this time, the pH of the reaction liquid was maintained at pH 6.5 to 7.5 by adding a 15% aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 21.5 parts of wet cake was obtained. The wet cake thus obtained was dissolved in 40 parts of water, and the pH was adjusted to 7.0 to 7.5 with 35% hydrochloric acid. Subsequently, 400 parts of methanol was added thereto, and the solid thus precipitated out was separated by filtration. The wet cake thus obtained was dissolved again in 40 parts of water, and then 300 parts of methanol was added thereto. A precipitated solid was separated by filtration and dried, and thereby 8.7 parts of a sodium salt of a compound represented by the formula (72) of the present invention was obtained as black powder. λmax: 630 nm.

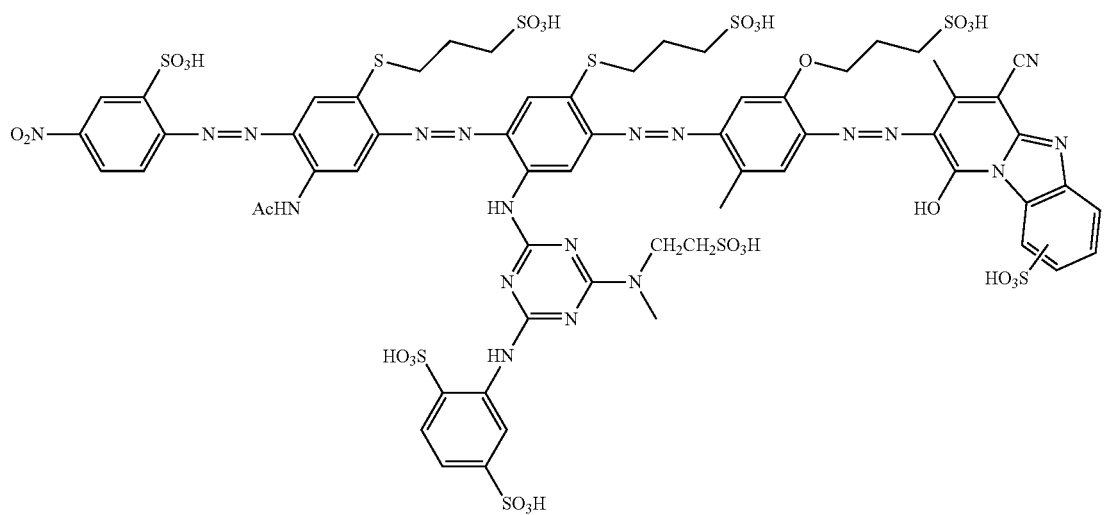

(72)

[(B) Ink Preparation]

By using the azo compound [formula (31)] of the present invention obtained in Example 1 described above as a coloring matter and mixing the ingredients specified in the composition shown in Table 14 below, a solution was prepared. Thus, the ink composition of the present invention was obtained. The resulting ink composition was filtered through a 0.45-μm membrane filter for contaminants removal. Thus, a test ink was prepared. This test ink had a pH ranging from 8.0 to 9.5. In Table 14 below, "Surfactant" refers to trade name: Surfynol® 104 PG50 manufactured by Nissin Chemical Industry Co., Ltd. The preparation of the ink using the compound obtained in Example 1 is defined as Example 13. Test inks were prepared in the same manner as in Example 13 except that a coloring matter obtained in each of Examples 2 to 4, Example 6, and Examples 9 to 12, respectively, was used instead of the coloring matter obtained in Example 1. The preparation of these test inks were defined as Examples 14 to 21.

TABLE 14

Ink composition

| Component | Parts |
| --- | --- |
| Compound obtained in Example 1 | 1.5 parts |
| Glycerol | 5.0 parts |
| Urea | 5.0 parts |
| N-Methyl-2-pyrrolidone | 4.0 parts |
| Isopropyl alcohol | 3.0 parts |
| Butyl carbitol | 2.0 parts |
| Taurine | 0.3 parts |
| Disodium ethylenediaminetetraacetate | 0.1 parts |
| Surfactant | 0.1 parts |
| Water + aqueous solution of sodium hydroxide | 79.0 parts |
| Total | 100.0 parts |

Comparative Example 1

A comparative ink was prepared in the same manner as in Example 13 except that a coloring matter described in PCT International Publication No. WO2012/081640 (Example 3) was used instead of the compound of the present invention obtained in Example 1. The preparation of this ink is defined as Comparative Example 1. The structural formula of the compound used in Comparative Example 1 is shown in the following formula (73).

[(C) Inkjet Recording]

The ink prepared in each of Examples 13 to 21 and Comparative Example 1 described above, respectively, was subjected to inkjet recording with an inkjet printer (manufactured by Canon Inc., trade name: PIXUS® ip7230) on the following two types of glossy paper. At the time of recording, image patterns were produced so as to obtain gradation of six levels at densities of 100%, 85%, 70%, 55%, 40%, and 25%, and halftone recorded materials were obtained. The following tests were carried out by using these recorded matters as specimens.

Glossy paper 1: manufactured by Canon Inc., trade name: Canon Photo Paper Platinum Grade (PT-201)

Glossy paper 2: manufactured by Seiko Epson Corporation, trade name: Photo Paper Crispia (high luster)

[(D) Colorimetric Analysis of Recorded Image]

The specimens were subjected to colorimetric analysis with a colorimeter (trade name: SpectroEye) manufactured by X-rite, for various tests as well as evaluation of the test results. The colorimetric analysis was carried out according to the ANSI A density standard under the conditions of a 2° viewing angle and a D50 light source. The method of testing the recorded images and the method of evaluating the test results are describe below.

[(E) Ozone Resistance Test]

Each specimen was left in an ozone weather meter (manufactured by Suga Test Instruments Co., Ltd., model OMS-H) for 24 hours at an ozone concentration of 10 ppm, a temperature inside the vessel of 23° C., and a humidity of 50% RH. The colorimetric system described above was used after the test, and hues (L* a* b*) before and after the test were measured. Thus, a color difference was determined. The smaller the numerical value of the color difference is, the more excellent the specimen is. Results are shown in Table 15 below. The color difference was calculated by the following expression. In the following expression, ΔL*, Δa*, and Δb* refer to the difference in L*, a*, and b*, respectively, before and after exposure. At the time of ozone resistance test, the hue (L* a* b*) of a recorded matter was measured before the test, and the color difference at an area of 100% gradation was determined. The criteria of the evaluation are as follows. Test results are shown in Table 15.

A . . . Color difference smaller than 11.5

B . . . Color difference not smaller than 11.5 and smaller than 12.0

C . . . Color difference not smaller than 12.0

Color difference $(\Delta E)=(\Delta L^*+\Delta a^*+\Delta b^*)^{1/2}$

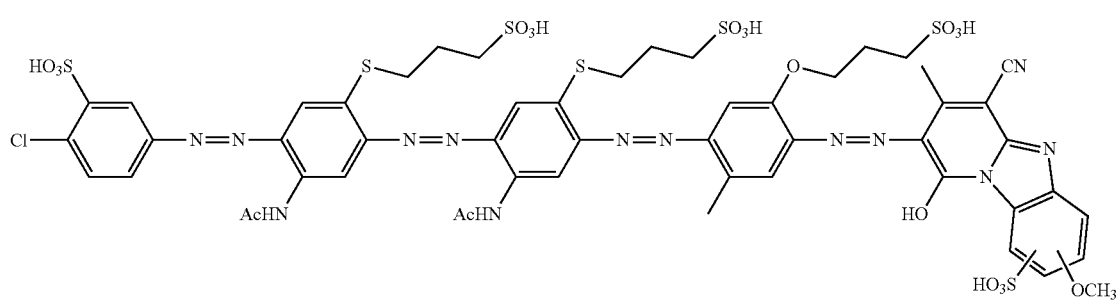

(73)

TABLE 15

|  | Glossy paper 1 | Glossy paper 2 |
| --- | --- | --- |
| Example 13 | A | A |
| Example 14 | A | A |
| Example 15 | A | A |
| Example 16 | A | A |
| Example 17 | A | A |
| Example 18 | A | A |
| Example 19 | A | A |
| Example 20 | A | A |
| Example 21 | A | A |
| Comparative Example 1 | C | C |

As shown in the results of the ozone resistance test carried out on the printed materials shown in Table 15, the glossy paper of Example 13 to 21 yielded excellent results compared to the glossy paper of Comparative Example 1.

These results have proven that the water-soluble azo compound of the present invention and the ink composition of the present invention containing the compound achieve a high ozone resistance of the printed material compared to a conventional coloring matter, yield a relatively small color difference on glossy paper, and have an excellent luster and an excellent bronzing resistance.

INDUSTRIAL APPLICABILITY

The azo compound of the present invention and an ink composition containing it are suitably used in black inks for various recording applications such as handwriting instruments, and particularly for inkjet recording.

The invention claimed is:

1. An azo compound represented by the following formula (1), a tautomer thereof, or a salt of the azo compound or the tautomer:

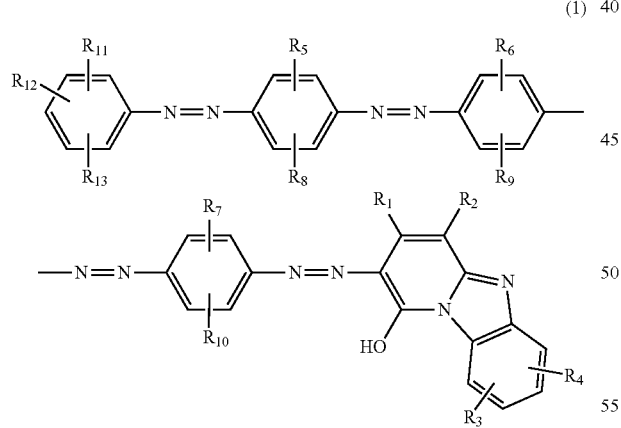

(1)

wherein, $R^1$ represents a C1-C4 alkyl group; a C1-C4 alkyl group substituted with a carboxy group; a phenyl group; a phenyl group substituted with a sulfo group; or a carboxy group, $R^2$ represents a cyano group; a carbamoyl group; or a carboxy group, $R^3$ and $R^4$ each independently represents a hydrogen atom; a C1-C4 alkyl group; a C1-C4 alkoxy group; a halogen atom; or a sulfo group, $R^5$ represents a C1-C4 alkylthio group; a C1-C4 alkylthio group substituted with at least one group selected from the group consisting of a hydroxy group, a sulfo group, and a carboxy group; a C1-C4 alkoxy group; a C1-C4 alkoxy group substituted with at least one group selected from the group consisting of a hydroxy group, a sulfo group, and a carboxy group; or a group represented by the following formula (2), $R^6$ represents a C1-C4 alkylthio group; a C1-C4 alkylthio group substituted with at least one group selected from the group consisting of a hydroxy group, a sulfo group, and a carboxy group; a C1-C4 alkoxy group; a C1-C4 alkoxy group substituted with at least one group selected from the group consisting of a hydroxy group, a sulfo group, and a carboxy group; or a group represented by the following formula (2), $R^7$ represents a C1-C4 alkylthio group; a C1-C4 alkylthio group substituted with at least one group selected from the group consisting of a hydroxy group, a sulfo group, and a carboxy group; a C1-C4 alkoxy group; a C1-C4 alkoxy group substituted with at least one group selected from the group consisting of a hydroxy group, a sulfo group, and a carboxy group; or a group represented by the following formula (2), $R^8$ to $R^{10}$ each independently represents a hydrogen atom; a carboxy group; a sulfo group; a C1-C4 alkylcarbonylamino group; a halogen atom; a C1-C4 alkyl group; a C1-C4 alkoxy group; a C1-C4 alkoxy group substituted with at least one group selected from the group consisting of a hydroxy group, a (C1-C4) alkoxy group, a sulfo group, and a carboxy group; or a group represented by the following formula (2), $R^{11}$ to $R^{13}$ each independently represents a hydrogen atom; a carboxy group; a sulfo group; a hydroxy group; an acetylamino group; a halogen atom; a cyano group; a nitro group; a sulfamoyl group; a C1-C4 alkyl group; a C1-C4 alkoxy group; a C1-C4 alkoxy group substituted with at least one group selected from the group consisting of a hydroxy group, a C1-C4 alkoxy group, a sulfo group, and a carboxy group; a C1-C4 alkylsulfonyl group; or a C1-C4 alkylsulfonyl group substituted with at least one group selected from the group consisting of a hydroxy group, a sulfo group, and a carboxy group, and at least one of $R^5$ to $R^{10}$ is a group represented by the following formula (2):

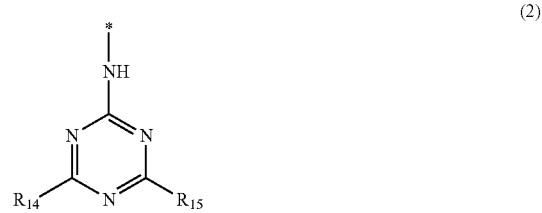

(2)

wherein, $R^{14}$ represents an anilino group having at least one sulfo group as a substituent; or a naphthylamino group having at least one sulfo group as a substituent, each of the anilino group and the naphthylamino group is optionally further substituted with at least one substituent selected from the group consisting of a sulfo group, a carboxy group, a phosphate group, a sulfamoyl group, a carbamoyl group, a hydroxy group, a nitro group, a C1-C6 alkoxy group, an amino group, a mono- or di-C1-C6 alkylamino group, a mono- or diarylamino group, an acetylamino group, a ureido group, a C1-C6 alkyl group, a cyano group, a halogen atom, a C1-C6 alkylsulfonyl group, and a C1-C6 alkylthio group, $R^{15}$ represents an anilino group; a naphthylamino group; a mono- or di-C1-C6 alkylamino group; a mono- or diarylamino group; an amino group; a C1-C6 alkylthio group; a phenylthio group; a phenoxy group; or a (C1-C6) alkoxy group; or a hydroxy group, the group as $R^{15}$ is optionally further substituted with at least one substituent selected from the group consisting of a sulfo group, a carboxy group, a phosphate group, a sulfamoyl group, a carbamoyl group, a hydroxy group, an alkoxy group, an amino group, a mono- or di-C1-C6 alkylamino group, a mono- or diarylamino group, an acetylamino group, a ureido group, a C1-C6 alkyl group, a phenyl group, a furyl group, a pyridyl group, a cyano group, a halogen atom, a C1-C6 alkylsulfonyl group, a C1-C6 alkylthio group, and a sulfo C1-C6 alkylthio group, and in the formula (2), * represents a position of bonding.

2. The azo compound, the tautomer thereof, or the salt of the azo compound or the tautomer according to claim 1, wherein in the formula (1), $R^1$ represents a C1-C4 alkyl group; or a C1-C4 alkyl group substituted with a carboxy group, $R^2$ represents a cyano group; a carbamoyl group; or a carboxy group, $R^3$ and $R^4$ each independently represents a hydrogen atom; a C1-C4 alkyl group; a C1-C4 alkoxy group; a halogen atom; or a sulfo group, $R^5$ represents a C1-C4 alkylthio group; or a C1-C4 alkylthio group substituted with at least one group selected from the group consisting of a hydroxy group, a sulfo group, and a carboxy group, $R^6$ represents a C1-C4 alkylthio group substituted with at least one group selected from the group consisting of a hydroxy group, a sulfo group, and a carboxy group, $R^7$ represents a C1-C4 alkoxy group; or a C1-C4 alkoxy group substituted with at least one group selected from the group consisting of a hydroxy group, a sulfo group, and a carboxy group, $R^8$ to $R^{10}$ each independently represents a hydrogen atom; a carboxy group; a sulfo group; a C1-C4 alkylcarbonylamino group; a halogen atom; a C1-C4 alkyl group; a C1-C4 alkoxy group; a C1-C4 alkoxy group substituted with at least one group selected from the group consisting of a hydroxy group, a C1-C4 alkoxy group, a sulfo group, and a carboxy group; or a group represented by the formula (2), $R^{11}$ to $R^{13}$ each independently represents a hydrogen atom; a carboxy group; a sulfo group; a hydroxy group; an acetylamino group; a halogen atom; a cyano group; a nitro group; a sulfamoyl group; a (C1-C4) alkyl group; a C1-C4 alkoxy group; a C1-C4 alkoxy group substituted with at least one group selected from the group consisting of a hydroxy group, a C1-C4 alkoxy group, a sulfo group, and a carboxy group; a C1-C4 alkylsulfonyl group; or a C1-C4 alkylsulfonyl group substituted with at least one group selected from the group consisting of a hydroxy group, a sulfo group, and a carboxy group, and at least one of $R^8$ to $R^{10}$ is a group represented by the formula (2).

3. The azo compound, the tautomer thereof, or the salt of the azo compound or the tautomer according to claim 1, wherein in the formula (1), $R^1$ represents a C1-C4 alkyl group; or a C1-C4 alkyl group substituted with a carboxy group, $R^2$ represents a cyano group, $R^3$ and $R^4$ each independently represents a hydrogen atom; a C1-C4 alkoxy group; or a sulfo group, $R^5$ represents a C1-C4 alkylthio group substituted with at least one group selected from the group consisting of a hydroxy group, a sulfo group, and a carboxy group, $R^6$ represents a C1-C4 alkylthio group substituted with at least one group selected from the group consisting of a hydroxy group, a sulfo group, and a carboxy group, $R^7$ represents a sulfo-C1-C4 alkoxy group, $R^8$ and $R^{10}$ each independently represents a C1-C4 alkyl group; or a C1-C4 alkylcarbonylamino group, $R^9$ represents a group represented by the formula (2), and $R^{11}$ to $R^{13}$ each independently represent a hydrogen atom; a sulfo group; or a nitro group.

4. The azo compound, the tautomer thereof, or the salt of the azo compound or the tautomer according to claim 1, wherein in the formula (1), $R^1$ represents a C1-C4 alkyl group; or a C1-C4 alkyl group substituted with a carboxy group, $R^2$ represents a cyano group, $R^3$ and $R^4$ each independently represents a hydrogen atom; a C1-C4 alkoxy group; or a sulfo group, $R^5$ represents a C1-C4 alkylthio group substituted with at least one group selected from the group consisting of a hydroxy group, a sulfo group, and a carboxy group, $R^6$ represents a C1-C4 alkylthio group substituted with at least one group selected from the group consisting of a hydroxy group, a sulfo group, and a carboxy group, $R^7$ represents a sulfo-C1-C4 alkoxy group, $R^8$ and $R^{10}$ each independently represents a methyl group; or a C1-C4 alkylcarbonylamino group, $R^9$ represents a group represented by the formula (2), $R^{11}$ to $R^{13}$ each independently represents a hydrogen atom; a sulfo group; or a nitro group, in which at least one of $R^{11}$ to $R^{13}$ is a nitro group, and in the formula (2), $R^{14}$ represents an anilino group having at least one sulfo group as a substituent, the anilino group is optionally further substituted with at least one substituent selected from the group consisting of a sulfo group, a carboxy group, a hydroxy group, an alkoxy group, a C1-C6 alkyl group, a cyano group, a halogen atom, a C1-C6 alkylsulfonyl group, and a C1-C6 alkylthio group, $R^{15}$ represents a mono- or di-C1-C6 alkylamino group; a C1-C6 alkylthio group; or a hydroxy group, and the mono- or di-C1-C6 alkylamino group is optionally further substituted with at least one substituent selected from the group consisting of a sulfo group, a carboxy group, a phosphate group, a hydroxy group, a C1-C6 alkoxy group, an acetylamino group, a ureido group, a C1-C6 alkyl group, a phenyl group, a cyano group, a halogen atom, a C1-C6 alkylsulfonyl group, and a C1-C6 alkylthio group.

5. The azo compound, the tautomer thereof, or the salt of the azo compound or the tautomer according to claim 1, wherein in the formula (1), $R^1$ represents a methyl group;

$R^2$ represents a cyano group;

$R^3$ represents a methoxy group;

$R^4$ represents a sulfo group;

R⁵ represents a sulfo-C1-C4 alkylthio group;
R⁶ represents a sulfo-C1-C4 alkylthio group;
R⁷ represents a sulfo-C1-C4 alkoxy group;
R⁸ represents a C1-C4 alkylcarbonylamino group;
R¹⁰ represents a methyl group;
R⁹ represents a group represented by the formula (2);
any one of R¹¹ to R¹³ represents a nitro group; and the other two independently represent a sulfo group or a hydrogen atom, and
in the formula (2),
R¹⁴ represents an anilino group having at least one sulfo group as a substituent,
the anilino group is optionally further substituted with at least one substituent selected from the group consisting of a sulfo group; a carboxy group; a hydroxy group; an alkoxy group; an alkyl group; a cyano group; a halogen atom; a C1-C6 alkylsulfonyl group; and a C1-C6 alkylthio group,
R¹⁵ represents a mono- or di-C1-C6 alkylamino group, and
the C1-C6 alkylamino group is optionally further substituted with at least one substituent selected from the group consisting of a sulfo group, a carboxy group, a hydroxy group, a (C1-C6) alkoxy group, a (C1-C6) alkyl group, a phenyl group, a halogen atom, a (C1-C6) alkylsulfonyl group, and a C1-C6 alkylthio group.

6. The azo compound, the tautomer thereof, or the salt of the azo compound or the tautomer according to claim 1, wherein in the formula (1),
R¹ represents a methyl group;
R² represents a cyano group;
R³ represents a methoxy group;
R⁴ represents a sulfo group;
R⁵ represents a sulfo-C1-C4 alkylthio group;
R⁶ represents a sulfo-C1-C4 alkylthio group;
R⁷ represents a sulfo-C1-C4 alkoxy group;
R⁸ represents a C1-C4 alkylcarbonylamino group;
R¹⁰ represents a methyl group;
R⁹ represents a group represented by the formula (2);
any one of R¹¹ to R¹³ represents a nitro group; and the other two independently represent a sulfo group or a hydrogen atom, and
in the formula (2),
R¹⁴ represents an anilino group having at least one sulfo group as a substituent,
the anilino group is optionally further substituted with a sulfo group,
R¹⁵ represents a mono- or di-C1-C2 alkylamino group, and
the C1-C2 alkylamino group is optionally further substituted with a sulfo group.

7. An ink composition comprising an azo compound (A), the azo compound containing a structure represented by the following formula (3), a structure represented by the following formula (4), and a structure represented by the following formula (5) in one molecule:

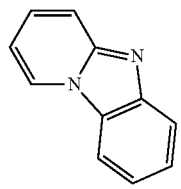

(3)

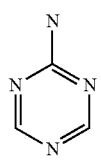

(4)

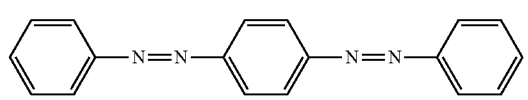

(5)

8. The ink composition according to claim 7, wherein the number of azo bonds (—N═N—) in one molecule of the azo compound (A) is 4 or 5.

9. The ink composition according to claim 7, wherein the azo compound (A) is an azo compound represented by the following formula (6):

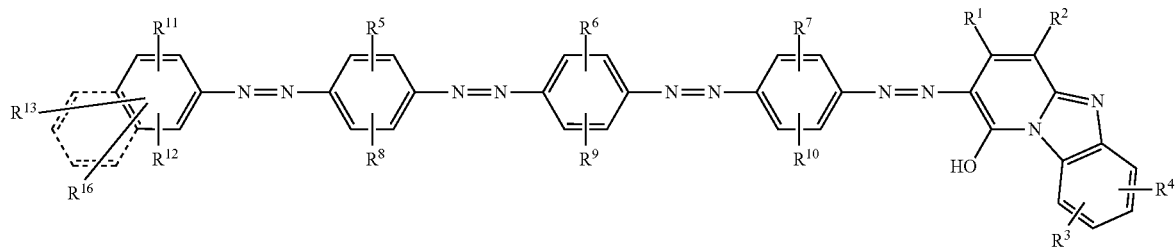

(6)

wherein,
R¹ represents a C1-C4 alkyl group; a C1-C4 alkyl group substituted with a carboxy group; a phenyl group; a phenyl group substituted with a sulfo group; or a carboxy group,
R² represents a cyano group; a carbamoyl group; or a carboxy group,
R³ and R⁴ each independently represents a hydrogen atom; a C1-C4 alkyl group; a C1-C4 alkoxy group; a halogen atom; or a sulfo group,
R⁵ represents a C1-C4 alkylthio group; a C1-C4 alkylthio group substituted with at least one group selected from the group consisting of a hydroxy group, a sulfo group, and a carboxy group; a C1-C4 alkoxy group; a C1-C4 alkoxy group substituted with at least one group selected from the group consisting of a hydroxy group, a sulfo group, and a carboxy group; or a group represented by the following formula (2), $R^6$ represents a C1-C4 alkylthio group; a C1-C4 alkylthio group substituted with at least one group selected from the group consisting of a hydroxy group, a sulfo group, and a carboxy group; a C1-C4 alkoxy group; a C1-C4 alkoxy group substituted with at least group selected from the group consisting of a hydroxy group, a sulfo group, and a carboxy group; or a group represented by the following formula (2), $R^7$ represents a C1-C4 alkylthio group; a C1-C4 alkylthio group substituted with at least one group selected from the group consisting of a hydroxy group, a sulfo group, and a carboxy group; a C1-C4 alkoxy group; a C1-C4 alkoxy group substituted with at least one group selected from the group consisting of a hydroxy group, a sulfo group, and a carboxy group; or a group represented by the following formula (2), $R^8$ to $R^{10}$ each independently represents a hydrogen atom; a carboxy group; a sulfo group; a (C1-C4) alkylcarbonylamino group; a halogen atom; a (C1-C4) alkyl group; a (C1-C4) alkoxy group; a C1-C4 alkoxy group substituted with at least one group selected from the group consisting of a hydroxy group, a C1-C4 alkoxy group, a sulfo group, and a carboxy group; or a group represented by the following formula (2), and $R^{11}$ to $R^{13}$ and $R^{16}$ each independently represents a hydrogen atom; a carboxy group; a sulfo group; a hydroxy group; an acetylamino group; a halogen atom; a cyano group; a nitro group; a sulfamoyl group; a C1-C4 alkyl group; a C1-C4 alkoxy group; a C1-C4 alkoxy group substituted with at least one group selected from the group consisting of a hydroxy group, a C1-C4 alkoxy group, a sulfo group, and a carboxy group; a C1-C4 alkylsulfonyl group; or a C1-C4 alkylsulfonyl group substituted with at least one group selected from the group consisting of a hydroxy group, a sulfo group, and a carboxy group, at least one of $R^5$ to $R^{10}$ is a group represented by the following formula (2), and the benzene ring described with a dashed line is optional:

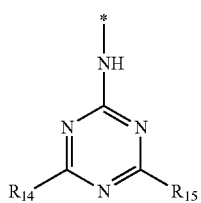

(2)

wherein, $R^{14}$ represents an anilino group having at least one sulfo group as a substituent; or a naphthylamino group having at least one sulfo group as a substituent, each of the anilino group and the naphthylamino group is optionally further substituted with at least one substituent selected from the group consisting of a sulfo group, a carboxy group, a phosphate group, a sulfamoyl group, a carbamoyl group, a hydroxy group, a nitro group, a C1-C6 alkoxy group, an amino group, a mono- or di-C1-C6 alkylamino group, a mono- or diarylamino group, an acetylamino group, a ureido group, a C1-C6 alkyl group, a cyano group, a halogen atom, a C1-C6 alkylsulfonyl group, and a C1-C6 alkylthio group, $R^{15}$ represents an anilino group; a naphthylamino group; a mono- or di-C1-C6 alkylamino group; a mono- or diarylamino group; an amino group; a C1-C6 alkylthio group; a phenylthio group; a phenoxy group; a C1-C6 alkoxy group; or a hydroxy group, the group as $R^{15}$ is optionally further substituted with at least one substituent selected from the group consisting of a sulfo group, a carboxy group, a phosphate group, a sulfamoyl group, a carbamoyl group, a hydroxy group, an alkoxy group, an amino group, a mono- or di-C1-C6 alkylamino group, a mono- or diarylamino group, an acetylamino group, a ureido group, a C1-C6 alkyl group, a phenyl group, a furyl group, a pyridyl group, a cyano group, a halogen atom, a C1-C6 alkylsulfonyl group, a C1-C6 alkylthio group, and a sulfo C1-C6 alkylthio group, and in the formula (2), * represents a position of bonding.

10. The ink composition according to claim 7, wherein the azo compound (A) is the azo compound, the tautomer thereof, or the salt of the azo compound or the tautomer according to any one of claims 1 to 6.

11. The ink composition according to claim 7, further comprising a water-soluble organic solvent.

12. An inkjet recording method, comprising utilizing the ink composition according to claim 7 as an ink, discharging ink droplets of the ink according to recording signals, and thereby performing recording on a record-receiving material.

13. The inkjet recording method according to claim 12, wherein the record-receiving material is a communication sheet.

14. The inkjet recording method according to claim 13, wherein the communication sheet is a sheet having an ink-receiving layer containing a porous white inorganic substance.

15. An inkjet printer equipped with a vessel containing the ink composition according to claim 7.

16. A colored material colored with
the azo compound, the tautomer thereof, or the salt of the azo compound or the tautomer according to claim 1.

17. The azo compound, the tautomer thereof, or the salt of the azo compound or the tautomer according to claim 1, wherein in the formula (2), $R^{14}$ represents an anilino group having a substituent containing a sulfo group; or a naphthylamino group having a substituent containing a sulfo group, the substituent containing a sulfo group is at least one selected from the group consisting of a sulfo (C1-C6) alkoxy group, a sulfomono- or sulfodi-C1-C6 alkylamino group, a sulfomono- or sulfodiarylamino group, a sulfoacetylamino group, a sulfo (C1-C6) alkyl group, a sulfo (C1-C6) alkylsulfonyl group, and a sulfo (C1-C6) alkylthio group, and each of the anilino group and the naphthylamino group is optionally further substituted with at least one substituent selected from the group consisting of a carboxy group, a phosphate group, a sulfamoyl group, a carbamoyl group, a hydroxy group, a nitro group, a (C1-C6) alkoxy group, an amino group, a mono- or di-(C1-C6) alkylamino group, a mono- or diarylamino group, an acetylamino group, a ureido group, a (C1-C6) alkyl group, a cyano group, a halogen atom, a (C1-C6) alkylsulfonyl group, and a (C1-C6) alkylthio group.

18. The azo compound, the tautomer thereof, or the salt of the azo compound or the tautomer according to claim 17, wherein in the formula (2), $R^{14}$ represents an anilino group having a substituent containing a sulfo group; or a naphthylamino group having a substituent containing a sulfo group, the substituent containing a sulfo group is at least one selected from the group consisting of a sulfo (C1-C6) alkoxy group, a sulfo (C1-C6) alkylthio group, and a sulfo (C1-C6) alkylsulfonyl group, and each of the anilino group and the naphthylamino group is optionally further substituted with at least one substituent selected from the group consisting of a carboxy group, a phosphate group, a sulfamoyl group, a carbamoyl group, a hydroxy group, a nitro group, a (C1-C6) alkoxy group, an amino group, a mono- or di-(C1-C6) alkylamino group, a mono- or diarylamino group, an acetylamino group, a ureido group, a (C1-C6) alkyl group, a cyano group, a halogen atom, a (C1-C6) alkylsulfonyl group, and a (C1-C6) alkylthio group.

19. The azo compound, the tautomer thereof, or the salt of the azo compound or the tautomer according to claim 18, wherein in the formula (1), $R^1$ represents a methyl group;
$R^2$ represents a cyano group;
$R^3$ represents a methoxy group;
$R^4$ represents a sulfo group;
$R^5$ represents a sulfo-C1-C4 alkylthio group;
$R^6$ represents a sulfo-C1-C4 alkylthio group;
$R^7$ represents a sulfo-C1-C4 alkoxy group;
$R^8$ represents a C1-C5 alkylcarbonylamino group;
$R^{10}$ represents a methyl group;
$R^9$ represents a group represented by the formula (2);
any one of $R^{11}$ to $R^{13}$ represents a nitro group; and the other two independently represent a sulfo group or a hydrogen atom, and in the formula (2), $R^{14}$ represents an anilino group having a substituent containing a sulfo group, the substituent containing a sulfo group is at least one selected from the group consisting of a sulfo C1-C6 alkoxy group, a sulfo C1-C6 alkylsulfonyl group, and a sulfo C1-C6 alkylthio group, the anilino group is optionally further substituted with at least one substituent selected from the group consisting of a nitro group; an alkyl group; and an acetylamino group, $R^{15}$ represents an anilino group; or a C1-C6 alkylthio group, and the anilino group and the C1-C6 alkylthio group is optionally further substituted with at least one substituent selected from the group consisting of a sulfo group, an acetylamino group, and a sulfo C1-C6 alkylthio group.

20. A colored material colored with the ink composition according to claim 7.

21. A colored material colored using the inkjet recording method according to claim 12.

* * * * *